Aug. 28, 1956   N. R. FRIEBERG ET AL   2,760,722
TWO-TOTAL CREDIT BALANCE ADDING MACHINE
Filed Dec. 1, 1952   18 Sheets-Sheet 3

INVENTORS
NELSON R. FRIEBERG
& OSCAR F. LARSEN

THEIR ATTORNEYS

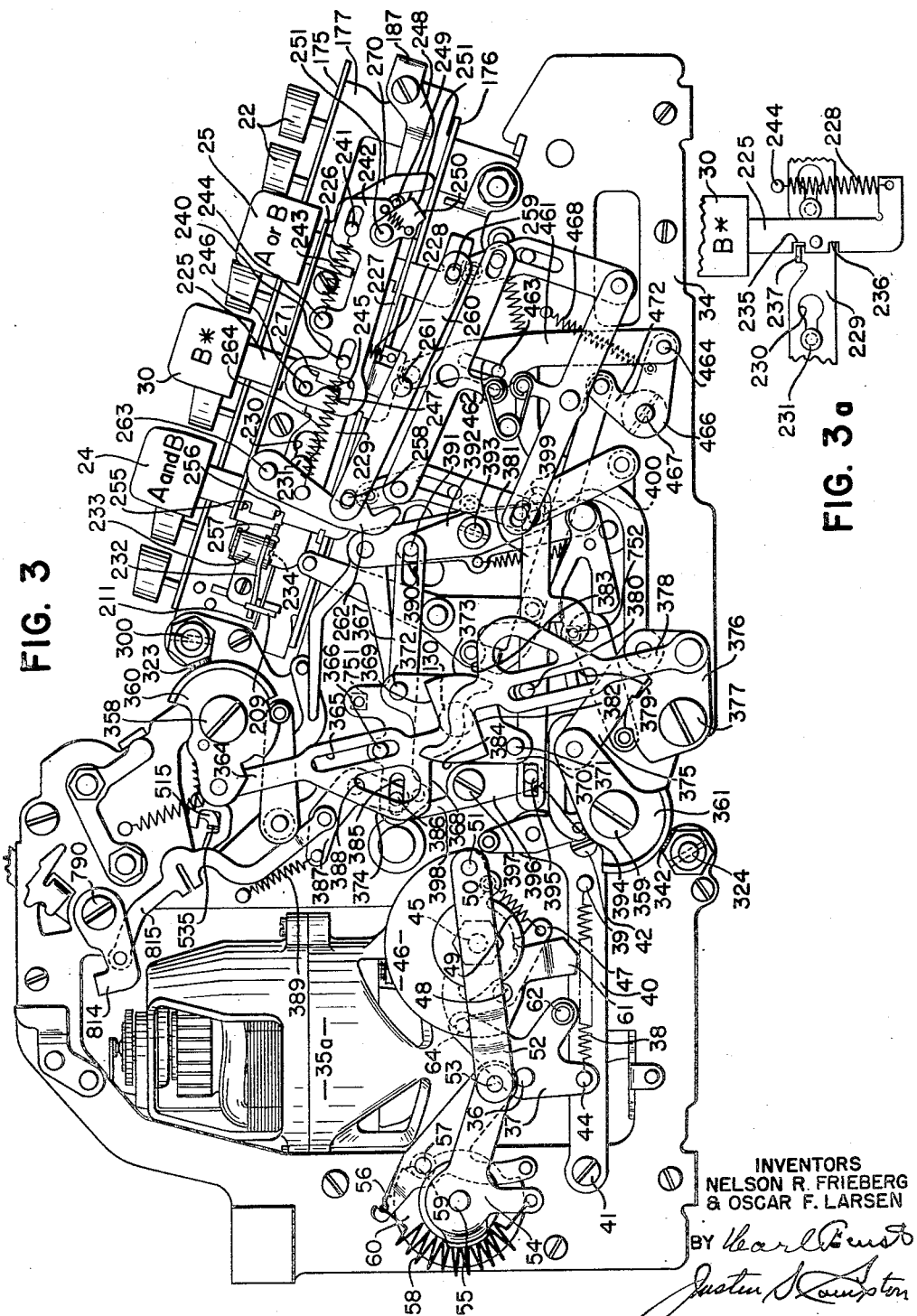

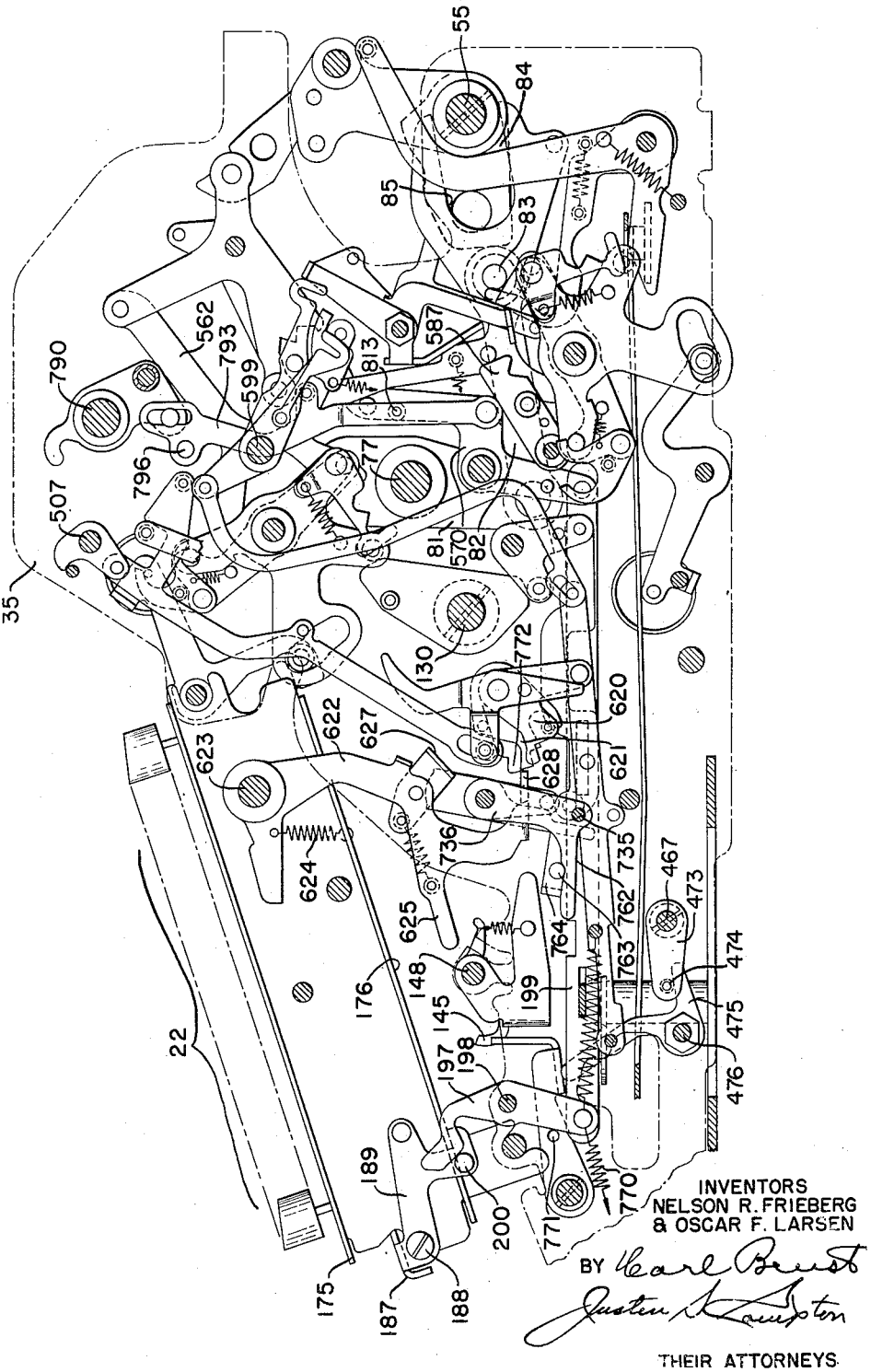

INVENTORS
NELSON R. FRIEBERG
& OSCAR F. LARSEN
BY
THEIR ATTORNEYS

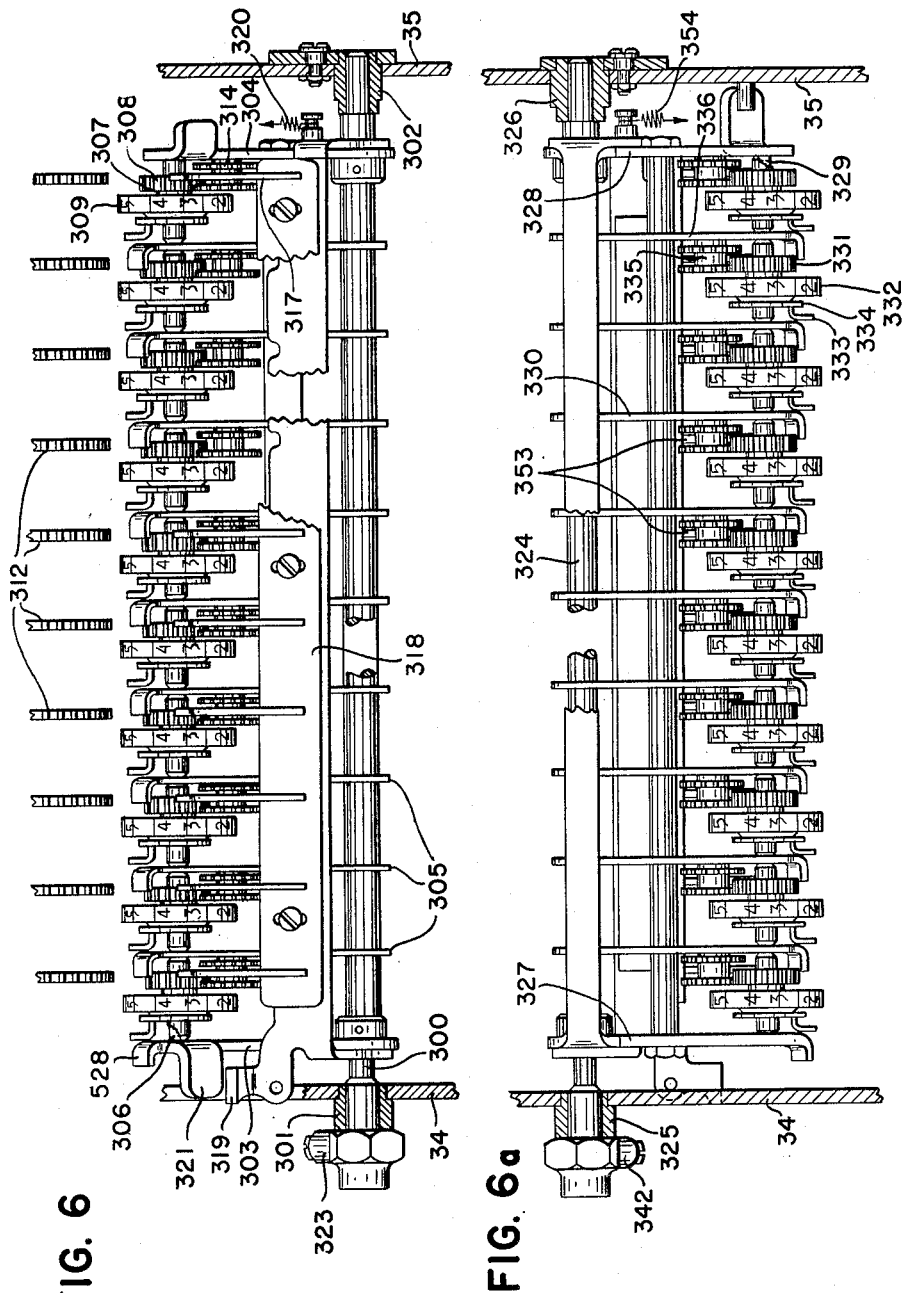

Aug. 28, 1956 N. R. FRIEBERG ET AL 2,760,722
TWO-TOTAL CREDIT BALANCE ADDING MACHINE
Filed Dec. 1, 1952 18 Sheets-Sheet 8
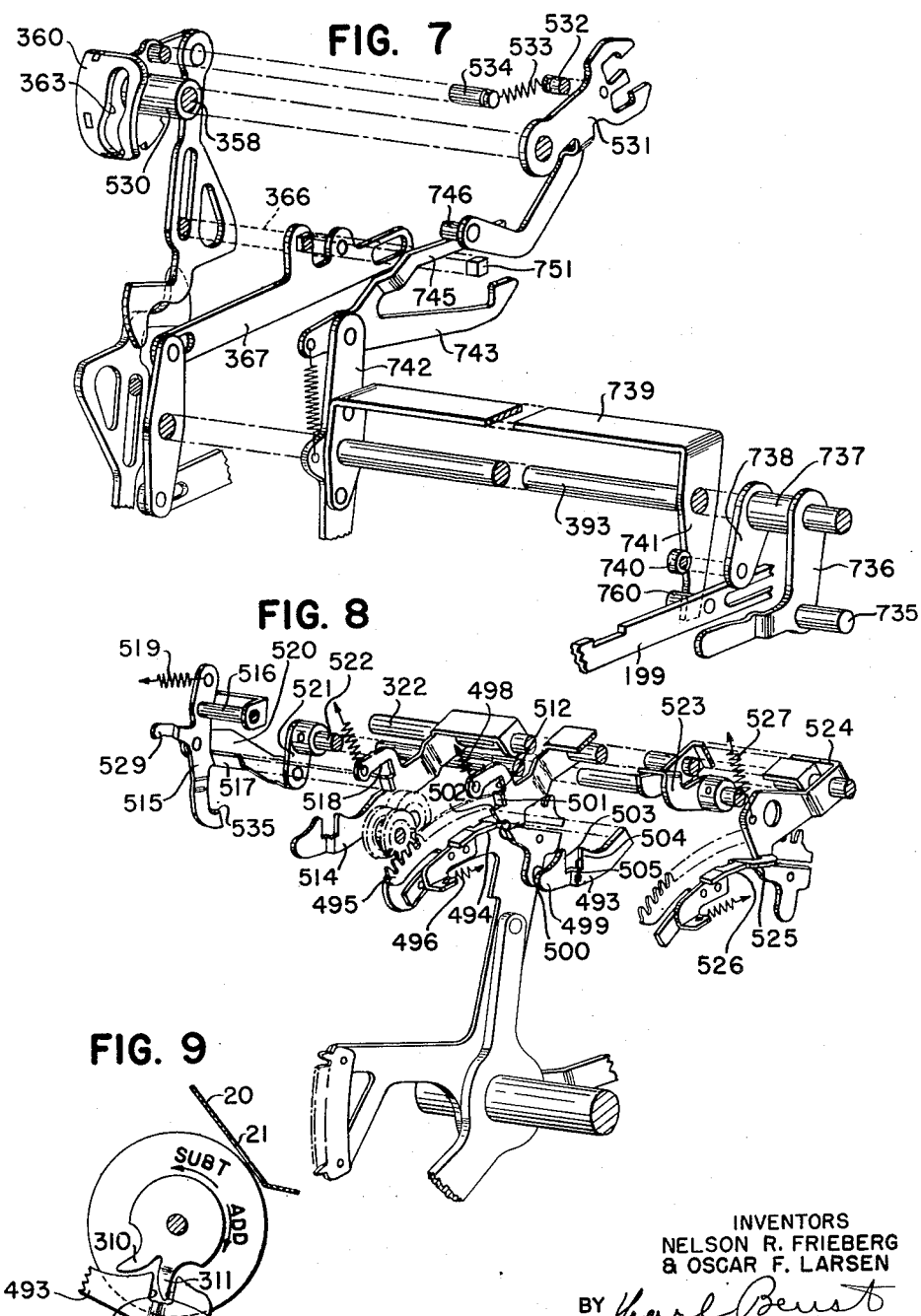
INVENTORS
NELSON R. FRIEBERG
& OSCAR F. LARSEN
BY
THEIR ATTORNEYS Aug. 28, 1956 N. R. FRIEBERG ET AL 2,760,722
TWO-TOTAL CREDIT BALANCE ADDING MACHINE
Filed Dec. 1, 1952 18 Sheets-Sheet 9
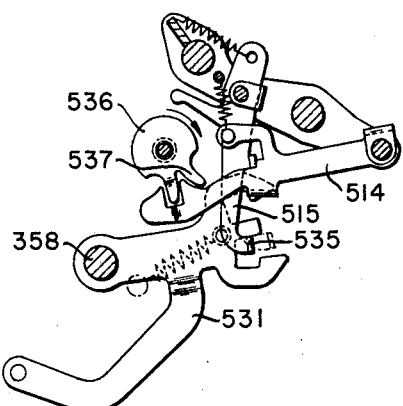
FIG. 10
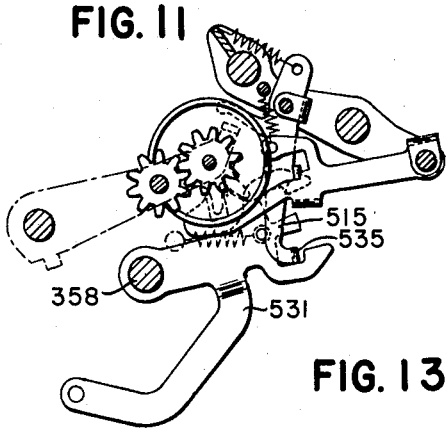
FIG. 11
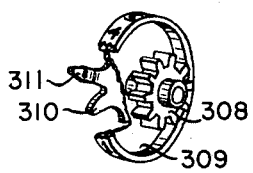
FIG. 13
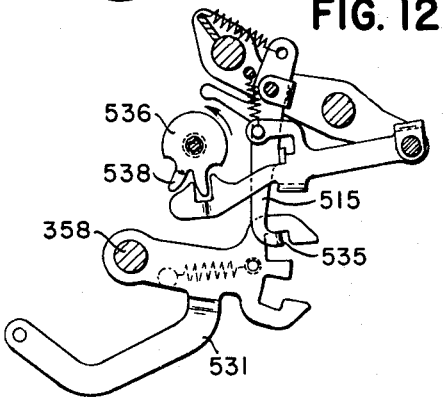
FIG. 12
FIG. 14
```
        ┌849
 .22 ───┤849a
 .05 ───┤
 .14─ A─┤852
 .05  B─┤850
 .15─ ──┤853
 .02 CR A──863
 .17 S B──862
 .60─ B───854
1.20  A───851
 .10─ ────855
1.08* A───900
 .53 CR B──901
```
INVENTORS
NELSON R. FRIEBERG &
OSCAR F. LARSEN
BY Earl Beust
Justin A. Compton
THEIR ATTORNEYS Aug. 28, 1956 N. R. FRIEBERG ET AL 2,760,722
TWO-TOTAL CREDIT BALANCE ADDING MACHINE
Filed Dec. 1, 1952 18 Sheets-Sheet 10
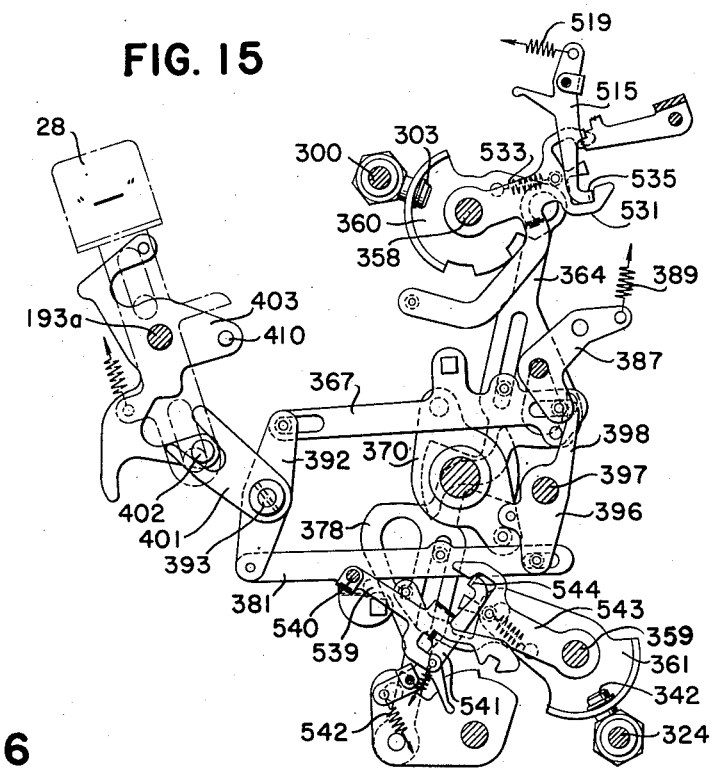
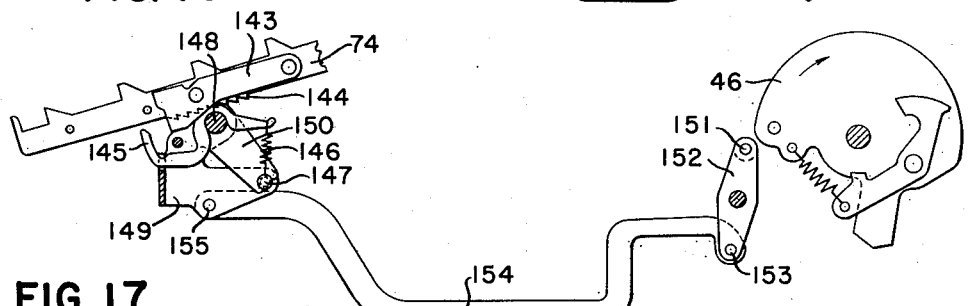
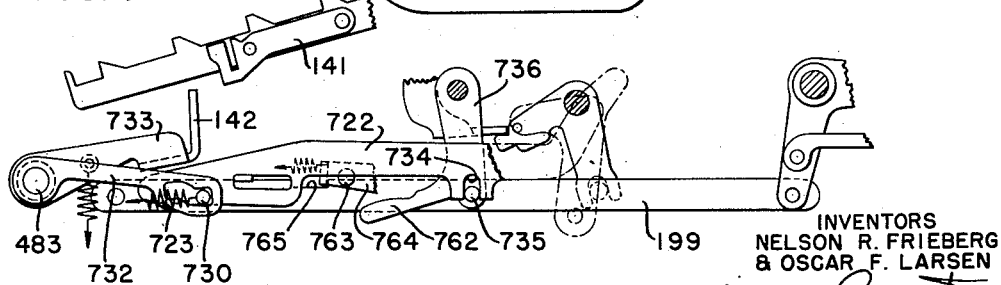
INVENTORS
NELSON R. FRIEBERG
& OSCAR F. LARSEN
BY Carl Beust
Justin S. Lampsten
THEIR ATTORNEYS Aug. 28, 1956  N. R. FRIEBERG ET AL  2,760,722
TWO-TOTAL CREDIT BALANCE ADDING MACHINE
Filed Dec. 1, 1952  18 Sheets-Sheet 11

INVENTORS
NELSON R. FRIEBERG
& OSCAR F. LARSEN
BY
THEIR ATTORNEYS

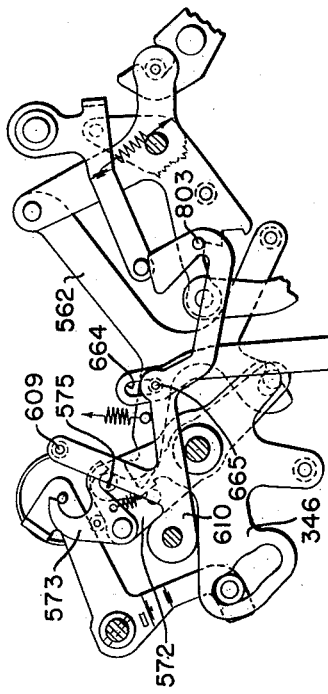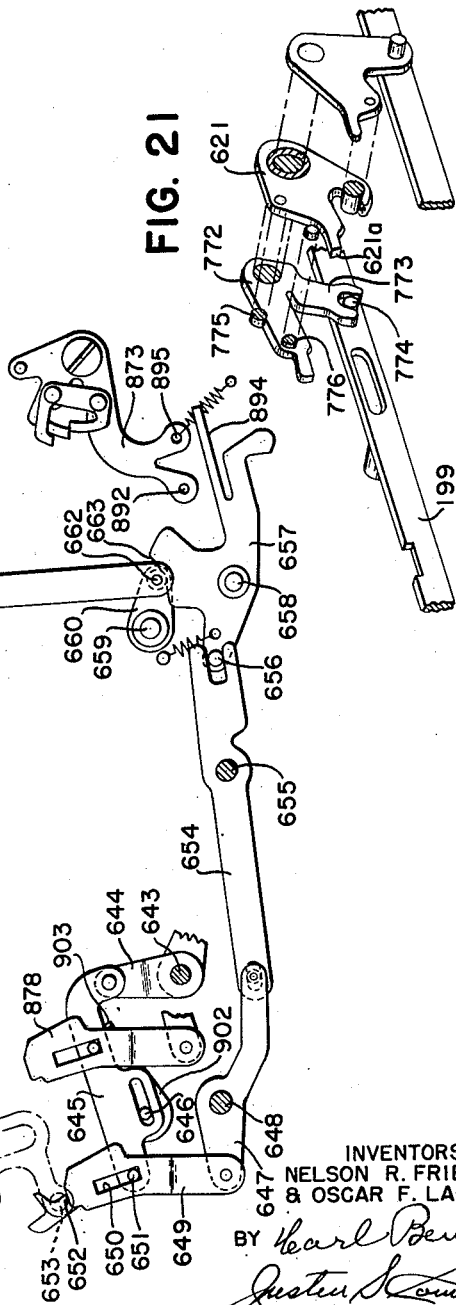

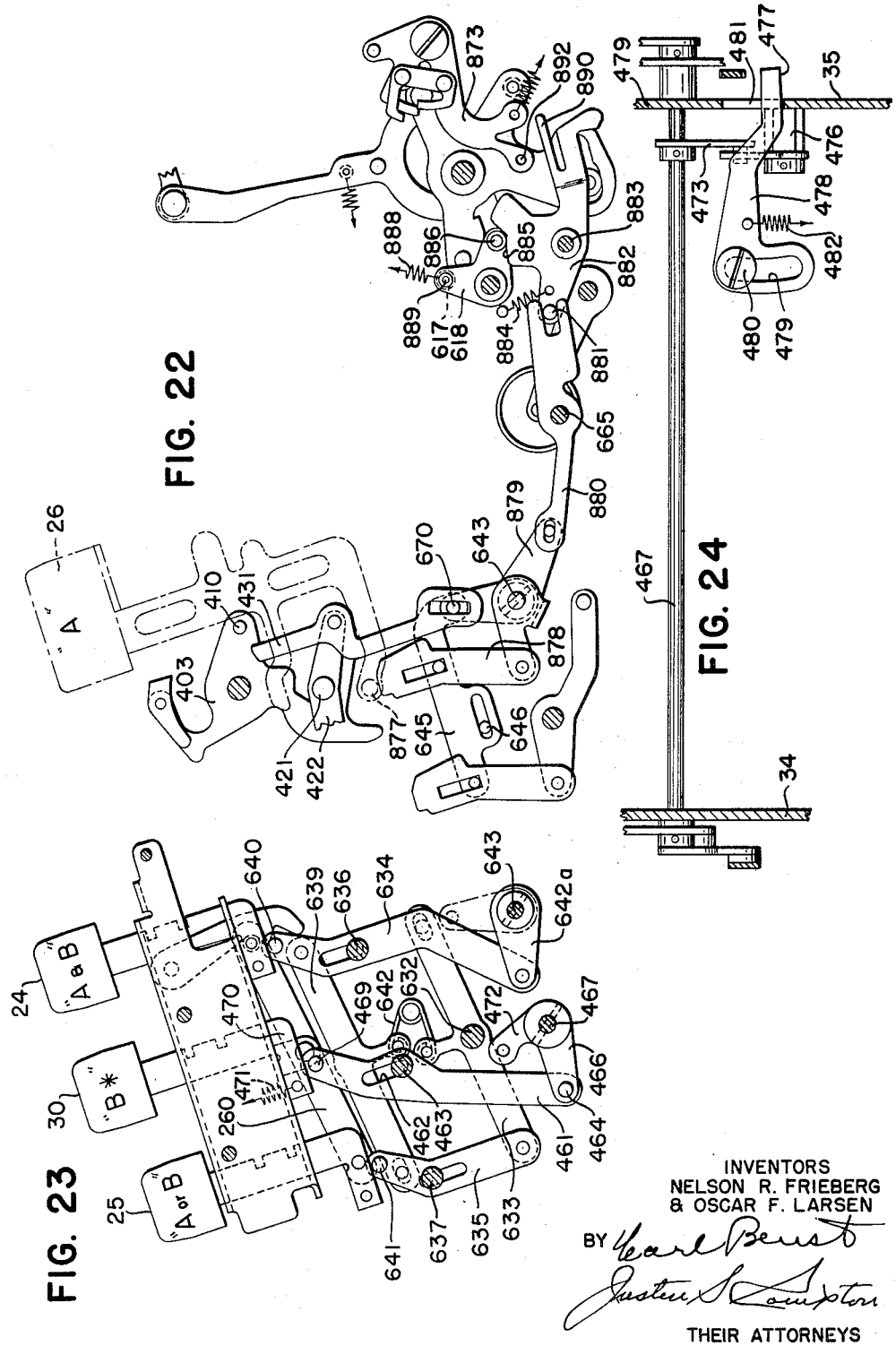

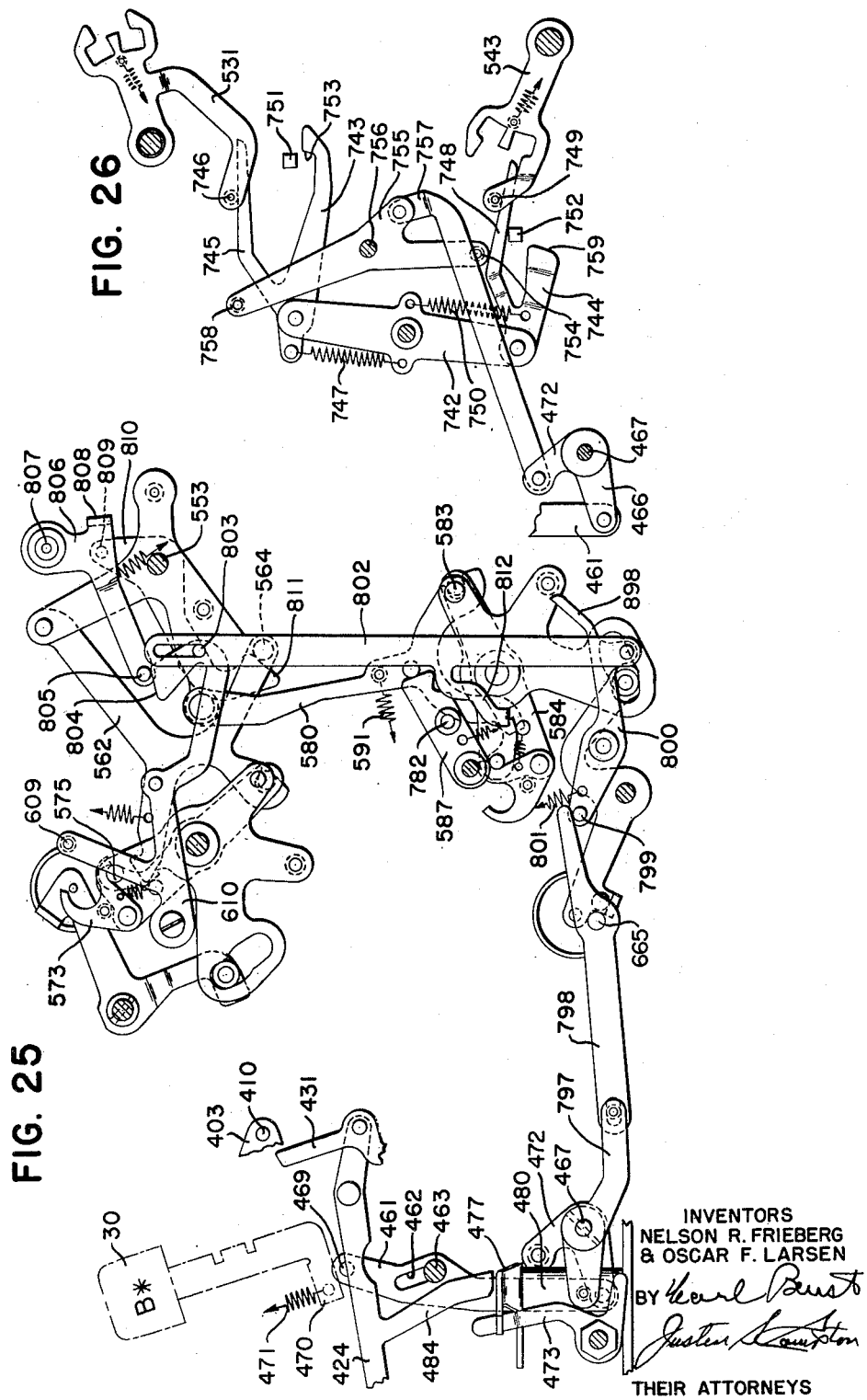

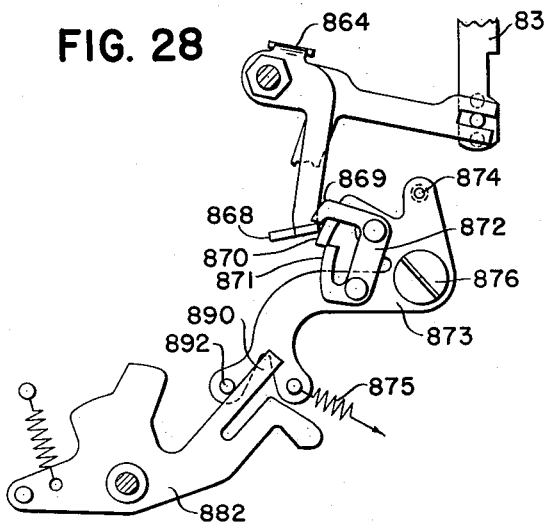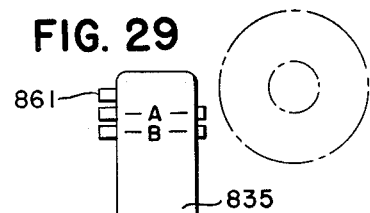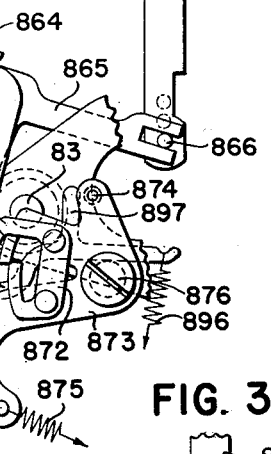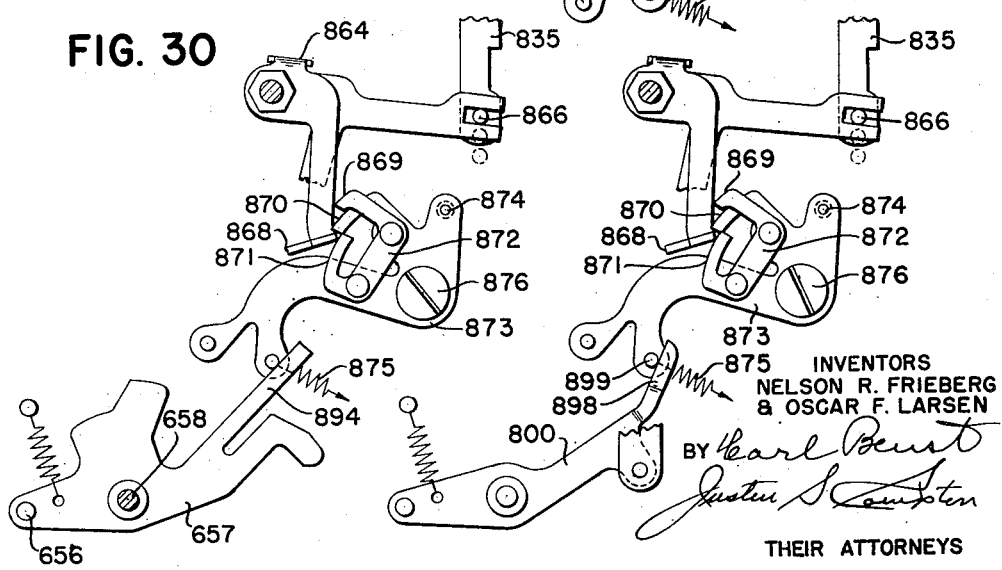

Aug. 28, 1956

N. R. FRIEBERG ET AL 2,760,722

TWO-TOTAL CREDIT BALANCE ADDING MACHINE

Filed Dec. 1, 1952

INVENTORS
NELSON R. FRIEBERG
& OSCAR F. LARSEN

BY

THEIR ATTORNEYS.

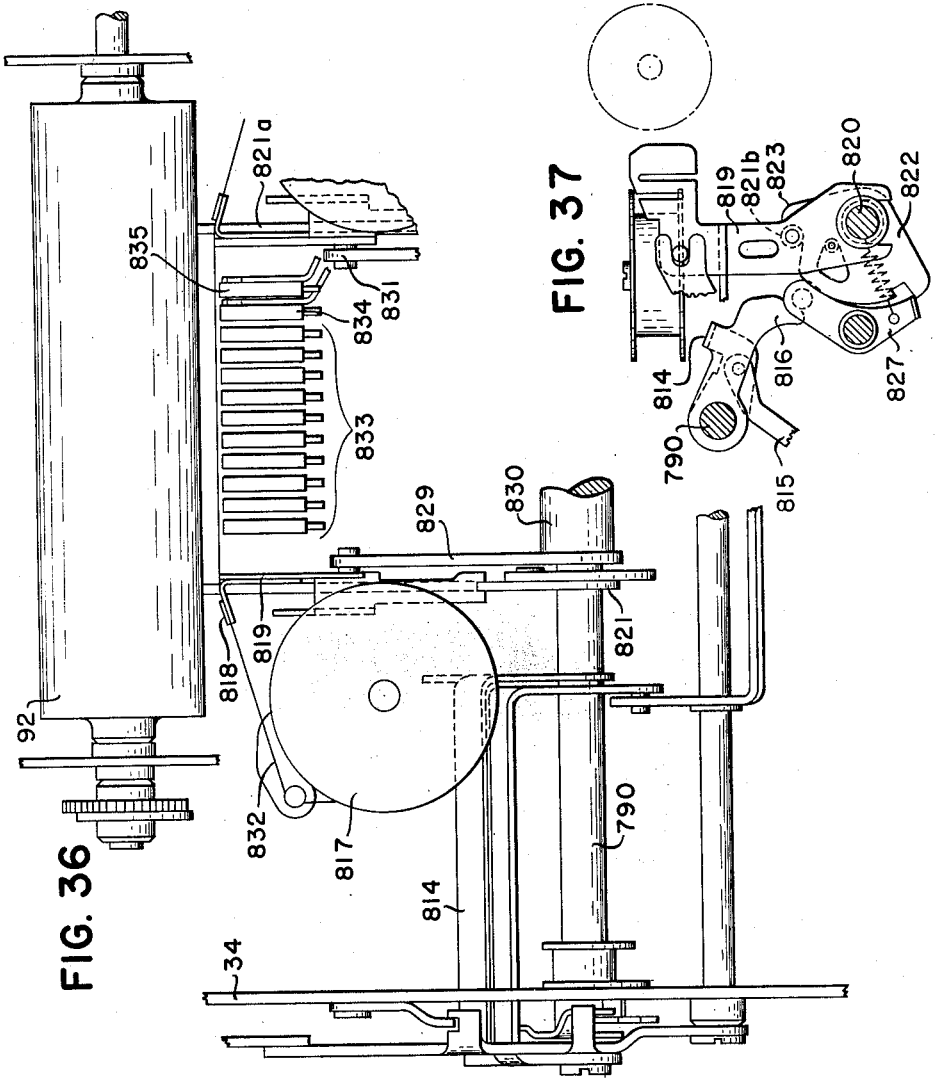
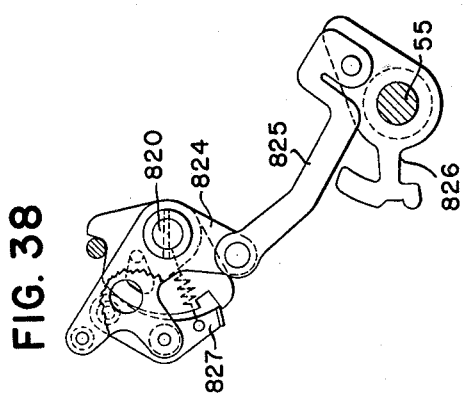

United States Patent Office

2,760,722
Patented Aug. 28, 1956

2,760,722

TWO-TOTAL CREDIT BALANCE ADDING MACHINE

Nelson R. Frieberg and Oscar F. Larsen, Ithaca, N. Y., assignors to The National Cash Register Company, Dayton, Ohio, a corporation of Maryland Application December 1, 1952, Serial No. 323,462

18 Claims. (Cl. 235—60.31)

This invention relates to calculating machines and more particularly pertains to the totalizer-selecting mechanism, control key interlocking mechanism, and symbol-printing mechanism of a two-total electrically-operated automatic credit balance adding machine of the flexible full keyboard type. The machine has a main operating means, a differential mechanism, and automatic credit balance mechanism of the general type disclosed in application for United States Letters Patent Serial No. 171,118, of Carl H. Carlson et al., which was filed June 29, 1950, now Patent No. 2,666,574, but is an improvement on that mechanism because of the provision of a second totalizer; the provision of control mechanism by which an operator may condition the machine, before a series of machine operations in which data is entered, to have the data entered in both totalizers or in a selected one of the two as determined by the operator before the particular entry operation; the provision of novel means for selecting one or the other of the totalizers for a total-taking operation or a sub-total-taking operation; the provision of novel interlocked mechanisms between the individual control keys for data-entering or total- or sub-total-taking operations; the provision of novel subtract key control and interlocking mechanism; and the provision of novel symbol-printing mechanism designating the totalizer in which an entry is entered, if it is only entered in one of the two totalizers, designating whether the entry is positive or negative by the color of the printing and by a symbol if negative, and designating by symbols whether a total or a sub-total is being printed from one or the other of the two totalizers and whether it is positive or negative.

On the right side of the keyboard (see Fig. 1) are a total control key, designated "*"; a sub-total key, designated "S"; an add-control key for one totalizer, designated "A"; an add-control key for the other totalizer, designated "B"; a subtract-control key between keys "A" and "B," designated "—"; a non-add control key, designated "#," for conditioning the machine to print an amount set up on the keyboard without entering it into either of the totalizers; a correction key for releasing depressed and latched digit keys, designated "C." On the left side of the keyboard are a control key 24 for conditioning the machine to enter the amount set up on the digit keys into both totalizers, designated "A and B"; a control key 25, designated "A or B," for conditioning the machine to enter the amount set up in one or the other of the totalizers, depending upon which of the keys "A" and "B" is used; and a control key 30, for conditioning the machine to take a total or a sub-total from the "B" totalizer, said key being designated "B*." If an amount is entered positively into either or both totalizers, it is printed in black (a color designation for positive amounts), but, if it is entered negatively, it is printed in red (a color designation for negative amounts). If the amount set up is entered into one totalizer only, it is printed in the appropriate color and followed by the appropriate symbol "A" or "B," depending upon which totalizer receives the entry. All negative entries are followed by a red minus symbol "—." When a total is taken, it is printed in black if positive, and in red, if negative, the positive total being followed by the symbol "*," and the negative total being followed by the symbol "CR," both symbols "*" and "CR" being printed in the same color as the amount. Moreover, there is an "A" symbol or a "B" symbol following the total or sub-total symbol, designating the totalizer from which the total was taken. In sub-total operations, the amount is printed in the appropriate color and with the totalizer designation, but positive sub-totals are followed by a black symbol "S," whereas negative sub-totals are followed by the symbol "cr."

The control keys on the left side of the keyboard, "A and B," "B*," and "A or B," are not motorized; that is to say, the mere operation of them will not release the machine for operation or initiate a machine cycle, they being control keys only. On the other hand, on the right side of the keyboard, the total key "*," the sub-total key "S," the add key "A," the add key "B," and the non-add key "#" are always motorized, and the subtract key "—" is motorized when the "A and B" key is operated.

When the "B*" selector key is operated, the keys "A," "B," "—," and "#" are locked against operation.

Therefore, it is an object of this invention to provide a two-totalizer adding machine, of the automatic credit balance type, with key-actuated selector mechanism whereby the machine may be preconditioned for a series of entry operations to have each of the amount entries made in both totalizers, regardless of the keys used to initiate a machine cycle, or to have the amount entries made in but one totalizer, that totalizer being determined by the key used to initiate a machine operation.

It is another object of the invention to provide such a machine in which interlocks are provided among the various control keys to prevent misoperation of the machine.

A further object of the invention is to provide means for automatically sensing a totalizer from which a total is taken to determine whether it contains a positive amount or a negative amount.

A still further object is to provide novel symbol-printing mechanism.

With these and incidental objects in view, the invention includes certain novel features of construction and combinations of parts, a preferred form or embodiment of which is hereinafter described with reference to the drawings which accompany and form a part of this specification.

Figure 2:
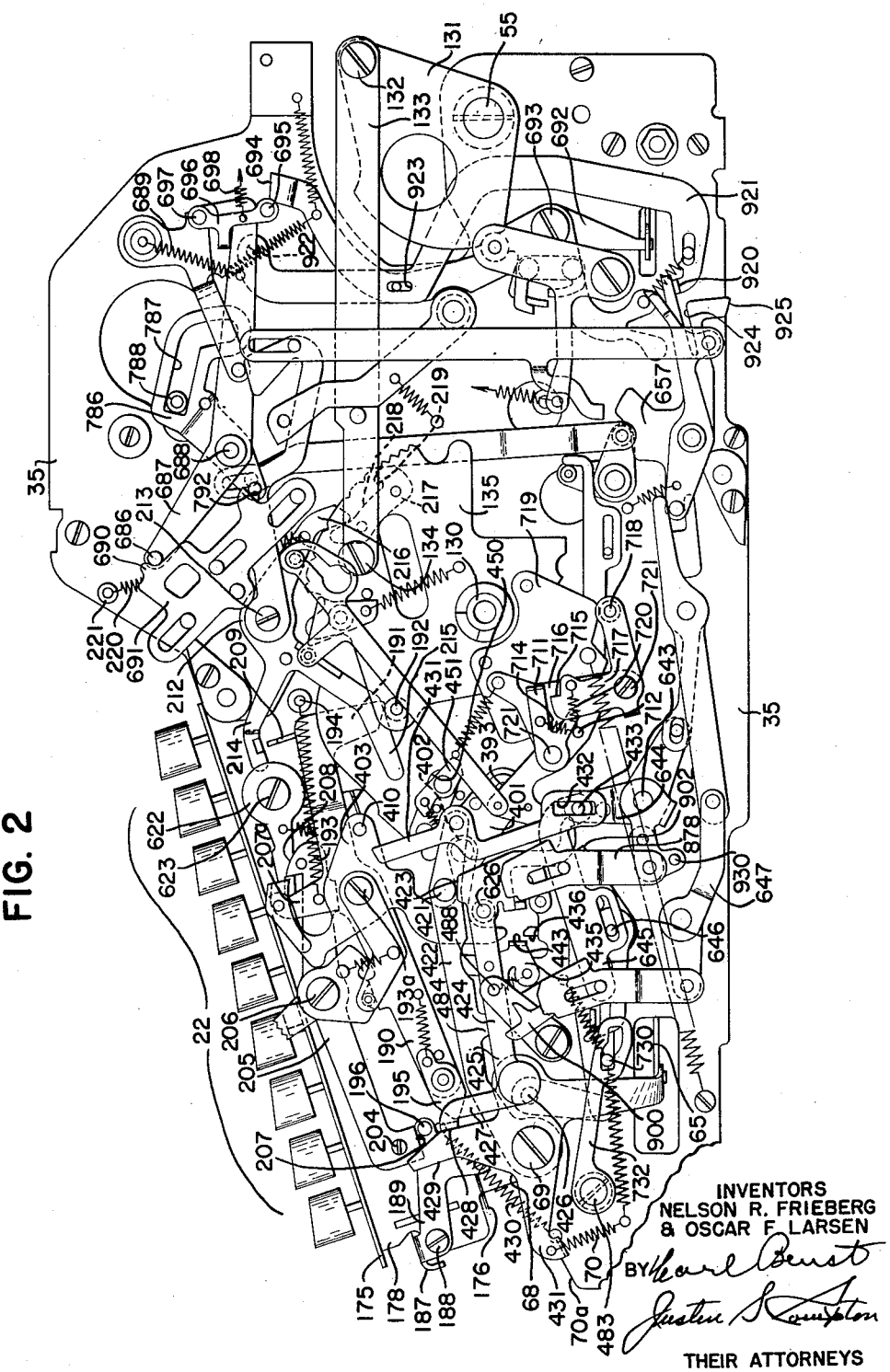
Fig. 2 is a view of the right side of the machine with the case removed.
Figure 2A:
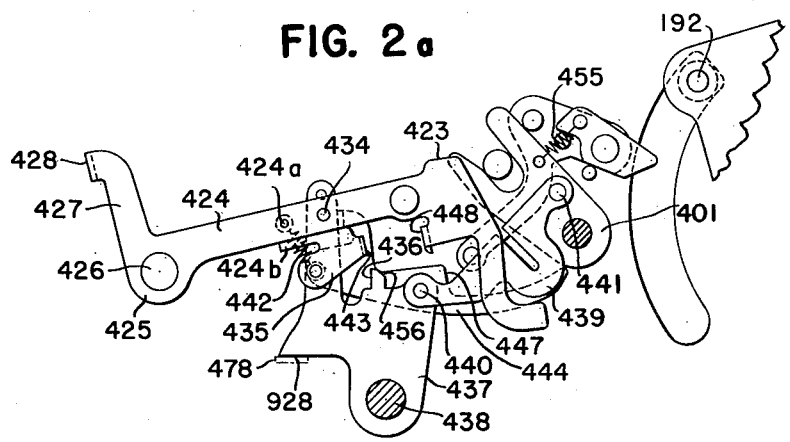
Figure 2B:
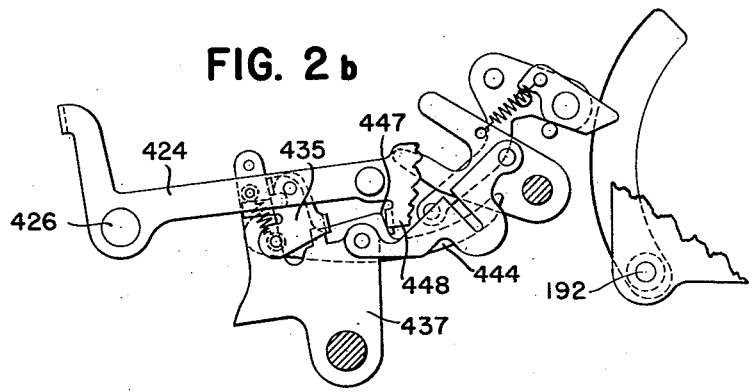
Figure 2C:
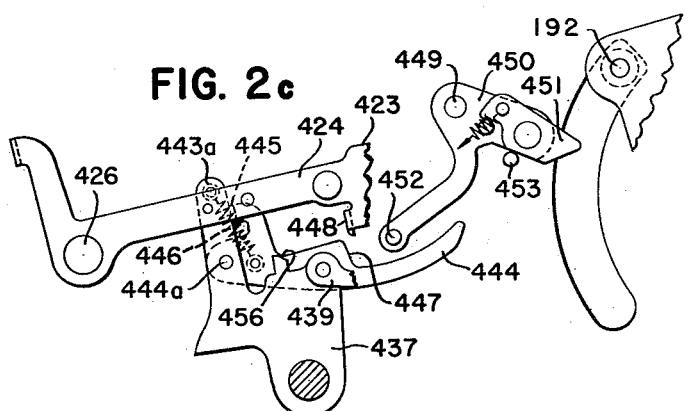
Figure 5:
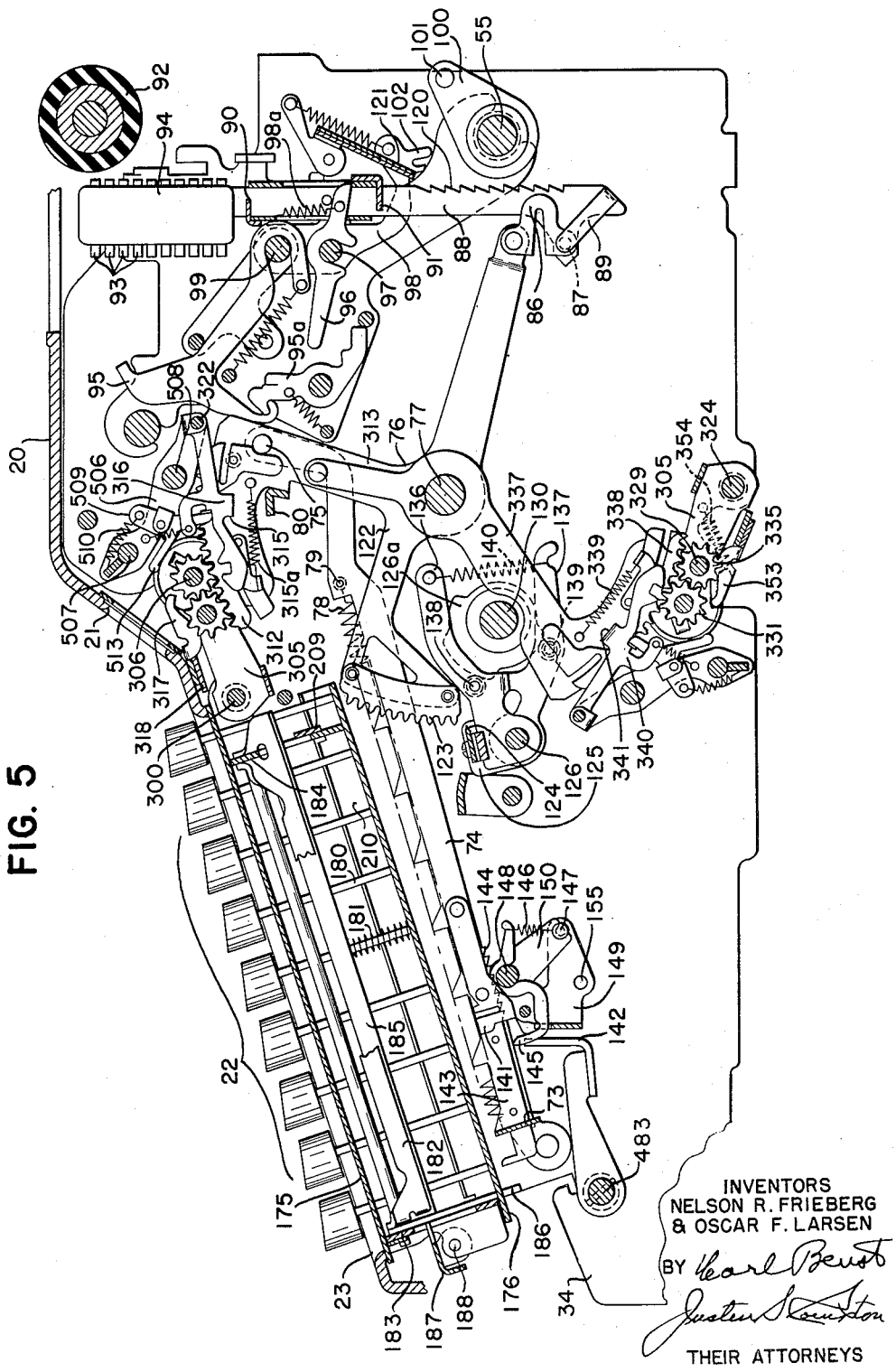
Figure 18:
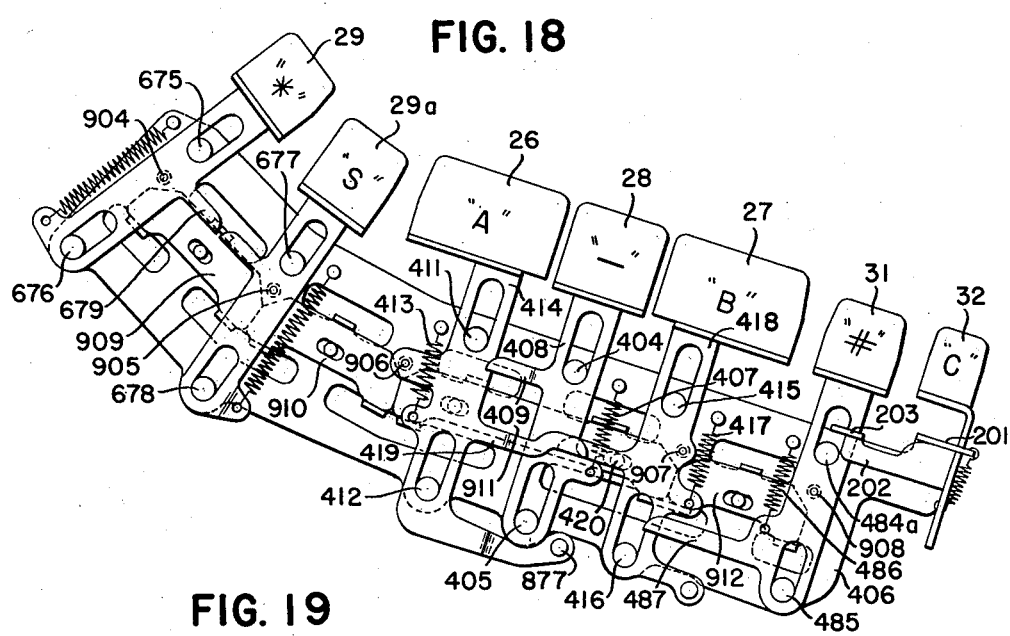
Figure 19:
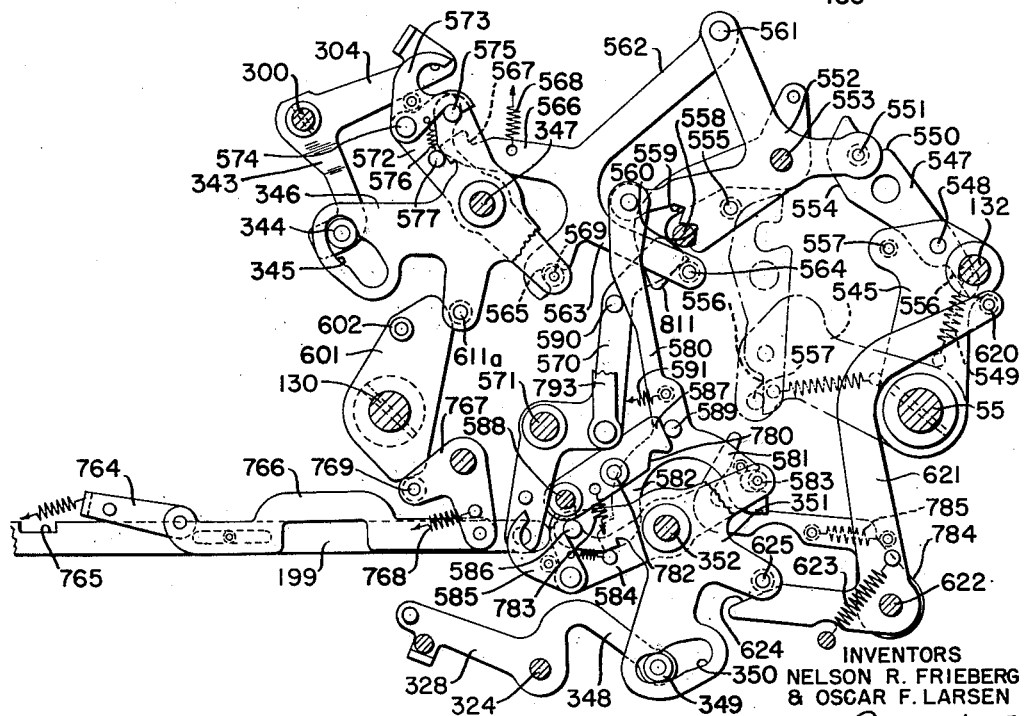
Figure 26A:
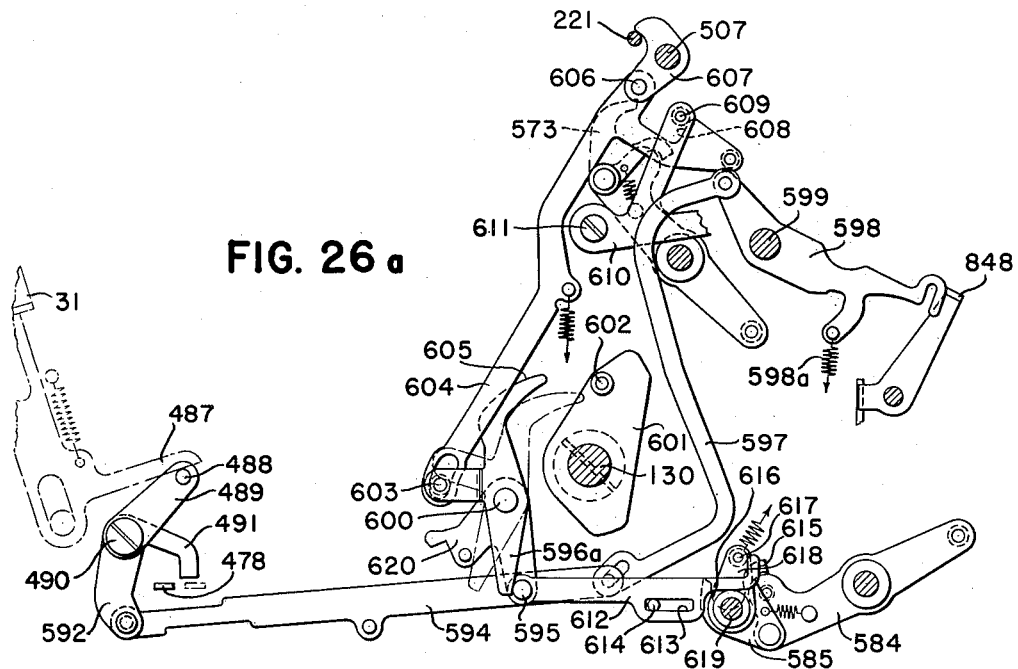
Figure 27:
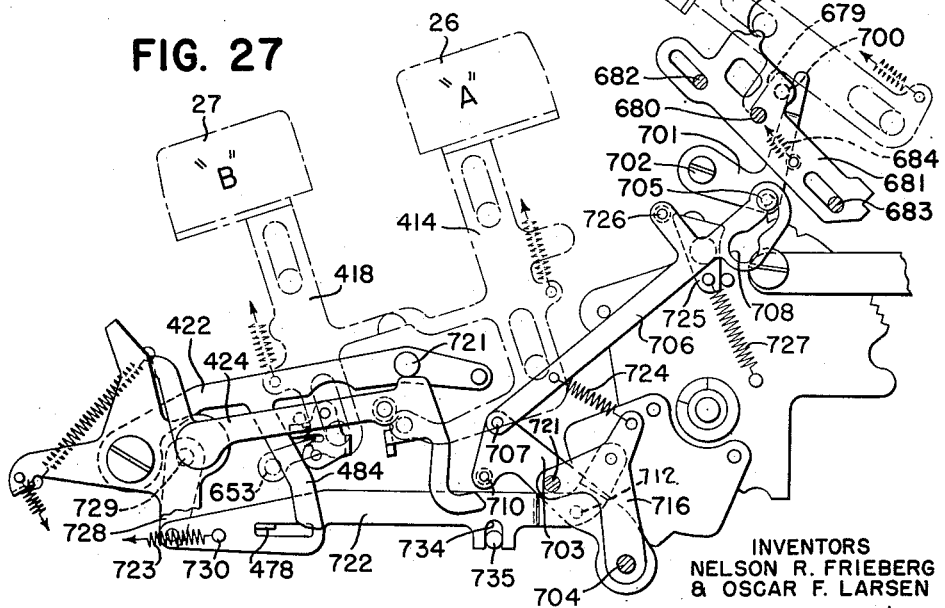
Figure 32:
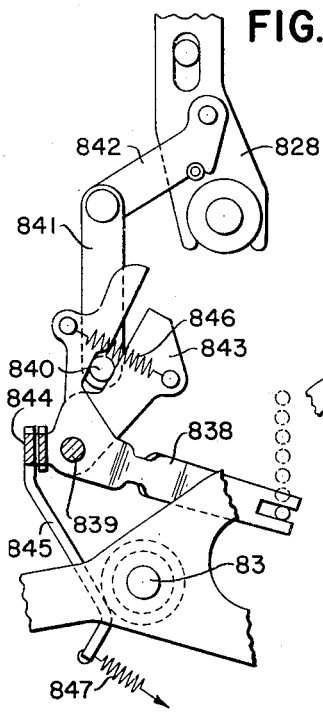
Figure 34:
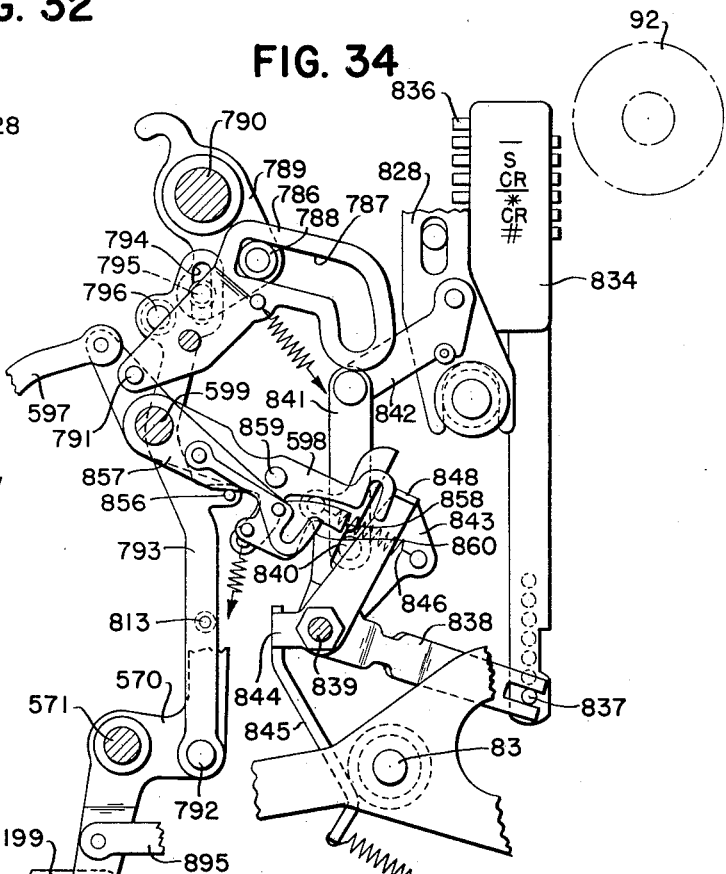
Figure 33:
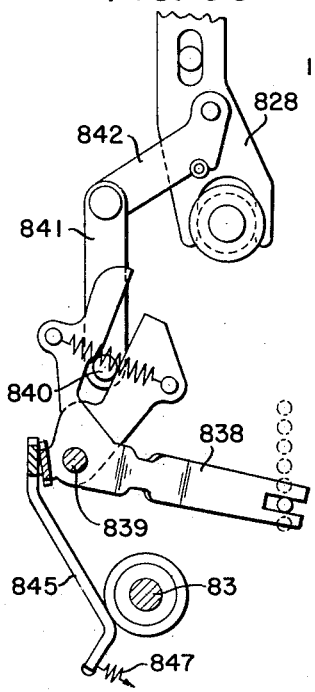
Figure 35:
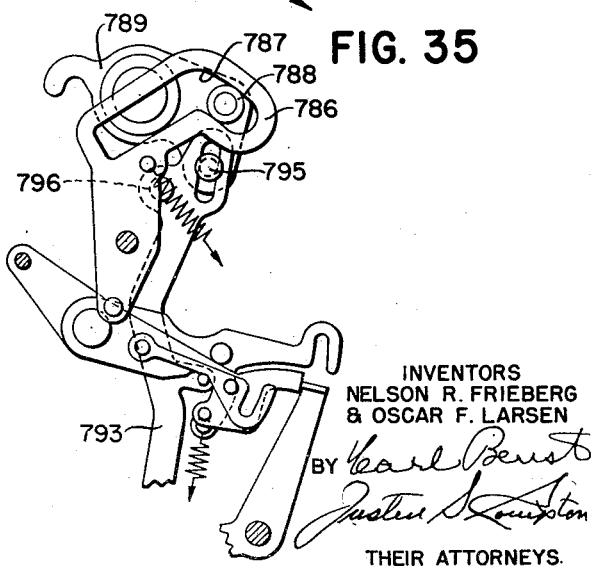

Figs. 2a, 2b, and 2c show the mechanism for locking the subtract controls during a machine operation;

Fig. 3 is a view of the left side of the machine with the case removed;

Fig. 3a is a view of the mechanism for locking the "B*" key during machine operations;

Fig. 4 is a view of the right side of the machine with the case removed, with the right side frame shown in phantom and part of the mechanism attached to its outer side removed;

Fig. 5 is a vertical section from front to rear through the digit keyboard and the differential mechanism;

Fig. 6 is a top plan view of the upper totalizer "A";

Fig. 6a is a top plan view of the lower totalizer "B";

Fig. 7 is a view of part of the mechanism for sensing the positive or negative condition of the "A" totalizer in total-taking operations;

Fig. 8 is an exploded view of a portion of the "fugitive 1" mechanism of the "A" totalizer;

Fig. 9 shows the left side of a totalizer wheel and the associated transfer pawls and transfer lever;

Fig. 10 is a view from the right side of the left end "fugitive 1" mechanism for the "A" totalizer after a subtract operation and just prior to the totalizer's passing from a positive condition to a negative condition;

Fig. 11 is a view like Fig. 10 except that there is superimposed thereon the highest order of the totalizer wheels and associated number drum, and shows the position of the elements after an addition has been made to a positive total;

Fig. 12 shows the same mechanism as Fig. 10, except that the parts are shown in the position which they assume after a negative total has been taken;

Fig. 13 is a broken perspective view of a typical totalizer wheel, its number drum, and its transfer pawl;

Fig. 14 is a facsimile sample of the printing tape produced by the machine, with the various symbols representing the different types of machine operation;

Fig. 15 shows the train of mechanism by which operation of the subtract key "—" conditions the left side control mechanism so that an entry operation will be negative;

Fig. 16 shows the differential stop bar "anti-rebound" mechanism;

Fig. 17 shows part of the total-taking and sub-total-taking mechanism;

Fig. 18 shows the control keys mounted on the right side of the casing as viewed from inside;

Fig. 19 shows part of the "A" and the "B" totalizer engaging mechanism;

Fig. 20 shows the train of mechanism by which the "B" add key disables the "A" totalizer and controls the symbol printing during an entry operation;

Fig. 21 shows a portion of the two-cycle control mechanism for total and sub-total operations;

Fig. 22 shows the train of mechanism by which the "A" key disables the "B" totalizer and controls the symbol-printing mechanism;

Fig. 23 shows the key mechanism by which the machine is conditioned for a series of operations to enter data into both the "A" and the "B" totalizers or into the "A" or the "B" totalizer as selected;

Fig. 24 shows the transmission shaft connecting the "B*" on the left side with the right side mechanism;

Fig. 25 shows the train of "B*" total control mechanism;

Fig. 26 shows the "B*" total key control over the mechanism for determining the shifting of the totalizers in accordance with the positive or negative position of the "B" totalizer;

Fig. 26a shows the non-add control mechanism;

Fig. 27 shows the machine trip mechanism as controlled by the "A" key, the "B" key, and the total key;

Fig. 28 shows the mechanism for setting the "A" symbol type in printing position on entry operations;

Fig. 29 shows the mechanism for setting the "A" symbol type in printing position on total-taking operations and on sub-total-taking operations;

Fig. 30 shows the mechanism for setting the "B" symbol type in printing position on entry operations;

Fig. 31 shows the mechanism for setting the "B" symbol on total-taking operations and on sub-total-taking operations;

Fig. 32 shows the mechanism for setting the symbol type accompanying negative entries, negative totals, and negative sub-totals, this view showing the mechanism in positive normal position;

Fig. 33 shows the mechanism of Fig. 32 in negative position;

Fig. 34 shows the mechanism for controlling the type of operation symbol printing as to kind; that is, whether it is an entry, a total, a sub-total, or a non-add operation;

Fig. 35 shows part of the mechanism of Fig. 34 in moved position to print the symbol "S" in positive sub-total operations, or the symbol "cr" in credit balance subtotal operations;

Fig. 36 is a plan view of part of the printing mechanism for setting up the negative type symbol through the ribbon-shifting mechanism;

Fig. 37 is a view of the ribbon-shifting mechanism; and

Fig. 38 is a view of the drive for the ribbon-shifting mechanism.

General description

The machine is housed in a casing 20 (Fig. 1) having a viewing aperture 21 covered by a glass through which number drums attached to the totalizer pinions of the upper totalizer may be seen, the lower of the two totalizers in the machine not having viewable number wheels. There are ten denominational orders of digit-representing keys 22, projecting through a dust plate 23 in the casing. When first setting the machine into operation for a series of entries, or for a single entry, the operator determines whether the item to be entered or the items to be entered are to be entered into both totalizers or into but one of them. If the item or items are to be entered into both totalizers, the "A and B" control key 24 is depressed if not already depressed, staying in the depressed position after the operator releases his finger, the act of depressing the "A and B" key restoring the "A or B" key 25. Next, the first item is set up on the digit keys, and the machine is put into operation. If the "A and B" key 24 has been depressed, either the "A" key 26 or the "B" key 27 may be depressed to initiate a cycle of machine operation, in which the amount is entered into both totalizers. If the "A or B" key 25 has been depressed, then the operator must select the "A" key 26, or the "B" key 27, with which to initiate a machine operation according to the totalizer into which the amount goes. In the event the amount is to be added subtractively and the "A and B" key 24 has been depressed, the operator only has to depress the subtract key 28, it, under the circumstance of the key 24 having been operated, being motorized. If the key 25 has been operated, then the subtract key 28 must be used in conjunction with either the "A" key 26 or the "B" key 27, depending on where the amount is to go, into the "A" totalizer or into the "B" totalizer. The subtract key 28 is between the "A" key 26 and the "B" key 27 and close enough to each so that a single finger may bridge the "A" key 26 and the subtract key 28 or the "B" key 27 and the subtract key 28. If a total is to be taken from the "A" totalizer, the total key 29 is operated, which will result in a two-cycle machine operation, in which the "A" total is taken and printed, be it either positive or negative. If a total is to be taken from the "B" totalizer, the "B*" key 30 is first depressed and then the key 29 is depressed, the ensuing machine operation being a two-cycle operation in which the "B" total is taken and printed, be it positive or negative. In sub-total operations, the sub-total key "S" is used instead of the total key. In the use of the non-add key 31, the amount is set up on the keyboard and the key 31 is depressed to initiate a machine cycle in which the amount is printed but is not entered into either of the totalizers, the proper symbol appearing after the printed amount to indicate that it is not a part of the total of either of the totalizers. Key 32 is the correction key, which will restore the key 30, or any of the digit keys that may have been operated, to normal position. The machine frame includes a base plate, a left side frame plate 34 (Fig. 3), and a right side frame plate 35 (Fig. 2), joined by various cross shafts, as will be described.

Machine drive

The machine drive, including the motor, the motor switch, the tripping mechanism, and the single-cycle clutch mechanism, is substantially the same as that disclosed in application for United States Letters Patent Serial No. 171,118, of Carl H. Carlson et al., to which reference has been made.

The motor starting switch tripping mechanism is not shown and described in full detail herein, but sufficient is given for an understanding of the invention. For further details, reference may be had to the aforesaid application and to United States Letters Patent No. 2,428,084, which issued on September 30, 1947, on the application of Harry L. Lambert.

The machine is driven through one cycle of operation on add, subtract, and non-add operations, and through two cycles of operation on total-taking or sub-total-taking operations. One cycle consists of the rocking of the main drive shaft 55 (see Figs. 2 and 3) first clockwise, as seen in Fig. 3, and then counter-clockwise, by motor 35a. In two-cycle operations, the shaft 55 rocks twice.

When the motor switch is tripped, it is accompanied by the counter-clockwise turning of shaft 36 (Fig. 3) and three-armed lever 37, secured thereto, through the action of spring 38 anchored to the lever 37 by stud 44 and to the machine framework by stud 39 on plate 40 secured to the left vertical side frame plate 34 by screws 41 and 42. The relatching of the motor switch is made against the tension of spring 38. The motor 35a turns shaft 45 counter-clockwise through reduction gearing. The shaft 45 has secured thereto a notched drive wheel concealed behind crank plate 46, loosely mounted on the shaft. The drive pawl 47, pivoted on the plate 46 by stud 48, is urged in an engaging direction toward the notched drive wheel by spring 49, anchored to the pawl and to stud 50 on the plate 46, but is disengaged therefrom when the machine comes to rest, by reason of stud 64 bearing against a surface on the rearwardly-extending arm of the pawl 47. However, as soon as the three-armed lever 37 rocks counter-clockwise, accompanied by the starting of the motor, pawl 47 is released and engages the notched drive wheel, rotating crank plate 46 counter-clockwise. Shaft 55 has loosely mounted thereon a crank 54, connected to plate 46 by a connecting link 52, pivoted at 51 and 53. Crank 54 is coupled to the main drive shaft 55 by a yielding drive connection, including lever 56, pivoted on stud 53, and a roller 57, mounted on the outer end of the lever. The roller is urged by a strong spring 58 into a notch 59 in the edge of a plate 60, secured to shaft 55. The spring 58 is strong enough to hold roller 57 in the notch to form a driving connection between crank 54 and shaft 55 during all normal operations of the machine. The driving connection will yield, however, to any overload placed on the main drive shaft. As crank plate 46 is about to complete a rotation, a cam arm 61, secured thereto, strikes roller stud 62 on three-armed lever 37, rocking it clockwise to a normal position, in which position it is left in single-cycle operations, as the tripping mechanism latches. As crank plate 46 nears home position, the end of pawl 47 strikes stud 64, disengaging crank plate 46 from the motor shaft. On two-cycle operations, lever 37 is returned to normal position at the end of one cycle, as it is knocked clockwise by arm 61, but, as it is not latched, it immediately returns to its counter-clockwise position before it has a chance to disengage pawl 47. On two-cycle operations, the lever 37 is latched in normal position after two cycles of operation. Whenever lever 37 moves to and is latched in normal position, the motor switch contacts are opened, permitting the rotor thereof to coast to a stop, disconnected from the crank plate 46.

Referring to Fig. 2, the latch is tripped in order to initiate a machine operation by the forward movement of link 65 when multiple-armed lever 68, pivoted to the right side plate on a stud 69, is rocked slightly clockwise, as more fully described in the Carlson application, to which reference has been made. Multiple-armed lever 68 is held in a counter-clockwise position against the frame edge 70a by spring 70.

As viewed in Fig. 2, the main drive shaft 55 rocks first counter-clockwise in the first half of a machine cycle and then clockwise to home position in the last half of the machine cycle, to actuate the differential mechanism and other control mechanisms. Pinned to the right end of main drive shaft 55 is a drive plate 131, pivoted at 132 to a link 133, pivoted at 134 to a drive plate 135, pinned to a secondary drive shaft 130.

Secured between the front end of the right vertical side plate 35 and the front end of the left vertical side frame plate 34 (Fig. 5) is a slotted plate or comb 73, in which the front end of each of a series of denominational stop bars are guided and supported for sliding motion. There is one stop bar for each denominational order. As the stop bars of all orders are constructed the same, a typical order only is shown in Fig. 5 as an example. Stop bar 74 is pivoted at the rear end by a stud 75 to the upwardly-extending arm 313 of a four-armed diverging lever 76, pivotally mounted on a shaft 77, extending between and journaled in the side plates, and is normally urged forwardly by a spring 78, stretched between a stud 79 and the comb 73. The stop bar 74 is normally held against forward movement by a bail 80, extending across the front of the upper arms 313 of all the diverging levers, the bail being held between two arms pinned to shaft 77. The right bail support arm 81 (Fig. 4) has a downwardly-extending portion pivoted to a link 82, having mounted thereon a roller 83, which is held in engagement with the edge of a cam 84, pinned to drive shaft 55. The rear end of link 82 has a forked end 85, which embraces and rides the shaft 55 for support. If the shaft 55 rocks counter-clockwise, shaft 77 will do likewise, causing a forward and downward movement of bail 80 by reason of the urge given by the springs 78, urging the stop bars forward. On return movement of the bail 80, on the clockwise movement of shaft 55, the stop bars will be returned to the rest position, shown in Fig. 5. A rearwardly-extending arm of diverging lever 76 (Fig. 5) is pivoted to one arm of a U-shaped adjusting link 86, the other arm of which is pivoted on a stud 87 of a printer arm 88, where it is retained by a spring clip 89. The printer bar 88 is adjusted vertically in slotted guides 90 and 91, with respect to the paper platen 92, shown diagrammatically, according to the selective positioning of the four-armed diverging lever 76, under control of the digit keys to be described. Printer bar 88, representing a decimal denominational order of the digit keyboard, has at the top end ten vertically-spaced type 93, movable, individually, in a case 94, from the shown position toward the paper platen. The type are urged to the retracted position, shown, by springs within case 94, and the particular type at printing position is struck by a printing hammer 95 when released from the cocked position, at printing time, by the tripping of a latch 95a. When the type bar is selectively raised to printing position, an interponent 96 rocks counter-clockwise on bail 97 under urge of spring 98a. Bail 97 is secured between the arm 98, pivoted on shaft 99, and another arm, like 98, also pivoted on the shaft 99. The bail 97 extends across the printer. The cam lever 100 on shaft 55 is rocked counter-clockwise and then clockwise during a machine operation, and stud 101 thereon strikes the arm 102 on the bail 98, rocking the bail and the interponent toward latch 95a, which is unlatched at mid-cycle, if the type bar 88 has been moved from home position, causing the printing hammer 95 to hit the type at the printing position. The described printing mechanism is duplicated in each denominational order, except that the rearwardly-extending arms of the four-armed diverging levers, like the lever 76, in order to connect to the associated type bars, which are crowded together, as shown at 833 in Fig. 36, instead of being in line with the respective key bank denominations, are bent according to the relative lateral difference in position between a stop bar and its associated type bar.

As in machines of this type, means is provided for printing zeros to the right of the first significant digit in those columns in which a digit key has not been depressed, and for printing zeros in the units and tens orders on total-taking operations when the totalizer is clear at that time, such mechanism not being shown as not being necessary to an understanding of the invention of this application, and attention is directed to the mentioned Carlson et al. application for a detailed discussion of that feature.

The printing mechanism so far described is old, being shown in the Peters United States Patent No. 1,386,021, to which attention is directed.

The rear lower end of each type bar has a series of notches 120, adapted to be engaged by a bail 121 on total-taking operations, after printing, and before disengagement of the totalizer from the differential, to prevent slamming of the differential to fully-operated condition. Such mechanism also does not constitute a part of the invention, and the operating and timing mechanism for this bail has not been shown. A forwardly-projecting arm 122 of diverging lever 76 has mounted thereon an alining rack 123, the ten teeth of which pass in front of an alining bail 124 serving all denominational orders, said bail being rocked toward the rack 123 during the middle part of a machine cycle, so that it is engaged at totalizer-engaging time to hold the levers 76 rigidly in set position. Alining bail 124 is held in a rockable frame including two side arms, the left one of which, 125, is shown, and a bail support rod 126 connecting said side arms. The side arms are pivotally mounted on studs mounted on the inside of the vertical side plates 34 and 35. The alining bar assembly is rocked by cam 126a, secured on cross-shaft 130, journaled in the side plates 34 and 35, and rocked counter-clockwise and then clockwise by drive shaft 55 through plate 131 (see Fig. 2), pivot 132, link 133, pivot 134, and plate 135, pinned thereto. Scissor arms 136 and 137 (Fig. 5), pivotally mounted on cross bar 126, have studs 138 and 139, respectively, which are kept in contact with the edge of cam 126a by spring 140. The alining bar is set in the scissor arm 136, which, when rocked, rocks the alining bar assembly. Cam 126a is so formed as to bring the alining bar into the rack shortly before mid-cycle. As the totalizer comes into engagement with the differential racks on the diverging levers, to be described, just before mid-cycle in item-entering operations, the alining bar holds the racks in perfect adjustment.

On the side of stop bar 74 is an adjustable stop plate 141, the forward end of which strikes comb 73 to limit the forward movement of the stop bar.

Referring to Fig. 17, stop plate 141 is engaged by bail 142, during the first cycle of a total-taking operation, to hold the differential from movement, as will be described later.

To prevent rebound of a stop bar when it is brought to a halt suddenly in its forward movement by a key stem, there is provided on each stop bar a rack 143 (Fig. 16), having rearwardly-pointing teeth 144 adapted to slide over the end of a pawl 145 on the forward motion of the stop bar, said pawl being spring-pressed against the teeth on the forward motion by spring 146, extending between the rear end of the pawl and a cross shaft 147, the pawl being mounted on a shaft 148, held in left and right frame plates, the left one, 149, being shown in Fig. 16. The shaft 147 is also held between the side frame plates corresponding to plate 149 and its mate on the right side of the machine. The spacer and support plates, like plate 150, which are spaced across the machine at intervals, extend between shafts 148 and 147. Shaft 147 acts as a pivot for the framework of the side plate and shaft holding the pawls 145, and Fig. 16 shows the assembly in its normal position when the machine is at rest. As the crank plate 46 starts its clockwise movement, as seen in Fig. 16, as indicated by the arrow, and reaches the point at approximately 180 degrees of its movement, the periphery of the crank plate engages a stud 151 on a lever 152 pivoted to the left frame plate of the machine, the bottom end of said lever being pivoted at 153 to a link 154, which is pivoted at 155 to the anti-rebound pawl assembly. As stud 151 is displaced forwardly, the assembly of pawls is moved away from the teeth 144, so that the stop bars will not be hindered in their return movement on the last half of a machine cycle. At the close of the cycle, the parts again are in the position shown in Fig. 16.

Therefore, all the stop bars are freed from the action of the anti-rebound pawls during the second half of a machine cycle and are free to be moved to home position by the bail 80 (Fig. 5).

*The digit keyboard*

Referring to Figs. 1, 2, 3, 4, and 5, the keyboard unit, in which the digit keys for controlling the movement of the differentials are mounted, has a main frame, including a top plate 175, a bottom plate 176, a left side plate 177, and a right side plate 178, interlocked together by various tongue-and-slot connections into a rigid unit in which the keys are slidably mounted in slots vertically alined in the top and bottom plates.

A typical denominational digit key bank column is shown in Fig. 5, each of the keys 22 having a key stem like key stem 180, extending through the slots with which it is associated, and each having a return spring, like spring 181, which holds the key normally in an undepressed position, from which it is depressible inwardly to an extent that the bottom end of each key depressed may cooperate with the associated stop bar 74, the degree of movement of the stop bar permitted by the depressed key being equivalent to the digit value of the key. The keyboard is of the full flexible type.

As is common with machines of this type, the flexibility of the keyboard is brought about by use of a common member for latching the keys in a denominational row or column in depressed position, the common latching member being moved by depression of a key to an unlatching position, in which any other previously-depressed key is released. In this machine, the latching members consist of a swinging bail 182 for each column, the bail being pivoted on the end plates 183 and 184 of the key bank unit and cooperating with locking formations, not shown, on the sides of the key stems. The particular bail 182 shown in Fig. 5 is the bail that cooperates not with the keys shown in Fig. 5 but with the next bank to the right thereof. The key-latching bail for the bank of keys shown in Fig. 5 is behind zero stop bail 185, which does cooperate with the keys shown in Fig. 5. This zero stop bail also is pivoted in end plates 183 and 184 and is swung outwardly away from the keys by formations on their sides, so that, when a key in a bank is depressed and latched, the zero stop pawl 186, depending from the front end of its associated bail 185 and normally preventing the movement of the stop bar associated therewith, except for such distance as is required to set a zero in the associated printing bar, is moved to one side, allowing the stop bar to move forwardly in the first half of an entry cycle under control of the depressed key. Across the front of the key bank unit is pivoted a key release bail 187, pivoted on a rod 188, supported in the side plates of the key bank unit. On the right end of the bail is a rearwardly-extending arm 189 (Fig. 4), with which the bail may be rocked clockwise, as seen in Fig. 4, to release the latched-down keys of the keyboard, the bail being provided with a comb which rocks the key-latching bails of all the rows of keys away from the latching formations of the associated keys. The key release bail is rocked at the end of each entry operation by lever 190 (Fig. 2), pivoted at 190a to the right side frame of the key bank unit. A rearwardly- and downwardly-extending portion 191 of lever 190 normally abuts against a stud 192 on plate 135. A spring 193, extending between a stud on the upwardly-extending arm of lever 190, is anchored on a stud 194 on the right side plate of the key bank unit and tends to rock the lever 190 clockwise from the position shown, and lever 190 does rock clockwise as plate 135 rocks counter-clockwise on the first half of a machine operation, but is returned to normal position at the end of a machine operation as stud 192 comes into engagement with the rear end 191 of lever 190. During the clockwise movement of lever 190 in the first step of a machine cycle, the by-pass pawl 195 on its front end by-passes stud 196 on key release arm 189, but, on the return counter-clockwise movement of lever 190, the by-pass pawl, not turnable clockwise, engages stud 196, pushing downwardly thereon and rocking the key release bail 187 in key release movement, thus releasing the digit keys near the close of the machine cycle.

During the first cycle of a two-cycle total operation, the lever 197 (Fig. 4), pivoted on the stud 198, is rocked counter-clockwise by the rearward movement of total control link 199 and rocks down on stud 200, rocking the key release bail clockwise to release the keys, as the total-taking operation requires that all the keys be in restored condition.

The correction key 32 (Fig. 18), slidably mounted in a bracket 201, attached to the inside of the casing, has a rearwardly-extending portion 202, having a bent-over ear 203, which is positioned over a flattened portion 204 (Fig. 2) of a stud on the forward end of a lever 205, pivoted on pivot 206, supported by the side frame of the keybank unit. The downwardly-extending front end 207 of lever 205 rests on stud 196 of the key release arm 189, and, therefore, when the correction key 32 is depressed, the key release bail 187 is rocked clockwise around pivot 188, releasing the keys. The lever 205 is held against a stop, which prevents it from rocking clockwise past the position shown in Fig. 2, by a spring, neither the stud nor the spring showing in the drawings.

Arm 207a of lever 190 has a rearwardly-extending ear, which slides over the arcuate surface 208 on lever 205 during the progress of a machine cycle, preventing the movement of lever 205 by the correction key 32. Slidably mounted between the rear ends of the side plates 177 and 178 of the key bank unit (Figs. 2, 3, and 5) is a key lock slide 209, which cooperates with key-locking bails, like bail 210 (Fig. 5), running lengthwise of each column of digit keys in such a fashion that, when the slide is pushed to the left, the keys are released for operation or for restoration to normal position, whereas, when the slide is in its right-hand position, the keys are locked in either unoperated position or in depressed position, as the case may be, with the particular key. This slide is controlled by and cooperates with the main operating means to lock the keys at the commencement of a machine cycle, so that they may not be tampered with during the machine cycle, and to prevent a machine cycle from commencing, if a key is in an intermediate position between normal position and fully-depressed position, which would cause a misoperation of the machine. The digit-key-locking mechanism is shown in more detail in United States Patent No. 2,062,731, which issued December 1, 1936, on the application of Charles Schroder.

Referring to Fig. 3, the key lock slide 209 is normally pushed to the right by spring 211, attached to the left side plate of the key bank unit. This right position is the key-locking position, and it is necessary, in order to operate the keys, for the slide 209 to be moved to the left against the counter-force of spring 211. Referring to Fig. 2, the digit keys normally are unlocked because the rear end of lever 190 bears against a beveled surface of the right end of slide 209, keeping said slide in the left position when the machine is at rest. As a machine operation commences, the rear end of lever 190 is lowered, allowing the slide 209 to move to the right in locking position. At the end of a machine cycle, the lever 190 is returned to the position shown in Fig. 2, moving the slide to the left, unlocking the keys so that they may be restored. A three-armed lever 212, pivoted on stud 213, has an upwardly- and forwardly-extending arm 214, which, when lever 212 is rocked counter-clockwise, engages a notch in slide 209 if said slide is in its right-most position, in which the keys are locked. When arm 214 so engages the notch in slide 209, the slide cannot be pushed to the left to unlock the keys. A lower and forwardly-extending arm 215 of lever 212 bears against stud 192 on plate 135 and, in the rest position of the machine, shown in Fig. 2, holds the lever 212 rocked to its most clockwise position, where it is not in contact with slide 209. Under these circumstances, the rear end of lever 190 is able to push in the slide 209 to the left. A rearwardly-extending arm 216 of lever 212 has a pointed end, which engages a notch in plate 217, secured on the inside of plate 135, and the said notch 218 has a stop surface 219, so that, if arm 216 is in the position shown in the drawing, the plate 135 can move only slightly in its counter-clockwise movement on the first half of a machine operation, thus disengaging the drive mechanism as stud 57 (Fig. 3) comes out of its notch. If, however, the lever 212 rocks clockwise sufficiently for the arm 214 to engage the notch in the slide 209, the pointed end of arm 216 will be raised out of the notch in plate 217, so that it will not strike surface 219 to interrupt a machine cycle. As plate 135 commences its movement on the first half of a machine operation, the stud 192 will move away from arm 215, which will follow it until the arm 214 either strikes the unnotched top edge of slide 209, in which event the point of arm 216 will not clear the surface 219 of the notch 218, or it will enter the notch in slide 209, and the pointed arm 216 will clear the surface 219, permitting the machine operation to continue. Arm 214 will not drop into its notch if any key is in partially-operated condition, as slide 209 cannot move to the right, and the machine operation will be halted. As the plate 54 (Fig. 3) completes the cycle, the main drive shaft 55 will be reengaged with it as stud 57 drops into its notch.

The lever 212 (Fig. 2) is normally urged counter-clockwise around pivot 213 by spring 220, anchored to the rearwardly-extending arm 216 and to a stud 221 on the right side plate.

*Locking of "B" total control key during a machine operation*

The key lock slide 209 has another function in connection with the locking of the "B" total control key 30 (Fig. 3), said slide working in conjunction with the key release bail 187, which in key release movement rocks counter-clockwise, as seen in Fig. 3. It is necessary to lock the "B" total control key 30 either in normal position or in depressed operated position during a machine cycle, either in an entry cycle or in a total-taking two-cycle operation, to prevent a misoperation of the machine. The "B" total control key 30 has a key stem 225 (see also Fig. 3a), which is slidably mounted in alined slots in auxiliary plates 226 and 227, secured to the left side plate of the key bank unit, and is held in an "up" position by a spring 228, anchored to a forwardly-extending arm at the lower end of the key stem 225, and to a stud 244, extending from the left side plate 177 of the key bank unit.

The upward movement of "B" control key 30 is limited by a shoulder, on the bottom end of the stem, which makes contact with auxiliary bracket 227, and its downward motion is limited by another shoulder's striking against auxiliary plate 226. Slidably mounted on studs on the side plate 177 of the key bank is a slotted slide 229, one of the slots 230 and its associated stud 231 being shown in Fig. 3, and the forward slot and associated stud being hidden from view. This slide has a forward and backward movement and is coupled to key lock slide 209 by a bell crank lever 232, pivoted on a stud 233, fastened to a bracket extending from the side frame of the key-bank unit. A rearwardly-extending arm of bell crank 232 has a tenon which is received in a slot in the left end of slide 209, and has a rightwardly-extending arm which is pivoted to an ear 234 on the slide 229, so that, if key lock slide 209 is moved to the left in key-unlocking position, the slide 229 will be moved rearwardly, whereas, if slide 209 moves to its right position in key-locking position, then the slide 229 will move forwardly.

Referring to Fig. 3a, the rear end of the "B" total control key 30, stem 225, has two notches 235 and 236, which may be engaged by a bent-over ear 237 on slide 229. When the key 30 is depressed in operated condition, the notch 235 may be engaged by ear 237 when the slide 229 moves forwardly, and, when the key is in the undepressed condition, the ear 237 may engage notch 236 when the slide 229 is in its forward position. If, however, slide 229 is moved rearwardly by the leftward movement of slide 209 (Fig. 3), then the ear 237 (Fig. 3a) disengages from either notch, allowing the key to restore or be depressed, as the case may be. In this manner, the "B" total control key 30 is locked in either normal raised position or depressed position during a machine operation when the digit keys are also locked. As the key lock slide 209 moves to the left (Fig. 3) on each cycle of machine operation, the "B" total control key will be unlatched between the first and second cycles of a total-taking operation or between the first and second cycles of a sub-total-taking operation, as far as the effectiveness of ear 237 is concerned. If the "B" total control key 30 is depressed and a two-cycle operation is initiated, it must be held down throughout the first cycle of operation and over into the second, in order to condition the totalizer selecting mechanism, to be described later, to take a total from the "B" totalizer only, by disablement of the "A" totalizer engaging mechanism. A second latch is provided for the purpose of latching down the said "B" total control key 30 between cycles of a two-cycle operation.

Slidably mounted on studs 240 and 241 (Fig. 3), mounted in side plate 177 of the key bank unit, is a second latch plate, 242, for the "B" total control key, said studs extending into slots in the plate 242, permitting a short forward and backward movement thereof. Plate 242 is kept in its forward position by a spring 243, extending between stud 241 and stud 244 on the latch plate 242.

In the rear end of latch plate 242 is an aperture 245, embracing a stud 246 on the "B*" key stem 225. The aperture 245 has a shoulder formation 247, by which, when key 30 is depressed, the stud 246 may be engaged to hold the key 30 in depressed position. As the key 30 is pressed downwardly, the stud 246 rides on a camming surface of the formation 247 until the camming surface is passed, at which time the plate 242 moves forwardly to latch the key 30 in depressed position. Key release bail 187 has a rearwardly-extending arm 248, having a stud 249 thereon, and the forward end of latch plate 242 has a by-pass pawl 250, which can be rocked downwardly about its pivot 251—that is to say, in a clockwise direction, as seen in Fig. 3—by stud 249, as the digit key release movement of the bail 187 occurs, it being remembered that the digit keys are released as the bail rocks counter-clockwise, as seen in Fig. 3. The engagement of stud 249 with by-pass pawl 250 on this digit key release movement merely rocks the by-pass pawl 250 clockwise, without any action on plate 242, but, on the return of bail 187 to normal position, the stud 249 strikes surface 251 on by-pass pawl 250, pushing plate 242 rearwardly, releasing the latched-down key 30. Referring to Fig. 4, lever 197, which acts on stud 200 of the key release bail in a total-taking operation or in a sub-total-taking operation, rocks counter-clockwise, as seen in Fig. 4, at the beginning of the first cycle of operation, releasing the digit keys, but such movement of bail 187 is not operable to push latch plate 242 (Fig. 3) rearwardly, as stud 249 merely passes the pawl 250. The lever 197 (Fig. 4) does not return to the normal position, shown in Fig. 4, until near the close of the second cycle of machine operation, and, hence, as the rearward movement of latch plate 242 (Fig. 3) does not occur until this return to normal movement of the bail 187, the "B*" control key 30 cannot return to normal position until close to the end of the second cycle of a two-cycle operation, such as that required for total-taking and sub-total-taking.

Therefore, it takes the combined movement of slide 209 to the left, which occurs near the end of a machine operation, and the return movement of bail 187 near the close of the second operation of a two-cycle total-taking or sub-total-taking operation to release the said key 30.

The foregoing mechanism is provided with another latch plate 270 to lock the "B" total control key 30 in upward unoperated position during the period of a total-taking operation, under control of the "A" total control key. As all total-taking and sub-total-taking operations consist of two cycles, there is a period between the first and second cycles when the latch slide 209 for a brief instant is moved to its left position, unlocking the "B" total control key, and, if an operator put pressure on that total control key during the total-taking or sub-total-taking operation under control of the "A" total-taking mechanism, there would be a possibility that the "B" total control key could be depressed between the first and second cycles, thus causing a misoperation of the machine. Latch plate 270 is provided with two slots, by which it is mounted on studs 240 and 241 for forward and backward movement, being urged rearwardly by a spring (not shown) to a latching position in which a shoulder 271 thereon comes under stud 246 on the "B" total control key stem 225, if that key is in unoperated position. The forwardly- and downwardly-projecting tail of latch plate 270 normally rests against the stud 249 on arm 248 of key release bail 187, holding latch plate 270 in its forward position, where it is ineffective to latch the "B" total control key in undepressed position. However, as the bail 187 is rocked counter-clockwise, as seen in Fig. 3, at the commencement of the first cycle of a two-cycle total-taking or sub-total-taking operation, the stud 249 moves away from engagement with latch plate 270, allowing it to follow the urge of its spring and to come in so that shoulder 271 on the rear end of it comes under stud 246, holding the "B" total control key in unoperated position. As the key release bail 187 does not return to the normal position, shown in Fig. 3, until the end of the second cycle of the two-cycle operation, the latch plate 270 is effective during the period between the first and second cycles when the latch plate 229 is ineffective.

*Latching mechanism for the "A and B" and "A or B" control keys*

Each of the keys 24 and 25, the "A and B" key and the "A or B" key, respectively, has a stem which is slidably mounted in alined slots in the auxiliary brackets 226 and 227. As can be most clearly seen in key 24, there are, in the rear edge of the key stem, two slots, 255 and 256, by which the key may be locked in unoperated position, or in depressed position by ear 257 on the slide plate 229. The key stem of key 25 is constructed in the same manner and cooperates with another ear on slide 229. The key 24 has, on a forwardly-extending part of the lower stem end, a stud 258, and there is a similar stud 259 on the lower end of the key 25. Studs 258 and 259 extend into associated slots in opposite ends of a lever 260, pivoted at 261 on a stud secured to a downward extension of auxiliary bracket 227.

Under the circumstances of this construction, when key 24 is depressed, key 25 must come out to undepressed position, and vice versa. The locking of the described see-saw mechanism is under sole control of slide 209, and the keys 24 and 25 cannot be operated unless the machine is at rest. A homing pawl 262 is pivoted at 263 on a stud secured to the left side plate 177 of the key bank unit and is urged by spring 264 to make contact with stud 258. Pawl 262 has two notches in it, the upper one of which notches engages the stud 258 when the key 24 is in undepressed position, and the lower of which notches is engaged with the stud 258 when the key 24 is in depressed position. The aforesaid spring-pressed pawl assures that the keys 24 and 25 are firmly held in either the up or the down position. The functional control of keys 24 and 25 will be described later.

*The totalizers*

There are two totalizers in the machine, one in the upper part of the machine, the number drums of which can be seen through aperture 21 (Fig. 5), and the other, the number drums of which cannot be seen, located in the bottom of the machine approximately directly under the one in the upper part of the machine. The upper totalizer is shown in Fig. 6 and will be termed the "A" totalizer, and the lower totalizer is shown in Fig. 6a and will be termed the "B" totalizer. The construction and operation of the two totalizers are the same in all important respects, and the upper totalizer "A," shown in Fig. 6, will be used to explain the details of the construction of both totalizers. The "A" totalizer is mounted in a frame including a shaft 300, journaled in bearings 301 and 302, mounted, respectively, in side frame plates 34 and 35; a left support arm 303; a right support arm 304; intermediate support arms 305; and a shaft 306, extending between the rearwardly-extending ends of support arms 303 and 304 and passing through the support arms 305. The "A" totalizer wheels, such as wheel 307, of which there is one for each denominational order, are rotatably mounted in spaced relation on shaft 306. Each totalizer wheel (Fig. 13) has a ten-tooth pinion 308, to which is attached an indicator drum 309, bearing on its periphery ten digit numerals spaced correlatively to the teeth of the associated pinion.

On the left side of each indicator drum is a transfer pawl member having a subtract tooth 310, used in subtracting and negative-total operations, and an add tooth 311, spaced 36 degrees therefrom with reference to the pinion circumference and spaced leftwardly from tooth 310, as viewed from the front of the machine, said add tooth being used in add and positive-total operations. Referring back to Fig. 6, shaft 300 and the associated totalizer framework secured thereto are shiftable leftwardly from the position shown, which is the adding position, to a subtract position. In the add position, shown in Fig. 6, the pinions are in alinement with differential actuator racks 312, which are mounted on the upwardly-extending arms 313 (see Fig. 5) of the four-armed diverging levers 76. When the totalizer frame is moved to subtract position through the shifting of shaft 300 to the left, the racks 312 of the differential four-armed diverging levers are in line with teeth on intermediate idler pinions. The idler pinion 314 for the units order is mounted on arm 304, whereas the idler pinions for the higher orders are mounted on spacer arms 305. The idler pinions have a set of teeth in mesh with the associated add pinions 308, and another set of teeth separated by a peripheral groove, which are adapted to engage the racks 312.

Referring to Fig. 5, rack 312 is mounted by pin-and-slot connections to an arcuate upward portion of the upper arm 313 of the four-armed diverging lever 76 and has a freedom of movement in an arcuate manner of one tooth step and is normally urged rearwardly by a spring 315a. The rack has a bent-over ear, which engages an ear 315 of a corresponding transfer lever 316 when the diverging lever is in home position, keeping the rack in its forward position against the urge of spring 315 to move it rearwardly one step. The racks of the other orders are constructed and function in the same manner. The pinions of the totalizer are in engagement with the corresponding differential racks when the machine is at rest, the add pinions being in mesh with the totalizer when the totalizer is shifted in the add direction, and the idler pinions being in mesh with the racks when the totalizer is shifted in a subtract direction.

During an entry operation of the machine involving the "A" totalizer, the totalizer frame of the "A" totalizer is swung counter-clockwise slightly at the beginning of a machine cycle to a point where the pinions are disengaged from the associated racks and come into engagement with alining pawls, such as pawl 317. Pawls, like pawl 317, are secured to a plate 318, pivoted on shaft 300 (see also Fig. 6), and, when the totalizer is in engagement with the associated totalizer pinions, an ear 319 on the plate 318 strikes the edge of left side frame 34, rocking the plate and the supported alining pawls away from the totalizer pinions, against the urge of spring 320, which tends to engage the pawls with said pinions. The parts are so adjusted that, when the totalizer swings out of engagement with the associated racks, they immediately encounter the associated pawls, which are then lifted on the last part of the totalizer-disengaging movement, so that the pawls are held in contact with the pinions by the spring 320. Thus the pinions may reengage in proper alinement with the rack teeth on the reengaging movement.

Ear 321, extending from the support arm 303, also makes contact with the edge of the left side plate 34 to properly adjust the depth of engagement of the totalizer pinions with the racks. Suppose, now, that it is desired to enter an amount into the "A" totalizer: the "A or B" key is depressed, the amount is set up on the digit keys, and the "A" add motor bar 26 is operated. This initiates the machine cycle, and, with mechanism to be described, the "A" totalizer is immediately disengaged from the associated racks, and the four-armed diverging levers and the corresponding stop bars will either move against the zero stop pawls or be allowed to move against the depressed key stems, according to whether a key has been operated in the particular bank in question. The four-armed diverging levers are set at the proper angular displacement shortly before mid-cycle. At that point, the "A" totalizer is rocked to engage with the displaced racks, and thereafter, as bail 80 is moved to home position, the racks enter in the totalizer pinions the amount set up on the keyboard. Of course, if the subtract key has been used in conjunction with the "A" key, the operation of the machine will have also moved the totalizer to the left, to subtract position, and the racks will engage with the idler pinions instead of the main pinions, and the amount will be entered into the totalizer negatively. If any totalizer pinion had an amount thereon before the entry just described, and such entry carries the pinion thruogh zero, either positively or negatively, the associated transfer pawl 310 or 311 will rock the associated transfer lever 316 counter-clockwise about its supporting rod 322 and permit the rack of the next higher order to move the additional step, as the ear 315 extends into the path of the rack of next higher order.

The shifting of the "A" totalizer is accomplished by a cam which engages the roller 323 (Fig. 6) on the left end of the shaft 300, in a manner to be described in connection with the conditioning of the machine for a subtract operation.

The "B" totalizer shaft 324 (Fig. 6a) is journaled in bearings 325 and 326, supported in the left side plate 34 and the right side plate 35, and has thereon the support arms 327 and 328, which support the totalizer pinion shaft 329 in their outer ends. As in the "A" totalizer, there are intermediate support plates 330 between each two totalizer pinions. Each of the totalizer wheels consists of a pinion 331, a number drum 332, an add transfer pawl 333, and a subtract transfer pawl 334, just as is the case with the pinions of the "A" totalizer. Each of the totalizer wheels of the "B" totalizer also has an idler pinion 335 attached to the adjacent spacer plate 336 or to the side arm 328, with respect to the units order.

Referring to Fig. 5, on a lower extending arm 337 of each diverging lever is a rack 338, mounted thereon by pin-and-slot mounting, so that it may move in an arcuate manner one tooth space in response to the urge of spring 339, which rack has teeth normally in engagement with the add totalizer pinions 331 or the subtract idler pinions 335, depending on whether the totalizer is shifted to the add position or to the subtract position. Each of the totalizer pinions has associated therewith a transfer pawl 340, which may be tripped as the totalizer pinion 331 passes through zero in either a negative or a positive direction, and has an ear 341, which extends into the path of the rack of next higher order normally, but which is moved upon the transfer lever's being moved, so that the rack of next higher order gets a movement of one tooth to add a carry-over unit thereto.

Just as with the "A" totalizer, the "B" totalizer is rocked out of engagement with the racks on an entry operation in which the "B" totalizer is involved on the first half of a machine cycle and rocked back into engagement with the associated racks on the second half of a machine cycle in which an entry is made to enter the number set up on the keyboard.

By means to be described, in a machine operation it may be predetermined that either the "A" totalizer or the "B" totalizer, or both the "A" and the "B" totalizers, may be selected for operation during a given entry operation. In total-taking operations, by means to be described, one totalizer only is selected for total-taking or sub-total-taking.

The "B" totalizer may be shifted for the type of operation, negative or positive, by the action of a "B" totalizer shifting cam on roller 342 (Fig. 6a).

Referring to Fig. 19, the right side plate 304 of the "A" totalizer has a downwardly-extending arm 343, having a roller stud 344, which engages in a cam slot 345 of a totalizer-engaging plate 346 pivotally mounted on a stud 347 secured in the right frame plate of the machine. Fig. 19 shows the condition of the totalizer between operations of the machine; that is to say, with the totalizer in engagement with its associated racks.

If, now, the totalizer-engaging plate 346 is rocked clockwise from the position shown, the side plate 304 of the "A" totalizer, which is pinned to the shaft 300, will be rocked counter-clockwise, as roller 344 moves into the lower end of the slot 345. This will disengage the totalizer, and reverse movement of plate 346 to the position shown will reengage the totalizer with its pinions. In a like manner, the right side plate 328 of the "B" totalizer has a lower extending arm 348, which has a roller stud 349, which extends into a cam slot 350 in the "B" totalizer engaging plate 351, pivotally mounted on support stud 352, secured to the right side plate 35 of the machine. The selective control of the movement of these totalizer-engaging plates 346 and 351 constitutes part of the improved mechanism provided by this invention and will be described in detail later.

The clockwise movement of "B" totalizer-engaging plate 351 will disengage the "B" totalizer, and its return movement will reengage it with its pinions.

The "B" totalizer also has a set of pawls, like pawl 353 (Fig. 5), there being one pawl for each totalizer pinion in line therewith, said pawls being mounted on a frame supported by shaft 324 and spring-urged by spring 354 (see also Fig. 6a), the pawls being held out of engagement with the pinions while the pinions are in engagement with the associated racks, but immediately engaging the pinions as they are withdrawn from the associated racks.

*Conditioning the machine for a subtract entry operation*

Referring to Figs. 3 and 15, there are pivotally mounted on the left side frame plate 34, by studs 358 and 359, slotted cams 360 and 361. The cam slots are in the periphery of the cams, cam slot 363 (Fig. 7), associated with the "A" totalizer, being typical.

Pivoted to cam 360 is a lever 364. Lever 364 has a shoulder formation 368 and a shoulder formation 369, adapted, respectively, to be engaged by studs 371 and 372 on a plate 370, secured to the cross shaft 130, which oscillates first clockwise and then counter-clockwise in a machine operation, as seen in Fig. 3. Lever 364 has a slot 365, in which rides a stud 366 on a link 367. If link 367 is pulled forward, the lever 364 is rocked counter-clockwise around its pivot on cam 360, bringing shoulder 369 into the path of movement of stud 372 as plate 370 oscillates in its clockwise movement during the first half of the machine cycle. If link 367 is positioned rearwardly as shown in Fig. 3, the stud 371 will move, on the first half of the machine cycle, toward surface 368. In the position of the lever 364, as shown in Fig. 3, the cam 360 is rocked in its most clockwise direction, and the totalizer "A" is in its right position, which is the position for positive entries and positive totals or sub-totals. In this condition of the mechanism, as the machine is set into operation, the stud 372 moves without effect around the arcuate surfaces 373, and the stud 371 moves toward the shoulder 368, but, the lever 364 being in the uppermost position, the stud 371 just makes contact with the shoulder 368. When link 367 is moved forwardly, by means to be described, and the lever 364 is rocked so that surface 369 is in line with the path of movement of stud 372, on the first half-cycle of an ensuing operation, the lever 364 will be drawn downward as stud 372 is forced against the surface 369, pulling down lever 364, rocking cam 360 counter-clockwise, and shifting the totalizer to the negative position. At the conclusion of the operation, when the subtract key mechanism on the right side of the machine is restored, the link 367 is moved rearwardly, so that shoulder 368 is in the line of movement of stud 371. If the next operation is an add operation, then, on the first part of the machine cycle, the stud 371 will strike the surface 368, which is then in its lower position, moving the lever upward and shifting the cam 360 clockwise to shift the totalizer to the positive position, to the right. Cam 361 for the "B" totalizer is shown in Fig. 3 in the same add position and is rockable around pivot 359 by a link 375, pivoted to an arm on cam 361 and pivoted to a plate 376, pivoted to stud 377. If plate 376 rocks counter-clockwise, as shown in Fig. 3, the cam 361 is rocked counter-clockwise, bringing the "B" totalizer into negative position; that is to say, shifted to the left. To plate 376 is pivoted a lever 378 of a shape corresponding to lever 364, associated with the "A" totalizer shifting cam 360, said lever 378 having a slot 379, in which rides a stud 380 on a link 381. Lever 378 has a shoulder surface 382, which coöperates with stud 371, and has a shoulder surface 383, which cooperates with stud 372 on plate 370. In the position shown on the first oscillation of the plate 370 in the first half of the machine cycle, the stud 371 will ride over arcuate surface 384, and stud 372 will not travel far enough toward the surface 383 to move link 378. If, now, link 381 is moved rearwardly, the lever 378 is rocked about its pivot in a counter-clockwise direction, so that shoulder surface 382 is in the line of travel of stud 371, and, on the first half of the ensuing machine cycle, the stud 371, by hitting surface 382, will lift up on lever 378, rocking plate 376 and cam 361 counter-clockwise to move the "B" totalizer to the left, its negative position. Link 367 has, in its rearward end, a slot 385, which embraces a stud 386 in one arm of a bell crank lever 387 pivoted at 388 to a stud in the side frame 34. The other end of the bell crank has secured thereto a spring 389, anchored on a stud on the machine frame under tension, which tends to rock the bell crank lever 387 clockwise around its pivot 388, holding the stud 386 in the rear end of slot 385. The forward end of link 367 has a slot 390, embracing a stud 391 on a lever 392, pinned to a cross shaft 393, journaled in the side frame plates 34 and 35.

By the construction shown, wherein spring 389, through stud 86, pulls rearwardly on link 367, the stud 391 rides in the forward end of slot 390. There is a slot 394 in the rear end of link 381, which embraces a stud 395 on a lever 396 pivoted on stud 397 held by the side frame plate 34, the upper extending end 398 of lever 396 bearing against stud 386 of bell crank lever 387. This construction holds lever 396 rocked counter-clockwise, so that the stud 95 rests in the forward end of slot 394. The forward end of link 381 has a slot 399, which engages a stud 400 on the lower end of lever 392, said stud, by reason of the forward thrust of link 381 through stud 395, resting in the rear end of the slot 399. Pinned to the right end of shaft 393 (Figs. 2 and 15) is a bifurcated lever 401, its bifurcated end being engaged by a stud 402 on a rearwardly-extending arm of subtract control plate 403, pivoted on stud 193a, held in the right side frame plate 35.

Referring to Fig. 18, the subtract key 28 is slidably mounted on studs 404 and 405, mounted on a bracket 406, secured to the inside of the casing. It is normally urged to its elevated, ineffective, position, by a spring 407, extending between a forwardly-extending arm of the key stem 408 and a stud on bracket 406. Subtract key 28 has a rearwardly-extending arm 409, which, when the said subtract key is depressed to operated position, strikes stud 410 (Figs. 2 and 15) on subtract control plate 403, rocking it clockwise, as seen in Fig. 2. As subtract plate 403 is so rocked clockwise, the bifurcated lever 401 is rocked counter-clockwise, and, referring to Fig 3, the lever 392 is rocked clockwise, moving the levers 364 and 378 to the subtract position, whereupon, on the commencement of the next ensuing machine cycle, the totalizers "A" and "B" will be shifted to subtract position, if not already there.

Under the circumstances, where the key 25 (Fig. 3) "A or B" is in operated condition—that is to say, depressed—the subtract key 28 (Fig. 18) is not motorized and will not cause the commencement or initiation of a machine cycle. There must be depressed, in addition to the subtract key 28, either key 26, which is the "A" totalizer selecting key, or the key 27, which is the "B" totalizer selecting key, each of the keys 26 and 27 initiating a cycle of machine operation. Key 26 is slidably mounted on studs 411 and 412, on bracket 406, and is held in elevated condition by a spring 413, extending between a rearwardly-extending ear of the key stem 414 and a stud in the bracket 406. Key 27 likewise is slidably mounted on studs 415 and 416 and kept in elevated position by a spring 417 extending between a forwardly-extending ear of the key stem 418 and a stud in the bracket 406. Key 26 has a forwardly-extending arm 419, and key 27 has a rearwardly-extending arm 420, the ends of the arms 419 and 420 overlapping for a short distance, at which point they are over a stud 421 (Fig. 2) on a lever 422, pivoted on pivot screw 69. The under side of stud 421 rests on a shoulder 423 on the rearwardly-extending arm 424 of a bell crank lever 425, pivoted at 426 to trip lever 68. An upwardly-extending arm 427 of lever 425 has an ear 428, which is held in contact with an upwardly-extending arm 429 of trip lever 68 by a spring 430, extending between ear 428 and the forwardly-extending arm 431 of said lever 68. As either key "A" or "B" is operated, alone or in conjunction with the subtract key 28, the lever 68 is rocked clockwise slightly, initiating a cycle of machine operation. Pivoted to the rear end of lever 422 is a lever 431, having at its lower end a slot 432, engaging a stud 433. Lever 431 is shown in the position which it assumes through the action of stud 433 when the machine is conditioned by having the "A or B" key 25 (see Fig. 3) in depressed condition, under which condition either the "A" totalizer or the "B" totalizer may be selected for item entries. In this position of the lever 431, the subtract key 28 (see Fig. 18) will not, through the rocking of plate 403 (Fig. 2), cause the stud 410 to strike the upper end of lever 431; but, if the machine is conditioned by the "A and B" key 24 (Fig. 3), the lever 431 (Fig. 2) will be swung clockwise by forward movement of stud 433, as will be described, to a point where the upper end of lever 431 is under stud 410 and the rocking of plate 403 will force lever 431 downwardly, carrying lever 422 clockwise around its stud 69, causing the initiation of a machine cycle just as if stud 421 were pressed downwardly.

Referring to Figs. 2, 2a, 2b, and 2c, there is pivoted on the rearwardly-extending arm 424 of lever 425, by pivot 434, a by-pass pawl 435, adapted to cooperate with the stop surface 436 on a plate 437 pivoted at 438 to the right side frame plate 35. A link 439, pivoted at 440 to plate 437, and at 441 to bifurcated lever 401, causes plate 437 to rock counter-clockwise from normal position, shown in Fig. 2a, to the position shown in Fig. 2b, whenever the subtract key 28 and the subtract plate 403 are moved to subtract position; that is to say, when subtract plate 403 is rocked clockwise, as seen in Fig. 2. Referring to Fig. 2a, if lever 424 is rocked clockwise by either the "A" key or the "B" key, it carries the by-pass pawl with it. The by-pass pawl 435 is normally held in the clockwise position shown in Fig. 2a by a spring 442, extending between a lower and forwardly-extending arm of pawl 435 and a stud 424a on lever 424, until arm 424b hits stud 424a. As the lever 424 and the by-pass pawl 435 are rocked clockwise around pivot 426, the ear 443 of the by-pass pawl comes into line with stop surface 436 of the plate 437, preventing the counter-clockwise rocking of the plate 437 and preventing, therefore, the operation of the subtract mechanism through the counter-clockwise rocking of bifurcated lever 401 through the action of subtract plate 403 and stud 402. This interlock is to prevent the depression of the subtract key 28 after the initiation of a machine cycle on item-entering operations.

Referring to Fig. 2c, pivoted at 444a to the inside surface of plate 437 is a lever 444, having an ear 445, engaging the forward edge of the upper arm 443a of plate 437 and held there by a spring 446. On a rearwardly-extending arm of lever 444 is a stop surface 447. If lever 424 is rocked clockwise around its pivot 426 in machine-initiating movement, the ear 448 thereon will fall behind shoulder 447 only when the plate 437 is in subtract position. In the latter instance, the ear 448 will prevent the return movement of plate 437 to add position during all the machine operation except the last few degrees of movement. The positive condition is shown in Fig. 2a, where ear 448 will rock lever 444 clockwise. The negative condition is shown in Figs. 2b and 2c. Pivoted to stud 449, secured in the right side frame plate of the machine 35, is a bell crank lever 450, having on its rearwardly- and downwardly-extending arm a by-pass pawl 451 and having on a forwardly- and downwardly-extending arm thereof a stud 452. The bell crank lever 450 cannot rock clockwise past its normal position, as determined by a stud 453, but may rock counter-clockwise, where stud 452 will strike the rear end of lever 444, knocking it clockwise around its pivot, removing surface 447 from engagement with the ear 448 if it has been so engaged, and allowing the plate 437 to return to its add position. The stud 192 on plate 135, on the first half of a machine cycle, by-passes by-pass pawl 451, but, on the second half of the machine cycle, strikes by-pass pawl 451, which is held firmly in that direction and rocks bell crank 450 counter-clockwise, releasing plate 437 so that it may return to add position under the influence of a spring 389 (see Fig. 3), a spring between plate 437 and the right side frame plate (not shown), and spring 455 (Fig. 2a). This interlock prevents the operation of the subtract mechanism during a machine operation when such operation would cause a misoperation of the machine.

Referring to Figs. 2b and 2c, as the plate 437 returns

Means locking the "A" and the "B" keys when the "B*" total key is depressed

Referring to Figs. 3, 23, and 25, there is provided, on the left side of the machine, a slide 461, which has a slot 462, embracing a stud 463, held in the left side frame plate 34 of the machine, said slide being pivotally connected by a stud 464 to the forwardly-extending arm of a bell crank lever 466, pinned to cross shaft 467, journaled in frame plates of the machine. The slide 461 is normally held in an elevated position, where the stud 463 is in the bottom of slot 462, by a spring 468, extending between the lever 466 and a stud held in the left side frame of the machine. In this home position of the slide 461, a stud 469, on its upper end, makes contact with a forwardly-extending arm 470 on the key stem of the "B*" totalizer selecting key 30 for total-taking and sub-total-taking operations. The "B*" key 30 is itself held in elevated position by a spring 471, secured to the arm 470 of the key stem and anchored at its other end to a stud in the left side plate 177 of the key bank unit. As the "B*" key 30 is depressed, the slide 461 is pushed down, rocking shaft 467 counter-clockwise, as seen in Figs. 23 and 25, or clockwise, as seen in Fig. 3. An upper extending arm 472 of lever 466 controls the mechanism for sensing the state of the "B" totalizer, to determine whether it has a negative amount or a positive amount therein, as will be later described in connection with Fig. 26. Referring to Figs. 4 and 24, on the right end of shaft 467, inside of the right frame plate 35, is pinned a lever 473, having in its outer end a stud 474, which bears against the rearwardly-extending arm of a bell crank lever 475, pivoted to a stud 476, secured in the right frame plate 35, the upper end of said bell crank lever engaging the forward edge 477 (Fig. 24) of a floating lever 478, having on its left end a slot 479, which embraces a peripheral groove in a vertical stud 480, extending upward from the base of the machine. The right end of floating lever 478 extends through an elongated slot 481 in the right side frame plate 35, the said right end of the lever normally resting in the forward end of said slot and the stud 480 resting in the rear end of said slot 479 under the influence of a spring 482, extending from said floating lever to a cross shaft 483, journaled in the side frames 34 and 35 of the machine (see Fig. 2). If the "B*" key 30 is depressed, the right end of floating lever 478 will be forced rearwardly in slot 481, where it is directly under a leg 484 extending downwardly from lever 424, blocking the tripping movement of lever 424 and preventing a one-cycle item-entering operation.

Therefore, by blocking the movement of lever 424, it is impossible to operate keys 26, 27, and 28 (Fig. 18), which when operated move lever 424 (Fig. 25). Referring to Fig. 26a, the non-add key 31 (see also Fig. 18), slidably mounted on studs 484a and 485 on bracket 406, and normally held in an elevated position by a spring 486, extending between the stem of said key to a stud supported on bracket 406, has a rearwardly-extending arm 487, which, when the non-add key 31 is depressed, bears against stud 488 (Fig. 26a) of the lever 489, secured to a collar pivotally mounted on stud 490, held in the right side plate 35. On the left end of the collar is secured a lever 491, having a downwardly-extending portion adapted to strike the right end of lever 478 when it is in the rearward position, which it assumes when the "B*" key is depressed. This will prevent the operation of the non-add key 31 during the time the "B*" key 30 is in depressed position. It will thus be seen that the only way to set the machine in operation, under the circumstance of the "B*" key being operated, is to operate either the total key 29 (Fig. 18) or the sub-total key "S" 29a, which are motorized and which control the total and sub-total taking mechanisms, respectively.

Transfer mechanism

The transfer mechanism for the totalizer is of the type described in the Carlson et al. United States patent application Serial No. 171,118, to which reference has been made. It will be described briefly herein in connection with the "A" totalizer, the transfer mechanism for the "B" totalizer being of the same construction.

Referring to Fig. 13, it will be remembered that on each totalizer wheel there is a transfer pawl tooth 311 that is associated with adding operations and positive total-taking operations. The companion tooth 310 is associated with subtracting operations and negative total-taking operations.

Associated with each totalizer wheel adjacent its left side is a transfer lever, a typical lever 493 (Fig. 8), representing the units order, being shown in normal position; that is to say, where its ear 494 blocks the rack 495 of the next higher order from making its transfer movement under the urge of spring 496. The transfer levers are all rockably mounted on a shaft 322, and each is kept in normal position by a spring 498.

The transfer lever has an outer offset portion 499, in line with the add tooth of the transfer pawl of units order, when the totalizer is in add position. On adding operations, as the add tooth of the totalizer pinion approaches zero position, it rides on cam surface 500, rocking the transfer lever down, where it is latched by ear 501 of a latch member entering notch 502. Ear 494 is thereby held out of alinement with the abutment of the differential rack of the tens order, allowing an additional movement of one unit to the totalizer wheel of the tens order. On total-taking operations, where a positive total is involved, the vertical stop surface 503 of the offset portion of transfer lever 493, engaging the add tooth, stops the associated totalizer wheel when it reaches zero position in its total-taking reverse rotary movement. Similarly, when the totalized is shifted to the left for subtraction or the taking of negative totals, portion 504 of the transfer lever 493 is in alinement with the subtract transfer pawl tooth on the units totalizer pinion, and in subtract entries it cams down on the associated transfer lever to cause an entry of a negative unit in the tens totalizer pinion. On negative total-taking operations, the subtract tooth of the units order transfer pawl stops the units totalizer at zero position by striking surface 505.

The highest order transfer lever is used to enter a "fugitive one" into the lowest denominational order whenever entries causing the totalizer as a whole to pass through zero, either from negative to positive, or vice versa, as will be described later.

A typical transfer lever latch will be described with reference to Fig. 5. At the side of each totalizer wheel is a plate 506, supported on rods 507 and 508 secured to the side frame plates, on which is pivotally mounted a latch piece 509, urged counter-clockwise by spring 510 and having an ear 501 (see Fig. 8) playing in a stepped notch 512 of the associated transfer lever. When the transfer lever is knocked down by the transfer pawl of the associated totalizer wheel, the ear 501 of its latch snaps into the upper step of the notch 512, locking the lever in tripped position. Such tripping occurs only when the totalizer is in engagement with the differential racks. Each latch has a forwardly-projecting tail 513 (Fig. 5), which is given an upward thrust to reset the transfer pawls when the totalizer is brought out of engagement with the racks. Such resetting of the transfer levers occurs at the beginning of each item-entering machine operation and at the beginning of the first machine cycle of a two-cycle total-taking operation, as the totalizer comes out of engagement with the racks.

"Fugitive one" mechanism

When the totalizer contains a positive total, a total is taken with the totalizer in add position, and, if it contains a negative total, the total is taken with the totalizer in subtract position. A totalizer wheel, typified by the wheel of Fig. 9, when reset to zero from a positive total, will be rotated reversely to the add direction, as indicated by the arrow, until the positive transfer pawl tooth 311 strikes the surface 503 of the associated transfer lever. This will show a zero on the indicator drum through the viewing aperture 21. When the totalizer wheel is reset to zero from a negative total, it is rotated in a direction opposite to the subtract direction until the negative transfer pawl tooth 310 strikes stop surface 505 of its associated transfer lever. This will show a "9" of the indicator drum at the viewing aperture 21. Thus, after a total is taken from the totalizer, under control of the positive transfer pawl teeth—that is, when the totalizer is in add position—the indicator drums will show "0000000000" through the viewing aperture, whereas, when a total is taken under control of the negative transfer pawl teeth—that is, when the totalizer is in subtract position—the indicator drums will show "9999999999." As the drums show the actual position of the totalizer wheels, such zero positions will be referred to as "positive" zero and "negative" zero. In the return of the totalizer wheels to "positive" zero or to "negative" zero, the differential racks must be moved a distance equal to the true total, be it positive or negative, and such is provided for by mechanism which insures the entry of a "fugitive one" into the totalizer as it passes on item entries from "0000000000" to "9999999999" or from "9999999999" to "0000000000" during an item entry operation.

The following examples show the exhibited numerals of the indicator drums and, hence, the position of the totalizer wheels during a series of entry operations, beginning with the totalizer at zero.

```
                         0000000000
     add                        +1
                         0000000001
     subtract                   -2
                         9999999999
     (fugitive 1 correction)    -1
                         9999999998
     add                        +5
                         0000000003
     (fugitive 1 correction)    +1
                         0000000004
```

It will be seen that the "fugitive one" is added during an adding operation and subtracted during a subtracting operation.

Similar operations occur between banks during entry operation to transfer carry-over data; for instance,

```
                         0000000009
     add                        +1
                         0000000010
``` involves an entry of "one" into the tens bank in a positive sense, whereas

```
                         0000000010
     subtract                   -1
                         0000000009
``` involves an entry of "one" into the tens bank in a negative sense.

Whereas the positioning of the totalizers in item entering is determined by the operator of the machine according to whether he conditions the machine for addition or subtraction through keys 26, 27, and 28, the positioning of the totalizers in total taking is controlled automatically according to whether the amount in the totalizer selected for total-taking is positive or negative. If the amount of the total is positive, the total will be taken by engagement of the totalizer pinions directly with the differential racks, and, if the amount in the totalizer is negative, the said racks will engage the totalizer pinions indirectly through the intermediate or idler pinions, such automatic control to be described in connection with total-taking operations.

Whenever the highest order totalizer wheel of a totalizer approaches the zero point from the positive side going toward the negative side or from the negative side going toward the positive side, a unit is entered into the lowest order totalizer wheel to correct for the "fugitive one."

Referring to Fig. 8, the transfer lever 514 for the highest order totalizer wheel is tripped as that wheel approaches zero from either direction, and latch lever 515, rockably mounted on shaft 516, which normally has latch ear 517 in the lower part of stepped notch 518, is permitted to move so that latch ear 517 moves into the upper part of notch 518 in response to the urge of spring 519, moving link 520 rearwardly to rock crank 521, pinned to shaft 522, turning shaft 522 counterclockwise as looked at from the right side of the machine. A lever member 523, pinned to shaft 522, normally holds a yoke 524, rockably mounted on shaft 322, so that its ear 525 is in alinement with abutment 526 on the units order differential rack. On lever member 523 being rocked, ear 525 is lowered by the rocking of yoke 524 against the restoring action of spring 527, allowing the entry of the "fugitive one" to be made into the units order either additively or subtractively, depending on the lateral position of the totalizer. On the next machine operation, yoke 524 is reset to the effective position, shown in Fig. 8, by ear 528 (Fig. 6) acting on tail 529 (Fig. 8) of lever 515 as the totalizer is disengaged.

Means has been provided to keep the latch lever 515 (Fig. 8) from rocking except when the highest order wheel in passing through zero does it by an entry opposite in algebraic sign to the last previous entry, such means preventing the entry of a "fugitive one" when the totalizer exceeds its capacity positively or negatively.

Rockably mounted on the portion of the before-mentioned stud 358 (Fig. 7), which passes through collar 530, secured to the left side frame plate, and through the left side frame plate, is an E-shaped flipper member 531, having a leftwardly-protruding stud 532, acting as an anchor for one end of a spring 533, the other end of which is attached to a stud 534, secured to the "A" totalizer shifting cam 360. When shifting cam 360 is turned counter-clockwise, as viewed in Fig. 3, to subtract position, the rear end of E-shaped member 531 is urged downwardly by the spring 533. When cam 360 is returned to the add position, shown in Fig. 3, the E-shaped member 531 is urged upwardly, toward the position shown in Fig. 3.

After a series of adding operations into the "A" totalizer from positive zero, cam 360 is in the position shown in Fig. 3, and the E-shaped member is in its upper position (see also Fig. 11), wherein the lower arm of the E embraces ear 535 on the downwardly-extending tail of lever 515, preventing movement of lever 515 even though the transfer lever 514 is rocked down by the transfer pawl of the highest order totalizer wheel on a subsequent add operation. After a series of subtract operations into the "A" totalizer during which the amount in the totalizer passes from positive to negative, the ear 535 will be embraced by the upper arm of the E (as seen in Fig. 12), which prevents lever 515 from movement on a subsequent subtract operation in which the transfer lever 514 is rocked down.

Fig. 15 also shows the disposition of latch lever 515 in the E-shaped member after a series of adding operations into the "A" totalizer. It is apparent that, if the transfer pawl tooth of the highest order of the "A" totalizer trips the associated highest order transfer lever, latch lever 515 is unable to move to enter the "fugitive one" into the lowest order of the "A" totalizer, the ear being caught by the upwardly-extending lip of the lower embracing arm of the E. This state of affairs continues as long as items are continuously added. Now, if the next item is a subtract item, cam 360 will be rocked to urge E-shaped lever 531 downwardly, which movement it cannot complete, as the under side of the center tongue of the E strikes the ear 535, as shown in Fig. 10. If, then, lever 515 is permitted to rock counter-clockwise, as seen in Fig. 10, because the subtract transfer tooth of the highest order totalizer wheel has rocked the highest order transfer lever down, the "fugitive one" will be entered into the lowest order wheel of the "A" totalizer. This condition is shown as about to happen in Fig. 10, where the totalizer wheel of the highest order, turning subtractively, carries with it transfer pawl 536 in the direction of the arrow. One more unit of movement will cause subtract tooth 537 to rock lever 514 down, allowing lever 515 to rock so that ear 535 escapes from under the tongue of the E, as shown in dotted lines, whereupon the E-shaped member drops down until the upper lip of the E strikes ear 535. At the commencement of the next cycle of operation, the transfer lever 515 is restored to latching position, which traps ear 535 within the embrace of the upper arm of the E as long as subtract operations are continued. If, then, an addition operation is commenced, cam 360 (Fig. 15) is shifted, causing E-shaped member 531 to be urged upwardly, and ear 535 will strike the upper edge of the tongue thereof but will not by-pass it until the add transfer pawl tooth 538 (Fig. 12) knocks down the transfer lever as the highest order totalizer wheel passes through zero going in a positive direction. When that happens, lever 515 is rocked counter-clockwise, entering the "fugitive one" into the units order totalizer wheel, and, when the next machine operation is commenced, the ear 535 will be trapped by the lower embracing arm of the E.

The position of the E-shaped lever 531 (Fig. 7) indicates whether the accumulated total is negative or positive, and that position controls the selection of the "A" totalizer in total-taking operations of the "A" totalizer to take a negative or positive total, and such mechanism for both the "A" and the "B" totalizers, shown in Fig. 26, will be explained in connection with total and sub-total taking operations.

Mechanism similar to that of the "A" totalizer for entering the "fugitive one" is provided for the "B" totalizer. Referring to Fig. 15, the transfer lever 539 of the highest denominational order of the "B" totalizer is rocked counter-clockwise around its supporting shaft whenever the highest order totalizer wheel of the "B" totalizer passes through zero in a positive or a negative direction, releasing the lever 541 to the action of its spring 542, as controlled by the E-shaped flipper 543, to enter or not to enter a "fugitive one" in the lowest order of the "B" totalizer. The position of E-shaped flipper 543, as shown in Fig. 15, indicates that a positive amount is in the "B" totalizer. In this position, the ear 544 of lever 541 is within the embrace of the upper arm of the E. If the cam 361 is rocked for a subtract entry—that is to say, clockwise, as seen in Fig. 15—then the E-shaped flipper 543 will be urged clockwise around its pivot 359, bringing ear 544 into contact with the middle tongue of the flipper, and, on the next operation in which there is a passage through zero in a negative direction, the ear 544 will fall into the embrace of the lower arm of the E-shaped flipper 543. The transmission of the movement of lever 541 to the right end of the "B" totalizer is accomplished in the same manner as described in connection with the "A" totalizer, and the "fugitive one" is entered into the lowest order just as in the case of the "A" totalizer. The position of E-shaped flipper 543 indicates the algebraic state of the "B" totalizer that is—to say, whether it contains a negative amount or a positive amount—and its position is sensed by automatic means, before mentioned, which will be described in connection with the taking of totals and sub-totals.

*Mechanism for engaging the "A" totalizer for add and subtract operations*

As previously described in connection with Fig. 19, the "A" totalizer engaging lever arm 343 is rocked counter-clockwise, to disengage the totalizer, through the action of cam slot 345 on roller stud 344. Totalizer engaging cam plate 346 is rockably mounted on stud 347, secured to the inside of the right frame plate 35, and is movable within the limits imposed by cam slot 345. Pinned to shaft 55 and moving with plate 131 (Fig. 2), to which it is pinned by pivot stud 132, is a drive arm 545, rocked each machine cycle first counter-clockwise to the dotted-line position which it has at the end of the first half of the cycle, as shown in Fig. 19, and then clockwise to home position, shown in full line. On the upper end of arm 545 is a lever 547, pivoted on stud 548 and normally urged to a line radial with the center of shaft 55 by a spring 549 and having a hook portion 550, which embraces a stud 551 in the rearwardly-extending arm of a three-armed lever 552, pivoted on stud 553, extending inwardly from the right side frame plate 35. As a machine cycle commences, lever 547 immediately rocks lever 552 counter-clockwise and, in doing so, straightens out to the radial position dictated by spring 549 until edge 554 thereon strikes stud 555, causing lever 547 to rock clockwise on stud 548 until a tail surface 556 thereon strikes stud 557 on arm 545, whereupon pressure is exerted on stud 555, rocking lever 552 to home position just at the end of the first half-cycle of a machine operation. On the second half of the machine cycle, arm 545 moves to home position, and lever 547 rehooks on stud 551. A spring-urged stud 558 is provided to engage in either notch 559 or 560 to hold lever 552 in either home position or moved position. Stud 558 is secured to a lever, not shown, pivoted to the right side frame and urged by a spring in the effective direction. Pivoted at 561 to an upwardly-extending arm of lever 552 is a pitman 562, having three arms, a rearwardly- and downwardly-extending arm 563, having a stud 564; a downwardly- and forwardly-extending arm having a notch 565; and a forwardly-extending arm 566, having a notch 567. Pitman 562 is constantly urged clockwise around pivot 561 by a spring 568. Pitman 562 normally is kept with stud 564 in contact with a surface on the end of a lever 570 pivoted on stud 571, which lever 570 remains in the position shown except in total-taking and sub-total-taking operations, when it is rocked counter-clockwise. Notch 565 is thereby kept engaged with a stud 569 on a lever 572, rockably mounted on stud 347. Lever 572 has, on its upper end, a hook member 573, pivoted on stud 574 and normally engaging a stud 575 on plate 346 because of the urge of spring 576. Stud 577 on lever 572 is in contact with the forward edge of the upwardly-extending arm of lever 346. Under such circumstances, as lever 552 is rocked counter-clockwise at the beginning of the machine cycle and clockwise to home position at the end of the first half of the machine cycle, lever 572 and lever 346, hooked thereto by hook member 573, rocks first clockwise to disengage the totalizer and then counter-clockwise to engage the totalizer at the end of the first half of the machine cycle. This is the totalizer-engaging timing for add and subtract operations.

*Mechanism for engaging the "B" totalizer on add and subtract operations*

Pivoted to the forwardly-extending arm of three-armed lever 552 is a pitman 580, having its lower end bifurcated into arms 581 and 582. The outer edge of arm 581 has a notch which engages a stud 583 on lever 584, pivotally mounted on stud 352.

Lever 584 corresponds to the lever 572 for the "A" totalizer and has hook member 585 pivoted thereto, which normally hooks over stud 586 on totalizer-engaging plate 351. The arm 581 of pitman 580 is held in engagement with stud 583 during add and subtract operations by a stud 590 on lever 570 and by a lever 587 secured on a shaft 588, the outer end of lever 587 engaging stud 589 on pitman 580. On total-taking operations, stud 590 moves away and frees pitman 580, but lever 587 remains effective, as will be explained with respect to selecting the "A" totalizer or the "B" totalizer in total- and sub-total-taking operations. The pitman 580 is urged to rock clockwise around its pivot by a spring 591. With the mechanism in the position shown in Fig. 19, as three-armed lever 552 is rocked counter-clockwise and then clockwise during the first half of the machine cycle, the pitman 580 first will be driven downwardly, rocking the "B" totalizer engaging plate 351 clockwise, disengaging the totalizer while the stop bars are moving forwardly, and then upwardly, engaging the "B" totalizer, as the entry is being made therein.

*Non-add mechanism*

In a non-add operation, key 31 (Fig. 26a) is depressed, and its arm 487 bears down on stud 488 on lever 489, mounted on a collar on pivot 490, rocking said lever clockwise, as seen in Fig. 26a. The lever 489 is mounted on a collar which also has mounted thereon a lever 592, pivoted to a link 594, supported at its rear end by a pin-and-slot connection to the lower end of a link 597, pivoted at its upper end to a lever 598, mounted on a supporting pivot 599. A spring 598a normally holds the aforesaid linkage in the shown position. The function of lever 598 in setting up the non-add symbol will be discussed with the symbol-printing mechanism to be described later. On link 594 there is a stud 595, which engages the rear and lower edge of a lever 596a, pivoted on stud 600. Secured on shaft 130 is a plate 601, having a stud 602. As link 594 is moved forward, as the non-add key 31 is depressed, the lever 596a rocks clockwise about its pivot 600 to the dotted-line position, and a stud 603 thereon, which enters a slot in a link 604, will move to the top of said slot, it normally resting in the bottom thereof. After a few degrees of machine operation in the ensuing cycle, the plate 601, being rocked counter-clockwise in the first half of the machine cycle, makes contact with the surface 605 of lever 596a, rocking it past the dotted-line position. This raises link 604, which is pivoted at its upper end at 606 to a bell crank lever 607. The other end of bell crank lever 607 normally rests against the stud 221. As the link 604 is elevated, bell crank lever 607 turns clockwise, and the upper end of link 604 moves forward. A surface 608 in a notch in the link 604 makes contact with a stud 609 in an upwardly-extending arm of a two-armed lever 610, pivoted to the framework at 611. Stud 609, moving forwardly under the urge of link 604 through surface 608, comes into the path of movement of hook member 573 as lever 572 rocks (see also Fig. 19), and, after the "A" totalizer has rocked out of engagement, the hook member 573 is unlatched from the stud 575, and the return movement of lever 572 (Fig. 19) at the last of the first half of the machine cycle will not rock the plate 346 to engaging position. Therefore, the "A" totalizer will be out of engagement with the differential racks during the item-entering portion of the machine cycle, and any data set up on the keyboard will not be entered into the "A" totalizer. Toward the close of the machine cycle, the plate 601 will strike a stud 611a on the totalizer-engaging plate 346, rocking it counter-clockwise and engaging the "A" totalizer with the racks, which is the home position, in which it should be at the end of a machine operation.

Referring back to Fig. 26a, the link 594 also has pivoted thereon, at 595, a link 612, having a slot 613 riding a stud 614 held in the machine frame, said link having at its rear end an upturned portion, which upturned portion, when the link 594 is drawn forward, strikes a stud 617 on a lever 618, mounted on pivot 619, rocking the lever 618 counter-clockwise, as seen in Fig. 26a, so that stud 617 comes into the path of movement of surface 616 of the hook member 585 of the "B" totalizer as lever 584 rocks, disengaging it from stud 586 (see Fig. 19), so that, on the return movement of plate 351 at the end of the first half-cycle of machine operation, the "B" totalizer will be kept out of engagement with the racks during the second half of the cycle.

Thus it will be seen that both the "A" and the "B" totalizers are disengaged at the beginning of a machine cycle and are left that way during the cycle. It has previously been mentioned how the upper totalizer "A" is returned to engaged position at the end of the cycle. The "B" totalizer is returned at the end of the cycle as lever 545 (Fig. 19) is returned to home position, shown in full lines. Stud 132 strikes a stud 620 on a bell crank lever 621, pivoted at 622 on a frame-supported stud, causing lever 621 to move from the counter-clockwise rocked position which it assumes as lever 545 moves away from home position, under the urge of spring 623, back to normal position. The surface 624 strikes stud 625 on totalizer-engaging plate 351, re-engaging the "B" totalizer at the close of the machine cycle.

The forward movement of link 594 (Fig. 26a) also sets the machine in operation by rocking latch piece 620, connected to lever 596a, clockwise, which carries with it a latch piece 621 (see also Fig. 21), allowing lever 622 (Fig. 4) to rock counter-clockwise around pivot 623 under the influence of spring 624. As lever 622 rocks counter-clockwise, a forwardly-extending arm 625 strikes stud 626 (see Fig. 2) on the rear arm 424 of lever 425, rocking that lever clockwise, which in turn rocks lever 68 clockwise, initiating a machine operation. At the close of the machine operation, by-pass pawl 627 (Fig. 4) on lever 622 is struck by stud 192 (see Fig. 2) on the return movement of plate 135, reestablishing the normal position of lever 622, which is latched in place by latch pieces 620 and 621, as the link 594 (Fig. 26a) returns to home position. This mechanism for initiating a machine cycle through operation of the non-add key is more specifically set forth in the aforesaid United States patent application of Carlson et al., Serial No. 171,118, and reference is made to it for other details which are not pertinent to the disclosure of this invention. The link 594 is held in non-add position by the foot 628 of lever 622 moving rearwardly under the toes of latch plates 620 and 621, preventing return of said latch plates, and consequently the link 594, to normal position until lever 622 is knocked to its normal position by the stud 192 on plate 135.

*Totalizer-selecting mechanism for item entries*

It will be understood that the totalizer-engaging mechanism normally operates to disengage the totalizers "A" and "B" from the associated differential racks during the first part of the first half-cycle of an item entry operation, re-engaging the two totalizers at the close of the first half-cycle of operation, so that, on return movement of the differential racks, the amount set up on the keys is entered into both totalizers. The totalizer-selecting mechanism is provided to overcome this normal condition in the event that it is wanted to enter an item or a series of items into either one of the two totalizers alone.

Referring to Fig. 23, the key 24 represents the "A and B" type of operation, in which amounts are entered into both totalizers simultaneously, and the key 25 represents the "A or B" condition of the mechanism, where amounts may be entered into either the "A" totalizer or the "B" totalizer as selected by operation of the cooperating keys 26 and 27 (see Fig. 1) on the right side of the machine. Pivoted on a stud 632 (Fig. 23) on the left side plate of the machine is a lever 633, having pivoted at one end a link 634 and pivoted at the other end of it a link 635, said links having slots by which they are slidably mounted, respectively, on studs 636 and 637. These links 635 and 634 are pivoted to a link 639, which joins their upper ends, forming a parallelogram mechanism, which may be forced to either one of two positions by pressure put upon one of the studs 640 and 641. Downward pressure on stud 641 moves the parallelogram mechanism to a position shown in Fig. 23, where the link 635 is pushed down on its stud 637, and downward pressure on stud 640 will reverse the situation, so that stud 636 is in the top of its slot and stud 637 is in the bottom of its slot, the parallelogram mechanism being held rocked in either one or the other condition by a spring 642, which is so attached to ears on the links 633 and 639 that the parallelogram mechanism cannot stay on dead center. Pressure is exerted on stud 641 by the key 25 when it is depressed, and pressure is put on stud 640 when key 24 is depressed, the pushing-in of key 24 causing the elevation of key 25 and vice versa, so that only one of those two keys can be in depressed condition at the same time. The lower end of link 634 is pivoted to a lever 642a, pinned on a shaft 643 extending across the machine between the frame plates. The right end of this shaft may be seen in Fig. 2. Pinned to the right end of shaft 643 is a lever 644 pivoted at its upper end to a link 645 (see Fig. 20) mounted for sliding motion on a stud 646 supported in the side frame of the machine.

When the "A and B" key 24 is pressed inwardly, the shaft 643 will be rocked counter-clockwise, as seen in Fig. 20, causing link 645 to move forwardly, and, when the "A or B" key is later depressed, the shaft 643 will rock clockwise to the position shown in Fig. 20. Pivoted to a lever 647 (Fig. 20), which is itself pivoted on a frame-supported stud 648, is a link 649 coupled to link 645 by a slot 650 embracing a stud 651 on said link 645. In the condition of the machine shown in Fig. 20, the link 649 has its top edge 652 directly under and against stud 653 on the stem of the "B" key 27, and downward pressure on that key will force down link 649, causing lever 647 to rock counter-clockwise to disable the "A" totalizer for the ensuing machine operation, so that the amount set up on the keyboard is entered only into the "B" totalizer. The means for disabling the "A" totalizer under such circumstances will now be explained.

Pivoted to the rear end of lever 647 is a lever 654, which is itself pivoted on a frame-supported stud 655. The forked rear end of lever 654 embraces a stud 656 in a plate 657 pivotally mounted on a frame-supported stud 658.

Supported pivotally on a frame-supported stud 659 is a lever 660 having a pivotal connection to a link 661 by means of a side-spacing stud 662. Bearing against stud 662 is the cam surface 663 of plate 657, and the link 661 will raise upwardly upon plate 657 being rocked counter-clockwise, as will be the case when the "B" key is depressed when the mechanism is in the condition shown in Fig. 20. In the upper end of link 661 is a slot 664, embracing a stud 665 in lever 610, before mentioned in connection with the non-add mechanism. The upward movement of link 661 will rock lever 610 counter-clockwise, bringing stud 609 into the path of movement of the hook 573 and disengaging the lever 572 from the "A" totalizer engaging plate 346 during the first half of a machine operation, thus preventing re-engagement of the "A" totalizer near mid-cycle, as would otherwise be the case. Therefore, when the "B" key 27 is operated at a time when the "A or B" key 25 is operated, the "A" totalizer will be non-added. On the other hand, the "B" totalizer is unaffected and will engage in item-entering timing.

If, when the "A or B" key is depressed, the "A" key 26 (Fig. 22) is depressed thereafter, a stud 877 thereon will depress a link 878, mounted on link 645 by stud-and-slot connection and pivoted to the rear end of a lever 879 pivotally mounted on stud 643, rocking lever 879 counter-clockwise. The rear end of lever 879 is coupled by pin-and-slot coupling to the forward end of lever 880, pivoted on frame-supported pivot 665. The rear end of lever 880 is bifurcated and embraces a stud 881 on a plate 882, pivoted on frame-supported stud 883. A spring 884 holds the plate rocked clockwise until it is stopped by the pin-and-slot coupling of link 878 to link 645. As the "A" key is depressed, a cam surface 885, working against roller stud 886, rocks non-add bell crank lever 618, associated with the "B" totalizer, counter-clockwise against the return action of spring 888 to move stud 617 into the path of the surface 616 of hook 585 (see Fig. 19) to disengage lever 584 from pitman 580 (Fig. 19) to non-add the "B" totalizer on the ensuing machine operation.

Referring to Fig. 18, the arms 419 and 420 of the "A" and "B" keys, respectively, bear on stud 421, and depression of either the "A" key or the "B" key will initiate a machine operation.

If the "A and B" key is depressed, links 649 and 878 (Fig. 20) will be rocked to ineffective position, and depression of either the "A" key or the "B" key will enter the amount set up on the keys into both totalizers.

The symbol-printing mechanism, operated by the "A and B," the "A or B," the "A," and the "B" control keys will be discussed later.

In subtract operations with the "A and B" key in control, the subtract item in such operations is to be entered into both totalizers, and it is permissible to have the cycles of machine operations in which such subtract entries are entered into both totalizers initiated under control of the subtract key "—" 28. Provision is made for disabling that key from initiating machine operation when the "A or B" key is used, because in the latter type of operation the "A" key 26 or the "B" key 27 must be used in conjunction with the subtract key "—" 28.

Referring to Figs. 15 and 22, depression of the subtract key 28 rocks subtract control plate 403 clockwise, and a stud 410 thereon may or may not strike the upper end of lever 431, pivoted on machine trip lever 422, depending upon what position the link 645 is in. The lower end of lever 431 has a slot which embraces stud 670 in plate 645, and, as plate 645 is shifted rearwardly to the "A or B" position, shown in Fig. 22, the upper end of lever 431 will be moved out of the path of stud 410, and depression of the subtract key will not initiate a machine operation, necessitating the depression in conjunction with the subtract key of either the "A" key or the "B" key. If link 645 is moved forwardly from the position shown in Fig. 22 to the "A and B" position, the lever 431 will be rocked clockwise around its pivot, and its top end will be in line with stud 410 on the subtract control plate, and the mere depression of the subtract key will initiate a machine operation in which the item set up on the keys is entered into both the "A" totalizer and the "B" totalizer.

*Two-cycle control mechanism and totalizer sensing for total and sub-total operations*

A total-taking operation or a sub-total-taking operation, taking two machine cycles, is commenced by depression of either the total key 29 (Figs. 1, 18 and 27) or the sub-total key 29a (Figs. 1 and 18), slidably mounted on studs 675 and 676, and studs 677 and 678, respectively, secured in the bracket 406 fastened to the right inside of the machine casing. Each of the keys normally is urged upwardly by a spring, as shown in Fig. 18. A finger 679 (Fig. 27) of the total key bears against the stud 680 on the total slide plate 681, slidably mounted on studs 682 and 683, secured in the right side frame plate and normally held in the "up" position by a spring 684. A locking formation 685 on slide plate 681 cooperates with a stud 686 (Fig. 2) on lever 687, pivotally mounted on stud 688 secured to the right side frame plate, which lever 687 is urged counter-clockwise by spring 689. When the total key is in undepressed position, the stud 686 rests on the under side of formation 685, and, when the total key is depressed, stud 686 rides over formation 685 and comes to rest on the upper side of formation 685. A similar formation 690 (Fig. 2) on the sub-total slide plate 691 mounted to the outside of the total slide plate, and also cooperating with stud 686 in the manner described in connection with the total slide plate, is provided to control the sub-total slide plate also, as on sub-total operations, to be described, both total slide plate 681 and sub-total slide plate 691 being moved downwardly together by the sub-total key 29a. By preventing the rocking of lever 687 from the position shown in Fig. 2, either the total slide plate or the sub-total slide plate, or both, may be held locked in operated or unoperated position. Formation 685 is directly behind formation 690, as seen in Fig. 2.

Each time the machine is tripped, the lever 692 (Fig. 2) is rocked counterclockwise around its pivot 693 and stays there until the end of the cycle, as described in the Carlson et al. application, to which reference has been made. Lever 692 has a surface 694, which, by the counter-clockwise rocking of lever 692, is brought under a stud 695 on by-pass lever 696, pivoted by stud 697 to an upwardly-bent portion of the rear end of lever 687. The rocking of lever 692 thus prevents the rocking of lever 687 during a machine operation. Therefore, the total and sub-total slide plates are prevented from movement during a machine cycle until lever 692 is restored. This means that on item-entering operations the total and sub-total keys cannot be depressed, and that, if one or the other has been depressed during total or sub-total operations, then such are not released until lever 692 has been restored. The by-pass mounting of lever 696 is a safety device arranged so that, if lever 692 is moved toward stud 695, as stud 686 is riding over formation 685 or 690, lever 696 will give, by rocking clockwise around stud 697 against the urge of spring 698, which normally holds forwardly-extending bent-over arm of lever 696 against the upper surface of lever 687. Such is a safety device to prevent possible breakage of the parts.

As the total slide is depressed, the stud 700 (Fig. 27) thereon strikes the arm of a bell crank lever 701, pivoted on stud 702, rocking it clockwise. The total plate 703, rockably mounted on stud 704, secured in the right side frame plate, is held in the position shown in Fig. 27 by connection to stud 705 on bell crank lever 701 through disconnect link 706, pivoted to plate 703 by stud 707. Link 706 at its upper end has a notched slot 708, in which stud 705 rides. The stud 705 normally rides in the notch at the upper end of the slot, so that, on the clockwise rocking of bell crank lever 701, the link 706 is forced downwardly and forwardly, rocking total plate 703 counter-clockwise. Stud 710 (Fig. 27) on the plate 703 strikes the lower rearwardly-extending arm of lever 424, tripping the machine, thus initiating a cycle of machine operation. Simultaneously with the rocking of total plate 703, a latch 711, pivoted to a plate 716 (Fig. 2) and held against a stud 712 on plate 703 by spring 714, engages shoulder 715 on bell crank lever 717. Plate 716 and bell crank lever 717 are both pivotally mounted on stud 721. The rearwardly-extending arm of bell crank lever 717 has a stud 718, which is held against the edge of a cam plate 719, secured to drive plate 135, by spring 720. As the machine cycle commences, drive plate 135 rocks counter-clockwise and cam plate 719 rocks bell crank 717 clockwise, carrying with it, in the same direction, through latch 717, the plate 716 (see Fig. 27). Plate 716 is pivoted to slide 722, which thereby is moved rearwardly against the action of spring 723, where it is latched during the first machine cycle, as will be explained, until near the end of the second machine cycle. A spring 724 normally keeps stud 705 engaged in the notch in the top of slot 708, but by-pass pawl 725 on plate 135, passing stud 726 on link 706, as plate 135 rocks counter-clockwise on the first half of the first machine cycle, is effective under the urge of spring 727 on the second half of the first machine cycle and strikes stud 726, uncoupling stud 705 from its notch, permitting link 706 and plate 703 to restore to normal, when otherwise permitted, as will be explained. The stud 705 re-engages the notch in the slot 708 at the end of the second cycle, as slide 681 and bell crank lever 701 are restored. The forward end of slide 722 is pivoted to a support link 728, which, in turn, is pivoted to a stud 729 in the right side frame plate. As plate 703 is rocked counter-clockwise and link 722 is drawn to the rear, several things are made to occur beside the initiation of the first machine cycle. First, spring anchor stud 730 (see Figs. 2 and 27), normally in the position shown in Fig. 2, when drawn rearwardly with link 722, moves rearwardly in a cam slot 731 of a lever 732, pinned to shaft 483, rocking it counter-clockwise. Also pinned to shaft 483, which is journaled in the side plates and extends therebetween, are two rearwardly-extending arms, the right one, 733, being shown in Fig. 17, supporting stop bail 142, which is brought, by rocking of shaft 483, to effective position, as shown in Fig. 17, in front of the forward edges of plates 141 of all the stop bars, to keep them from movement during the first machine cycle. The bail 142 is restored to normal ineffective position early in the first half of the second machine cycle, as the link 722 returns home, as will be explained, under urge of spring 723. Second, slot 734, embracing a stud 735 (see Figs. 4 and 17) in the bell crank lever 736 fixed to collar 737 (see also Fig. 7) rotatable on shaft 393, rocks said bell crank lever 736 counter-clockwise from the position of Fig. 4 to the position of Fig. 17. The rocking of bell crank lever 736 counter-clockwise through lever 738 (Fig. 7), secured to collar 737, rocks bail 739, rockably mounted on shaft 393, counter-clockwise, as seen in Fig. 7, through the action of stud 740, mounted on lever 738 fixed to collar 737, striking its downwardly-extending arm 741. Secured to the left support arm of bail 739, is a lever 742, to which are pivoted levers 743 and 744 (see Fig. 26), respectively associated with the "A" and "B" totalizers and sensing the condition of that one of those two totalizers which is selected for total-taking, as to whether the amount therein is positive or negative, as will be explained next.

Referring to Fig. 26, which shows the sensing mechanism as viewed from the right side, the position shown is the one assumed when the machine is at rest, without the "B*" key 30 depressed, in which the E-shaped flipper 531 for the "A" totalizer is in the positive position, and in which the E-shaped flipper 543 for the "B" totalizer is in the positive position. Sensing lever 743 is held in the position shown, with arm 745 in contact with stud 746, by reason of the action of spring 747, on a forwardly-extending arm of flipper 531. In a like manner, arm 748 of lever 744 is held in contact with a stud 749 on a forwardly-extending arm of flipper 744 under the urge of spring 750. Stud 751, extending to the right from link 367 (see Figs. 3, 7, and 26) is adapted to be engaged by the surface 753, as lever 742 rocks, in the event the E-shaped flipper 531 has been rocked and left in the negative position, which is clockwise from the position shown in Fig. 26, because the stud 746 will rise upwardly, allowing spring 747 to move the lever 743 counter-clockwise. The flipper 543 associated with the "B" totalizer will rock clockwise from the position shown in Fig. 26, as its associated totalizer becomes negative, allowing the lever 744 to rock counter-clockwise, where it is in the path of stud 752 (see also Fig. 3), which is located on an arm depending from link 381, and will move stud 752 rearwardly as lever 742 rocks. But this is prevented, ordinarily, by a stud 754 on the forwardly- and downwardly-extending arm of a three-armed lever 755. Lever 755 is pivoted at 756 to a frame-supported stud, and its downwardly- and rearwardly-extending arm is pivoted to a link 757, which is pivoted at its forward end to the aforementioned bell crank lever 466, which is rocked by the slide 461 (see Fig. 3) as the "B*" key 30 is depressed. As viewed in Fig. 26, the bell crank lever 466 is rocked counter-clockwise as key 30 is depressed, which will rock lever 755 clockwise to move stud 754 far enough forward to be out of engagement with arm 748 of lever 744, and to move a stud 758 on the upwardly-extending arm of three-armed lever 755 into engagement with the top surface of arm 745 of lever 743. The lever 755, by its position, therefore, determines whether surface 753 will be in alinement with stud 751, or whether the surface 759 will be in alinement with stud 752. As lever 742 is rocked counter-clockwise, with the mechanism positioned as seen in Fig. 26, at the beginning of a total-taking operation, neither stud 751 or stud 752 will be moved, thus leaving the two totalizers in their normal, positive positions, as regards their lateral stations. If a total is to be taken from the "A" totalizer, a lever 743 is free to move in accordance with the position of flipper 531, and surface 753 will come into line with stud 751 if the amount in the "A" totalizer is negative. Under these conditions, as lever 742 is rocked counter-clockwise, the stud 751 and its associated slide 367 will be moved forwardly in the machine, thus setting the subtract mechanism in a negative position, and thereafter, as plate 370 (Fig. 3) is rocked, the totalizer will be shifted to the left-hand position. If the "B*" key is depressed and then the total key is depressed, or the sub-total key is depressed, lever 755 (Fig. 26) is rocked clockwise, disabling the movement of lever 743 and enabling the movement of lever 744, so that, if the condition of the "B" totalizer is negative, the flipper 543 will allow lever 744 to rock clockwise to bring surface 759 into line with stud 752. Thereafter, as lever 742 rocks counter-clockwise, stud 752 and its associated slide 381 will be moved rearwardly, setting the totalizers in the negative position. Therefore, it will be seen that the totalizers are, by the foregoing mechanism, set automatically in total and sub-total operations, according to the negative or positive condition of that particular totalizer selected for total-taking or sub-total-taking. Bail 739 (Fig. 7) is restored near the end of the second machine cycle, with bell crank lever 736 and link 722 (see Fig. 17). Stud 760 (Fig. 7) behind arm 741 keeps bail 739 from rocking counter-clockwise around shaft 393 on entry operations. Stud 760 is supported by total control slide link 199, which is shown in its most forward position, said slide link being moved rearwardly, as will be described. Third, referring to Fig. 17, as bell crank lever 736 rocks to the position shown, its forwardly-extending arm 762 lowers, allowing stud 763 and latch member 764 to move from the position of those parts as seen in Fig. 4 to the position seen in Fig. 17. In the position in Fig. 17, the bent-over ear on the forward end of latch 764 rides on top of total control slide 199. Latch 764 is pivoted to a link 766 (Fig. 19), which is pivoted at its rear end to bell crank lever 767, normally urged clockwise by a spring 768, so that a roller stud 769 thereon follows the cam edge of plate 691. As plate 601 rocks counter-clockwise at the beginning of the first machine cycle of a total or sub-total operation, link 766 moves forward until the ear of latch 764 drops into notch 765 of total control slide link 199. On the second half of the first machine cycle, as the plate 601 returns to home position, total control slide link 199 is carried rearwardly against the action of its return spring 770 (see Fig. 4), normally urging it to a forward position, determined by stud 771 held in the right side frame plate of the machine. As link 199 moves rearwardly, latch piece 772 (Fig. 21) is rocked counter-clockwise by reason of its connection to link 199, through forked arm 773 straddling stud 774 on link 199. Latch piece 621 normally is held in effective position, where its forwardly-projecting tongue 621a blocks foot 628 of lever 622 (Fig. 4) by the resting of stud 775 (Fig. 21) on the upper edge of latch piece 772. Stud 776, extending from latch piece 772, on counter-clockwise movement of latch piece 772 strikes the forwardly-projecting tongue of latch piece 621, moving the tongue down from in front of foot 628 of lever 622 (Fig. 4), at the same time the tongue of latch piece 772 moves down past foot 628, whereupon lever 622 (Fig. 4) rocks counter-clockwise, causing the arm 625 to make contact with stud 626 (Fig. 2) of machine trip lever 442, holding it down against the return urge of spring 430 as total plate 703 makes a slight clockwise movement toward home position at the close of the first machine cycle. As the foot 628 of lever 622 moves over the upper surface of the tongue of latch piece 772 (Fig. 21), link 199 is latched in rearwardly-moved position. This occurs after the restoring movement is given lever 622 when stud 192 (Fig. 2) strikes by-pass pawl 627 in the first cycle. On the second machine cycle, stud 192 restores lever 622, permitting the total control mechanism to restore to home position. This mechanism causes the two cycles of machine operation.

Fourth, as link 199 (Fig. 19) is moved rearwardly, it rocks lever 570 counter-clockwise around stud 571 during the last half of the first machine cycle and holds it rocked, so that its upper rear surface is away from roller stud 564 as lever 547 rocks pitman 562 in the second machine cycle. Notch 565 of pitman 562, which is then moved upwardly by spring 568, is released from engagement with the stud 569 of lever 572 (unless "B*" key 30 has been operated), which otherwise would be rocked clockwise to disengage the totalizer on the first part of the second machine cycle. The same thing occurs with the "B" totalizer, as stud 590 moves away from the pitman 580, releasing the pitman to the action of spring 591, unless link 587 remains in place through failure to operate the "B*" key 30 for taking a "B" total, as will be explained with reference to Fig. 25. The differential racks, on their forward movement on the first half of the second machine cycle, reversely rotate the totalizer pinions of the selected totalizer to zero, the transfer pawl teeth striking the associated stop surfaces of the transfer levers, depending on whether the total is positive or negative. The totalizer wheels will be turned to all zeros if the total-taking is positive, or to all nines if the total is negative. The selected totalizer will be disengaged at the midpoint of the second cycle if a total is being taken, or remain in engagement therewith if a sub-total is being taken. On the last half of the second cycle, if an "A" total is taken, notch 567 (Fig. 19) of pitman 562 engages stud 575 of lever 572, rocking lever 572 clockwise, carrying plate 346 with it to disengage the "A" totalizer from the rack, so that the totalizer will remain cleared. In a similar manner, pitman 580, associated with the "B" totalizer, will disengage the "B" totalizer at mid-cycle on the second cycle of two-cycle operations, but only if a total is taken therefrom. If a sub-total is taken in either totalizer, this disengagement during the last half of the second cycle will not occur, as will be explained.

During the first half of the second machine cycle, as plate 691 is rocking counter-clockwise, link 766 moves forward, and link 199 remains stationary, being locked in rearward position by reason of foot 628 (Fig. 4) being over the tongue of latch piece 772 (Fig. 21). As latch 764 (Fig. 19) moves out into notch 765, the pull of the spring 723 (Fig. 27) will return link 722, plate 703, and link 706 to normal position, so that bell crank lever 736 (Fig. 4) can rock clockwise, lifting latch 764 up. When lever 622 (Fig. 4) is rocked clockwise by stud 192 (Fig. 2) near the end of the second machine cycle, link 199, no longer restrained by latch 764 or latch piece 772 (Fig. 21), moves to normal position, and the total key is released, permitting stud 705 (Fig. 27) to re-engage in the notch in link 706.

As link 199 is moved rearwardly during the last half of the first machine cycle, lever 197 (Fig. 4), pivoted to its forward end, is rocked counter-clockwise, so that, through action on stud 290, the key release bail is operated to release position to release any digit keys that may have been depressed. This also moves the zero stops to ineffective position and keeps them there until the key release bail returns to normal. The key release bail is returned to normal position as link 199 returns to normal position at the close of the second machine cycle.

The timing of totalizer engaging is the same whether a positive total or a negative total is being taken, the only difference being the lateral position of the totalizer. The same is true of sub-total-taking operations.

After total-taking operations, the totalizer-sensing mechanism always returns to item-entering position as bail 739 (Fig. 7) is restored. If the total was negative, the totalizer wheels are standing at all 9's, and a positive entry therein will bring into operation the "fugitive 1" mechanism. For instance, if the digit 5 be added, the totalizer will then register positive 5.

If a negative total has been taken and a negative amount entered thereafter, levers 364 and 378 are drawn to negative position, and no "fugitive 1" is entered. If a positive total has been taken and a negative amount entered, the "fugitive 1" will be entered, as the totalizer stays on the negative side.

On total-taking, the differential mechanism and, hence, the printing bars will be moved the true amount of the total, be it positive or negative, during the second machine cycle, stop bar control bail 142 (Fig. 17) at that time being ineffective. The printing of a total occurs at the midpoint of the second cycle of machine operation. On the first cycle, as no movement of the differential can occur, there is no printing operation, the printing hammers not being released. At the end of the second cycle of machine operation, lever 692 (Fig. 2) is rocked clockwise, releasing both the total key and the sub-total key, depending on whether the operation was a total-taking operation or a sub-total-taking operation.

*Selection of the "A" or "B" totalizer for total-taking and sub-total-taking and the sub-total control mechanism*

It has already been shown how the totalizer-engaging mechanism in its normal condition will enter items set up on the keyboard into both totalizers during an item-entering operation, or optionally into a selected one of the two totalizers. However, in taking a total or a sub-total, only one of the totalizers can be engaged with the differential mechanism during that part of the total-taking or the sub-total-taking operation in which the differential mechanisms are moved under control of the totalizer wheels. If the total key 29 alone or the sub-total key alone is depressed, the machine will perform a two-cycle operation, in which a total or a sub-total, as the case may be, is taken from the "A" totalizer. If the "B*" key 30 is depressed and then the total key or the sub-total key is depressed, a total or a sub-total is taken from the "B" totalizer, as the case may be. If the total key 29 alone is depressed, the two-cycle operation will commence, and, as slide link 199 (Fig. 19) has not yet moved rearwardly, and will not until the second half of the first cycle, both totalizers will be taken out of engagement with their associated racks at the beginning of the cycle and returned into engagement therewith near the end of the first half of the first cycle. Inasmuch as the stop bars are held from movement during the first of the two cycles by bail 142 (Fig. 17), no amount is set in the differential mechanism, and consequently no amount is printed. On the second half of the first machine cycle, slide 199 (Fig. 19) is drawn rearwardly, which rocks bell crank lever 570 counter-clockwise, withdrawing its upper end from holding the pitman 562, associated with the "A" totalizer, in engagement with stud 569. The pitman 562 rocks clockwise in response to the urge of spring 568, disengaging from the stud 569. On the first half of the second cycle, the pitman 562 not being engaged with the stud 569, the "A" totalizer remains in engagement as the lever 552 rocks counter-clockwise, and the amount on the "A" totalizer is set up on the differential mechanism.

At the close of the first half of the second cycle, notch 567 of pitman 562 engages stud 575 of lever 572 as lever 552 rocks clockwise to home position, pulling the "A" totalizer out of engagement with the differential mechanism because plate 346 is hooked to lever 572. The "A" totalizer is kicked into engagement with the differential mechanism again at the close of the second cycle by plate 601 as it returns to home position. The "B" totalizer must be out of engagement with the differential mechanism as the "A" total is being set thereon. During the first half of the first cycle, the "B" totalizer is kicked out of engagement and back, just like the "A" totalizer. During the second half of the first cycle, the stud 590 moves away from pitman 580, which is held in engagement with stud 583 only by the end of lever 587 bearing against stud 589. As the three-armed lever 552 rocks counter-clockwise during the first half of the second machine cycle, the "B" totalizer is disengaged, but, as stud 589 moves down, it passes the end of lever 597 and engages surface 780 of notch 781. The resultant clockwise movement of pitman 580 around the pivot causes it to disengage from stud 583. At the close of the first half of the second machine cycle, the pitman 580 moves up, carrying lever 587 with it. Thus totalizer "B" remains disengaged from the differential mechanism during its entire movement. As bell crank lever 570 restores to home position, the restoring arm 784, pivoted on shaft 622 and spring-held against a stud 785 on lever 621, aids in the re-engagement of the pitman 580 and stud 583.

A sub-total of the "A" totalizer is taken by depressing the sub-total key 29a, which causes both the total slide plate 681 (Fig. 27) and the sub-total slide plate 691 (Fig. 2) to slide to their operative positions. The total slide plate will cause all the operations described in connection with the taking of an "A" total except that the operation of the sub-total slide plate positions mechanism which interferes with the disengagement of the "A" totalizer shortly before mid-cycle of the second cycle, so that the amount of the total printed is re-entered into the totalizer.

Referring to Fig. 2, mounted on stud 688 is a plate 786 having a slot 787, in which rides a roller stud 788 (see Fig. 34) mounted on a plate 789 pivoted on printer support shaft 790. Plate 786 has a stud 791, which is engaged by the step 792 on the sub-total slide plate (see Fig. 2), and, as the sub-total slide plate is pushed to effective position, the plate 786 is rocked counter-clockwise, rocking plate 789 likewise. Pivoted to total bell crank lever 570 at 792 is a link 793 having in its upper end a slot 794, which embraces a stud 795 on plate 789. As plate 789 is rocked counter-clockwise, the roller stud 796 mounted on link 793 is moved rearwardly, and, as the bell crank 570 is rocked counter-clockwise in the second half of the first machine cycle, the link 793 will be forced upwardly, carrying stud 796 to the position shown in Fig. 35. In this position, referring to Fig. 4, stud 796 will be in such position with regard to the pitman 562 that said pitman cannot engage the stud 575 (see Fig. 19) to disengage the "A" totalizer, which, therefore, remains in engagement with the differential mechanism throughout the second cycle of machine operation.

In taking a total or a sub-total from the "B" totalizer, the "B*" key 30 is depressed, and thereafter the total key 29 or the sub-total key 29a is depressed.

Referring to Fig. 25, the depression of the "B*" key 30 rocks the shaft 467 counter-clockwise, as seen in Fig. 25, as before described. The rear end of the lever 797 on the shaft 467 are coupled by pin-and-slot coupling to the forward end of the lever 798 pivoted on the frame-supported stud 665. The rear end of lever 798 bears on the stud 799 on a lever 800, also pivoted on a frame-supported stud.

The stud 799 is held in contact with lever 798 by spring 801. The link 802 is pivoted to an ear depending from the rear end of lever 800, and the upper end of said link 802 has a slot engaging a stud 803 on the rearwardly-extending arm of two-armed lever 610, before described in connection with Fig. 20. On the counter-clockwise rocking of lever 797, prior to the depression of the total key or the sub-total key, link 802 is forced upward, placing stud 609 in non-add position with respect to hook 573. An upwardly-turned ear 804 on lever 610 bears against stud 805 on a lever 806 pivoted on frame-supported stud 807. Lever 806 has an ear 808 in line with the stud 809 on the lever 810 pivoted on stud 553. As link 802 is forced upwardly, lever 806 is rocked clockwise. Lever 810 has a foot 811, which bears against stud 564 on pitman 562 (see Fig. 19), but ordinarily the pitman is free to move against and rock lever 810. When lever 808 is rocked clockwise, however, ear 808 is cramped against stud 809, preventing lever 810 from moving and keeping foot 811 firmly against stud 564. As the machine is cycled in total-taking or sub-total-taking, the "A" totalizer, under the circumstances, will be disengaged at the first part of each cycle and will be kicked home to engaged position at the last of each cycle by plate 601 (see Fig. 19). The link 802 has an arm 812, which, when raised, strikes stud 782 on lever 587 (see also Fig. 19), rocking lever 587 counter-clockwise to ineffective position. If, now, with the "B*" key 30 depressed, the total key 29 is depressed, the pitman 580 will stay in engagement with stud 583 (see also Fig. 19) until stud 590 (Fig. 19) moves away from it during the second half of the first machine cycle. (During the first half of the first machine cycle, the "B" totalizer was first disengaged from and then engaged with the differential mechanism, but to no avail, as the stop bars are held from moving.) Because the pitman 580 disengages from stud 583 during the second half of the first cycle, the "B" totalizer will not disengage at the beginning of the second cycle, thus setting up the amount on the "B" totalizer onto the differential mechanism. The hook on the arm 582 of pitman 580 is under stud 586 on lever 584 as pitman 580 rises on the last part of the first half of the second cycle, disengaging the "B" totalizer and leaving it cleared. If the operation had been under control of the sub-total key 29a, then the stud 813 (see Fig. 34) would have moved rearwardly as link 793 rocked clockwise around pivot 792 to hold pitman 580 (Fig. 19) from swinging clockwise far enough to come under stud 586; hence the "B" totalizer stays engaged. Thus a sub-total is taken from the "B" totalizer.

*Symbol-printing mechanism*

Referring to Fig. 36, which is a top plan view of a portion of the ribbon-shifting and printing mechanisms, and to Figs. 37 and 38, which show the ribbon shift drive mechanism, all of which ribbon-shifting and drive mechanism is more fully shown and described in the Carlson et al. application to which reference has been made, and all the details of which mechanism are not included here because it is old and well known and cooperates with the symbol-printing mechanism in a known manner, the ribbon-shifting drive mechanism will be described first.

Extending across the machine and journaled in the left side frame plate 34 and the right side frame plate 35 is the printer support shaft 790 (see also Figs. 3 and 4), on which is pivotally mounted a bail 814, pivotally connected by link 815 (Fig. 3) to bell crank lever 387. As slide link 367 moves from the positive position, shown in Fig. 3, to the negative position, the bail 814 is rocked counterclockwise, as seen in Fig. 3, and clockwise, as seen in Fig. 37. The right arm of bail 814 has a rearwardly-extending toe 816 (Fig. 37). Referring to Fig. 36, there are provided a left ribbon spool 817, a left ribbon guide 818, and a left ribbon guide support plate 819, which has a forked lower end, which embraces a shaft 820 (see also Fig. 37), which extends between the printer side frame plates 821 and 821a. There is provided a stud 821b, which is supported by said left ribbon guide plate 819, by which said left guide plate and associated mechanism may be lifted. Rotatably mounted on the shaft 820 is a plate cam 822, which has a stop conformation 823, which normally bears against stud 821b. If cam 822 is rocked clockwise, from the position shown in Fig. 37, guide plate 819 and associated mechanism rise, so that the lower half of the ribbon is in line with the printing station instead of the upper half, as is normal. Loose on shaft 820 is a drive plate 824 (see Fig. 38) pivotally connected by link 825 to a lever 826 secured to the main drive shaft 55. As shaft 55 rocks counter-clockwise, as seen in Fig. 38, on the first half of a machine cycle, and clockwise on the last half of the cycle, drive-plate 824 first will be driven clockwise and then returned on the last half of the cycle. Lever 824 has pivoted thereon a latch pawl 827, spring-urged toward the notch in cam plate 822 and normally held from engagement with the notch by toe 816 (Fig. 37). This latch 827 is released by the subtract movement of the bail 814 and moves into the notch. During the first half of the ensuing machine cycle, plate 819 will move upwardly and will be returned during the last half of said cycle. Guide plate 819 is connected to a companion guide plate 828 (see Figs. 32 and 33) by a yoke consisting of arm 829 (Fig. 36), tube 830, mounted on shaft 790, and arm 831, mounted on the right end of tube 830. The guide plates 819 and 828, therefore, are moved upwardly together on subtract operations. A bichrome ribbon 832 is provided, which prints one color, preferably black, in positive position and another color, preferably red, in negative position, as is well known in the art. The movement of right ribbon guide plate 828 (see Figs. 32 and 33) is utilized in the positioning of appropriate negative symbol type, as will be explained. Referring to Fig. 36, there are ten denominational type bars 833; a type bar 835, on which are the symbol type "—," "S," "cr," "*," "CR," and "#," reading from top to bottom, as indicated in Fig. 34; and a type par 835, on which are the symbol type "A" and "B," as indicated in Fig. 29. The type are mounted in the associated case for movement rearward from a retracted position, whereupon they will strike through the ribbon to the platen 92.

The positioning of the type bar 834 will be described first. At a position of rest, a blank type 836 (Fig. 34) is in line with the printing position, which is in line with the horizontal diameter of platen 92. The bottom of the type bar has a stud 837, embraced by the forked end of the rearwardly-extending arm of the bell crank lever 838, mounted on frame-supported stud 839. The upper extending arm of lever 838 forms one half of a scissors embracing a stud 840 on a link 841, pivoted to an arm 842, rigid with the right ribbon guide plate 828. The other half of the scissors is the arm 843 of the yoke 844, having a downwardly-extending tail 845, which bears against roller stud 83, described with reference to Fig. 4 when the movement of the differential mechanism was described. The scissors arms are held in contact with stud 840 by spring 846. As roller stud 83 moves rearwardly on the first half of a machine cycle, the yoke 844 will rock counter-clockwise, as seen in Fig. 32, under the urge of spring 847, carrying with it lever 838, unless otherwise restrained. The counter-clockwise movement of yoke 844, therefore, through the yielding scissors connection with lever 838, will cause the type bar 834 (Fig. 34) to move upwardly. The right end of yoke 844 (Fig. 34) has an upwardly-extending arm with a bent-over ear 848 normally striking the rear edge of lever 598, pivoted on stud 599, said lever 598 having been before referred to in connection with the non-add mechanism, described in connection with Fig. 26a.

The rear edge of lever 598, in the position shown in Fig. 34, holds yoke 844 against moving, and, on an item-entering machine cycle with the totalizer mechanism in positive position, the type bar 834 will be unable to move and nothing is printed in the "type of operation" column after the amount, as shown at 849, 849a, 850, and 851 (Fig. 14). If an amount is to be entered negatively, the yoke 844 (Figs. 32 and 33) will be held from movement, but the stud 840 will be pulled upwardly as the ribbon guide plate 828 rises, opening the scissors slightly, so that lever 838 has one step of movement upwardly to position the negative type symbol "—" in printing position. This opening of the scissors one step occurs in every negative entry, negative total-taking operation, or negative sub-total-taking operation and positions the type bar one step up from the position determined by yoke 844.

Examples of negative entries are shown at 852, 853, 854, and 855 (Fig. 14). In sub-total-taking operations, link 793 (Fig. 34) moves clockwise, as the sub-total key is depressed, and upward, as the total bell crank lever 570 is rocked counter-clockwise, to position the stud 856 under and raise the lever 857, also mounted on pivot 599, to the position where its surface 858 is in line with ear 848. In moving counter-clockwise around pivot 599, the upper surface of lever 857 strikes stud 859, carrying lever 598 out of the way. The movement allowed to yoke 844 by ear 848 striking surface 858 positions the sub-total type "S" in printing position. An example of such printing is shown at 862 (Fig. 14). If the amount in the totalizer is negative, the type bar is raised another step to position the type "cr" in printing position. An example of such printing is shown at 863 (Fig. 14). If a total is taken, bell crank lever 570 rocks counter-clockwise on the first cycle, carrying link 793 upward, but without that link's being rocked counter-clockwise, positioning surface 860 in line with ear 848, which results in the positioning of type bar 838 to where the type "*" is in printing position. On a negative total, the type bar 834 will rise one more step to position the type "CR" in printing position. In non-add operations (see Fig. 26a), link 594 moves forwardly, pulling on link 597 in a downward and forward direction, resulting in the counter-clockwise movement of lever 598, until its rear edge is under ear 848 (Fig. 34), so that, when the machine cycle is started, the ear 848 rides under lever 598 and over lever 857, allowing full movement of the type bar 834 to place in printing position the non-add type "#."

In Fig. 29 is shown the type bar 835, bearing the type "A" and "B," representing the "A" and "B" totalizers, respectively. The blank type 861 is in printing position when the machine is at rest and when entries are being made in both the "A" and "B" totalizers simultaneously. A yoke 864 (Fig. 29), pivoted on stud 839, has a rearwardly-extending left arm 865, having a bifurcated end embracing stud 866 on the bottom of type bar 835, and a downwardly-extending right arm 867, having an ear 868, adapted to cooperate with a control member 872 with a surface 869, against which ear 868 normally rests, for positioning the type bar in blank position, as seen in Fig. 29; a surface 870, against which ear 868 may rest in "A" position, as seen in Fig. 28; and a surface 871, against which ear 868 may rest in "B" position, as seen in Figs. 30 and 31. Control member 872 is secured on a bell crank lever 873. Bell crank lever 873, pivoted on frame-supported stud 876, has a stud 874, which limits its counter-clockwise movement from the position shown in Fig. 29, by striking against the edge of a hole in the right side frame, where it is resiliently held by a spring 875. In this most counter-clockwise position, the surface 869 is in line with ear 868, and the blank type is in printing position. On entries into the "A" totalizer, the "A" key 26 (Fig. 22) is depressed, and stud 877 on its forwardly-projecting tail depresses link 878, slidably mounted on a stud on link 645 and pivoted to a lever 879, pivoted on stud 643, rocking said lever 879 counter-clockwise. Lever 879 is coupled by pin-and-slot connections to the forward end of the lever 880, pivoted on stud 665. The rear end of lever 880 is bifurcated and embraces stud 881 on a plate 882, pivoted on a plate-supported stud 883, all as described in connection with the selection of the "A" totalizer for item entries when the "A or B" key is used. A tail 890 on plate 882, when rocked counter-clockwise to select the "A" totalizer, strikes stud 892 on bell crank 873 (see Fig. 28), rocking it clockwise sufficiently to bring surface 870 into line with the ear 868. Yoke 864 has an arm 893 (see Fig. 29), which bears against roller stud 83, mentioned in connection with Fig. 34, normally holding type bar 83 in blank position. If surface 870 is in line with ear 868 as the machine cycle is initiated, the yoke 864 will be permitted to move sufficiently to place the "A" symbol type at printing position.

Referring to Fig. 20, if plate 657 is rocked counter-clockwise by depression of the "B" key 27, a tail 894 strikes stud 895 on bell crank 873, moving it to the position of Fig. 30, where surface 871 is in line with ear 868, so that, as the machine cycles, yoke 864 is permitted to rock sufficiently to place the type bar 835 so that the "B" symbol type is in printing position. On taking a total or a sub-total from the "A" totalizer, total bell crank 570 (Fig. 29) is rocked counter-clockwise, moving rearwardly a link 895 pivoted thereto. Link 895 rides stud 876, to which it is held by a spring 896. An upwardly-projecting arm 897 bears against stud 874, rocking lever 873 to place the type "A" in printing position on the ensuing total or sub-total printing operation. When the total is taken from the "B" totalizer, or when a sub-total is taken from the "B" totalizer, it will be remembered, lever 800 (Fig. 25) is rocked counter-clockwise as the "B*" key is depressed. A tail 898 (Fig. 31) on lever 800 will, by engagement with stud 899 on bell crank lever 873, rock lever 873 to place the surface 871 in line with the ear 868, so that, when the machine operation commences, the "B" symbol type is placed in printing position.

Referring to Fig. 14, an example of a total taken from the "A" totalizer is shown at 900, and at 901 is shown an example of the printed credit balance total from a "B" totalizer.

Key latches and interlocks

Although most of the key latch mechanism and key interlock mechanism has been described, it will be reviewed, and other such mechanism, not already mentioned, will be described.

The control keys "A and B" and "A or B" are locked in either the depressed condition or the elevated condition when a machine operation is in progress, through connection to the key lock slide 209, through bell crank lever 232 (Fig. 3), as has been described. The same keys are interlocked by the parallelogram mechanism already described with reference to Fig. 23, which insures that the depression of one key restores the other, and vice versa, by an off-center snap action under control of spring 642. The depression of the "A and B" key will motorize the subtract key by moving interponent lever 431 under stud 410 (Fig. 2) of the subtract control plate, the depression of the "A or B" key de-motorizing the subtract key, as has been explained.

The "B*" total key 30 is locked in depressed or restored position during machine operations by action of key lock slide 209 (Fig. 3) and slide 229 (Fig. 3a). The said key "B*" is latched in depressed position by slide latch plate 242 (Fig. 3) and is released by release bail 187 on its return movement at the end of the second cycle of a total or sub-total operation, or by rocking said bail by the correction key before the machine is released. Whenever lever 68 is tripped (Fig. 2), it blocks stud 204 as arm 429 moves under it, rendering it impossible to use the correction key. Therefore the "B*" key cannot be restored by the correction key after the commencement of a total operation or a sub-total operation until the return movement of the key release bail at the end of the second cycle. The operation of the said "B*" key also moves lever 478 (Fig. 24) so that its right end blocks the machine trip lever 68.

All of the foregoing has been described in detail before.

The digit keys 22 are locked during machine operations in either depressed or restored condition, as the case may be, by operation of the key lock slide 209. The correction key "C" is not latched down, but it is locked out or rendered inoperable whenever the trip lever mechanism is tripped, as has been described.

The non-add key "#" is not latched down itself, being returned to restored position by a spring as soon as the operator lifts his finger from it, but the mechanism which the key operates is latched by the lever 622 (Fig. 4) operating in conjunction with latch 620 (Fig. 26a), as has been described, until the end of the machine cycle. The non-add key cannot be depressed when lever 478 (Fig. 26a) is in line with lever 491, as it is when the "B*" key is depressed or when bell crank lever 900 (Fig. 2) is rocked under stud 488 whenever the trip lever 424 is rocked down to start the machine. Bell crank lever 900 is pivoted on stud 646 and has a rearwardly-extending arm 902 having an ear 903 (see also Fig. 20), which is struck by a rearwardly- and downwardly-projecting arm of lever 424, when it is tripped, to rock lever 900 to effective position.

Referring to Fig. 18, keys 29, 29a, 26, 27, and 31 have, respectively, studs 904, 905, 906, 907, and 908, which cooperate with slide plates 909, 910, 911, and 912, which have beveled upper corners. Said slide plates are mounted by stud-and-slot coupling to bracket 406, so that they have limited sidewise sliding movement. Depression of any of the foregoing keys 29, 29a, 26, 27, and 31 will push aside the adjacent slide or slides, which will then be crowded so that no other of said keys can be depressed, as there is no room for their respective studs. This prevents operation of more than one of said keys at a time. This crowded-plate type of interlock is old and well known.

The "B" key is spring-returned and not latched, but the "B" control mechanism (Fig. 20), which is operated by the "B" key, is held in effective position, as the machine is tripped, by ear 920 (Fig. 2) on lever 921, pivoted to the right side frame at 922 and coupled to lever 692 by a pin-and-slot coupling 923. As lever 692 rocks clockwise as the machine is tripped, lever 921 rocks clockwise, moving the ear 920 forwardly. If the "B" mechanism is unoperated, the ear rides in slot 924 of plate 657, preventing depression of the "B" key while the machine is in operation. At the end of the operation, the ear 920 is moved to the position shown in Fig. 2. If the "B" key has been depressed, plate 657 will have rocked counterclockwise, as has been described, and, upon the machine's being tripped, ear 920 will move under foot 925, which is elevated, preventing return of the "B" mechanism to normal, until the machine has been relatched.

Referring to Fig. 22, the "A" key has a plate 882, similar to that of the "B" key, which plate is mounted on the same pivot as plate 657, is directly behind plate 657, as shown in Fig. 2, and cooperates with the ear 920 exactly as with the "B" mechanism. Therefore the "A" and the "B" control mechanisms are locked in or out of effective position during operation of the machine.

Referring to Fig. 2, slide 878, associated with the "A" key, has at its bottom end a stud 930, which projects over the path of movement of lever 647 associated with the "B" key. If the "B" key is depressed, the rear end of lever 647 makes contact with stud 930, preventing the "A" key from being depressed. Conversely, if the "A" key is depressed, the "B" key cannot be depressed as stud 930 moves down against the rear end of lever 647. By this interlock, only one of the keys "A" and "B" can be in depressed position at a given instant.

The subtract key "—" is returned, after operation, by the spring 407 (Fig. 18), but, as it is depressed, it operates mechanism, described in connection with Figs. 2a, 2b, and 2c, which locks the subtract mechanism in operated or unoperated condition, as the case may be, during operation of the machine. The subtract mechanism also is blocked when the "B*" key is operated, which moves lever 478 (Fig. 24) to block the tripping of the machine for single-cycle operations, as has been explained.

The total key is spring-returned, as is the sub-total key, but the associated slides are latched in operated or unoperated condition by lever 687 (Fig. 2), before described. When the slide 199 (Fig. 27) moves rearwardly on total and sub-total operations, lever 478 is moved rearwardly (see Fig. 24 for a plan view of lever 478) and comes directly under arm 484 of trip lever 422 (see Fig. 27), blocking all single-cycle machine operations.

The same movement of lever 478 blocks the subtract mechanism because it moves under edge 928 of plate 437 (Fig. 2a), as shown in dotted lines, as the total or sub-total operation commences.

*General description of a series of machine operations*

Figure 1:
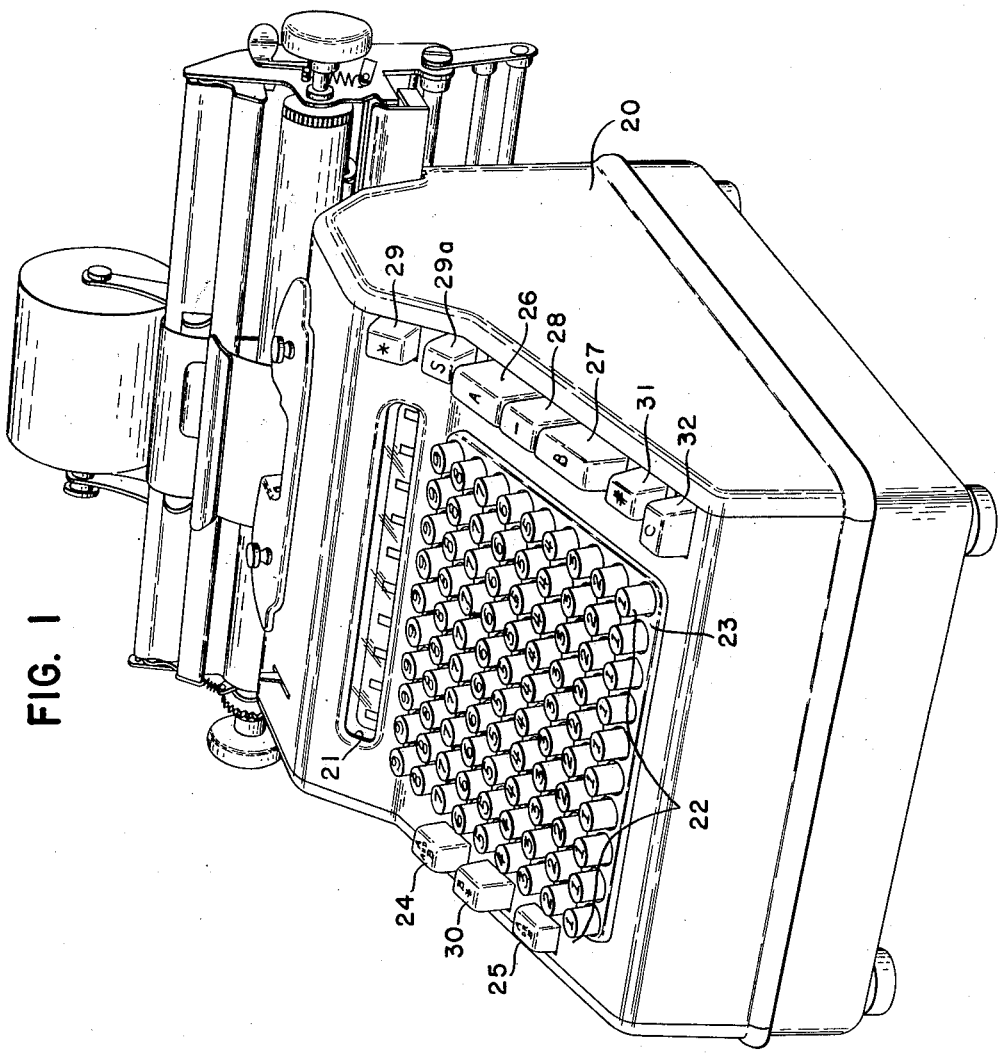
Fig. 1 is a perspective view of the machine.

Referring to Figs. 1 and 14, a series of operations is contemplated wherein the first two items are to be entered in both the "A" totalizer and the "B" totalizer. Therefore, the "A and B" key 24 is depressed to set up the condition in which items set up on the keyboard are entered into both totalizers. The amount .22 is set up on the digit keys 22, and either the "A" key 26 or the "B" key 27 is depressed. This initiates a machine operation and enters the amount into both totalizers. Thereafter, the amount .05 is set up on the keys 22, and either the key "A" or the key "B" is depressed. It will be observed that there is no printed designation as to totalizers with these first two entries, which is the case when the amounts are entered into both totalizers. The next two items are to be entered into one totalizer only, so the key 25 is depressed, the amount .14 is set up on the keys 22, and, as the amount is to be entered into the "A" totalizer subtractively, the keys 26 and 28 are depressed simultaneously, resulting in the printing of the amount, the minus sign "—," and the "A" in red, indicating that the amount has been entered subtractively in the "A" totalizer only. Next, the amount .05 is set up on the keyboard, on the keys 22, and the "B" key 27 is depressed, adding the amount into the "B" totalizer, and the printed item is followed by the character "B." As the next item is to be entered into both totalizers subtractively, the key 24 is depressed, the amount .15 is set up on the keys 22, and the key 28 is depressed, which enters the amount subtractively into both totalizers, and the printed amount and the minus sign "—" will be printed in red. Next, a sub-total is desired from the "A" totalizer, and the key 29a is depressed, resulting in the credit balance of .02 being printed in red, followed by the character "cr" and the character "A," representing the "A" totalizer. Following this, a sub-total is taken from the "B" totalizer by depression of the "B*" key 30, followed by an operation of key 29a, and the amount .17, followed by the characters "SB," will be printed in black, indicating that the amount is a positive amount. Because the next item is to be entered into the "B" totalizer only, the key 25 is depressed, the amount .60 is set up on the keys 22, and the keys 27 and 28 are depressed simultaneously. This enters the amount into the "B" totalizer subtractively, and it will be printed in red, followed by a minus sign "—" and a "B." The next item is set up on the keys, the "A" key 26 is depressed, and the amount will be printed, followed by an "A," indicating that it was added into the "A" totalizer only. As the next item is to be entered into both totalizers simultaneously, the key 24 will be depressed, followed by the setting up of the amount .10, and the key 28 alone is depressed, entering the amount negatively into both totalizers. The amount will be printed in red and will be followed by a minus sign "—." The "A" total is taken by depressed key 29 alone, and the amount is printed, together with the "*" and an "A." Next, the total will be taken from the "B" totalizer, and this is done by depressing the "B*" key 30, followed by the depression of key 29, whereupon the amount .53 will be printed in red, followed by the characters "CR" and "B." The pre-setting of the machine through keys 24 and 25 for a series of operations so that the amounts may be entered into both totalizers on the mere depression of keys 26 and 27, or either of them, or the conditioning of the machine by depression of the key 25, whereby the amount to be set up may be entered into either totalizer alone, as selected by keys 26 and 27, constitutes one of the novel features of the invention.

While the form of mechanism herein shown and described is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, having a cyclically-operable main operating means; power means to drive the main operating means when a cycle of operation is initiated; differentially-settable means; a first totalizer; a second totalizer; means operable to engage the first totalizer with and disengage it from the differentially-settable means; means operable to engage the second totalizer with and disengage it from the differentially-settable means; and digit keys operable to set up amounts to control the differentially-settable means, the combination of a first totalizer-engaging control means normally conditioned to cause the first engaging means to engage the first totalizer with the differentially-settable means in item-entering timing during a cycle of machine operation, but adjustable to cause the said first engaging means to engage the said first totalizer with the differentially-settable means in total-taking timing or in sub-total-taking timing, or to non-add the said first totalizer by disengaging it from the differentially-settable means during a machine cycle; a second totalizer-engaging control means normally conditioned to cause the second engaging means to engage the second totalizer with the differentially-settable means in item-entering timing during a cycle of machine operation, but adjustable to cause the second engaging means to engage said second totalizer with the differentially-settable means in total-taking timing or in sub-total-taking timing, or to non-add the said second totalizer by disengaging it from the differentially-settable means during a machine cycle; a first item-entering control key, operation of which initiates a machine cycle in which items set up on the digit keys normally are entered into both totalizers; a second item-entering control key, operation of which initiates a machine cycle, in which items set up on the digit keys normally are entered in both totalizers; item-entering conditioning means operable to condition the machine for one or more item-entering operations in which an item set up on the digit keys is entered only in the first totalizer when the first item-entering control key is operated, and in which such item is entered only into the second totalizer when the second item-entering control key is operated, said conditioning means including a coupling mechanism rendered effective between the first item-entering control key and the second totalizer's engaging control means to non-add the second totalizer during an item-entering machine cycle when the first item-entering control key is used to initiate a machine operation, and a coupling mechanism rendered effective between the second item-entering control key and the first totalizer's engaging control means to non-add the first totalizer during an item-entering machine cycle when the second item-entering control key is used to initiate a machine operation, whereby for a series of entry operations, if said conditioning means is in operated condition, it requires the operation of only one of the two item-entering control keys to determine into which of the two totalizers an item set up on the digit keys is to be entered, and to initiate the machine cycle in which such item is entered; and a subtract key that has a normal condition in which an item entered into one or both of the totalizers is entered additively and which may be operated to a subtract condition in which an item entered into one or both of the totalizers is entered subtractively.

2. The machine of claim 1, in which, when the subtract key is moved to subtract condition, it cooperates with movable intermediate means coupling it to the power means to initiate a machine cycle.

3. The machine of claim 2 in which the movable intermediate means normally cooperating with the subtract key is rendered ineffective to initiate a cycle of machine operation as the item-entering conditioning means is moved to operated condition, necessitating the operation of the subtract means in conjunction with one of the item-entering control keys to initiate a machine cycle.

4. In a calculating machine having a cyclically-operable main operating means; means to cause the main operating means to perform a one-cycle operation when an item-entering machine operation is initiated; a differentially-settable means; and digit keys by which amounts to be entered into the machine may be set up to control the differentially-settable means during a machine operation, the combination of a first totalizer normally in engagement with the differentially-settable means; a second totalizer normally in engagement with the differentially-settable means; starting means operable to initiate an item-entering operation of the machine; a first totalizer engaging means normally operable by the main operating means during a machine cycle to disengage the first totalizer from the differentially-settable means at the commencement of a machine cycle and to re-engage it during the cycle in item-entering timing, said engaging means having disabling mechanism operable to prevent such re-engagement in item-entering timing, whereby said first totalizer is non-added; a second totalizer engaging means normally operable by the main operating means during a machine cycle to disengage the second totalizer from the differentially-settable means at the commencement of a machine cycle and to re-engage it during the cycle in item-entering timing, said second engaging means having a disabling mechanism operable to prevent such re-engagement in item-entering timing whereby said second totalizer is non-added; a first control key associated with the first totalizer, said key having connections to the second totalizer-engaging means disabling mechanism, and, when operated, operating such disabling means, and said first key, when operated, also operating the starting means, whereby an item set up on the digit key is entered only into the first totalizer; and a second control key associated with the second totalizer, said second key having connections to the first totalizer-engaging means disabling mechanism, and, when operated, operating said first totalizer engaging means disabling mechanism, and said second key, when operated, also operating the starting means, whereby an item set up on the digit keys is entered only in the second totalizer.

5. The device of claim 4 in which any totalizer remaining in disengaged condition near the end of a machine cycle is re-engaged by the main operating means.

6. The machine of claim 4 in which operation of the first key renders it impossible to operate the second key, and wherein operation of the second control key renders it impossible to operate the first key, the first key connections interfering with the operation of the second key connections, and vice versa, when moved from normal position.

7. The device of claim 4 in which the key mechanism and connections are returned to normal position at the end of a machine operation.

8. The device of claim 4 in which the control key connections may be disabled, so that operation of a control key only initiates a machine operation in which the item set up on the digit keys is entered into both totalizers.

9. In a machine of the class described, having a cyclically-operable main operating means; power means to drive the main operating means when a cycle of operation is initiated; differentially-settable means including a denominational series of racks spring-urged to a moved position but normally restrained in a home position; a first totalizer normally in engagement with the differentially-settable means, but disengageable therefrom; a second totalizer normally in engagement with the differentially-settable means, but disengageable therefrom; means, operated by the main operating means, permitting the differential racks to have a full excursion of movement in one direction and back, with respect to the totalizers, during a machine cycle, unless selectively restrained by the digit keys, or either of the totalizers; a first totalizer-engaging means normally engaging the first totalizer with the differentially-settable means during a machine cycle in item-entering timing, but adjustable to engage the first totalizer in total-taking timing, sub-total-taking timing, or non-add timing; a second totalizer-engaging means normally engaging the second totalizer with the differentially-settable means in item-entering timing, but adjustable to engage the second totalizer in total-taking timing, sub-total-taking timing, or non-add timing; a first shifting means operable to move the first totalizer from a normal positive position in which, on return back of the differentially-settable means from its excursion in a machine cycle, items thereon are entered into the first totalizer additively, if engaged therewith, in item-entering timing, to a negative position, in which, on return back of the differentially-settable means from its excursion in a machine cycle, items thereon are entered into the first totalizer subtractively if engaged therewith in item-entering timing; a second shifting means operable to move the second totalizer from a normal positive position, in which, on return back of the differentially-settable means, on its excursion in a machine cycle, items thereon are entered into the second totalizer additively if engaged therewith in item-entering timing, to a negative position, in which, on return back of the differentially-settable means from its excursion in a machine cycle, items thereon are entered into the second totalizer subtractively if engaged therewith in item-entering timing; a first member associated with and actuated by the first totalizer, which member assumes a positive position when the amount in the first totalizer is positive, and which assumes a negative position when the amount in the first totalizer is negative; a second member associated with and actuated by the second totalizer, which second member assumes a positive position when the amount in the second totalizer is positive, and which assumes a negative position when the amount in the second totalizer is negative; a first totalizer shift control means, movable from a normal positive position in which the power means, at the beginning of a machine cycle, through action on said first shift control means, moves the first totalizer to the positive position, if not already there, to a negative position in which the power means at the beginning of a machine cycle, through action on said first shift control means, moves the first totalizer to the negative position, if not already there; a second totalizer shift control means, movable from a normal positive position in which the power means, at the beginning of a machine cycle, through action on said second shift control means, moves the first totalizer to the positive position, if not already there, to a negative position, in which the power means at the beginning of a machine cycle, through action on said second shift control means, moves the second totalizer to the negative position, if not already there; a first sensing means normally positioned by the first member to a positive position or to a negative position, according to whether the amount in the first totalizer is positive or negative, said first sensing means when in negative position engaging a member associated with the first totalizer shift control means; a second sensing means normally restrained in ineffective position, which second sensing means when unrestrained is positioned by the second member to a positive position, or to a negative position, according to whether the amount in the second totalizer is positive or negative, said second sensing means when in negative position engaging a member associated with the second totalizer shift control means; total-taking mechanism including a totalizer sensing means actuator, a two-cycle machine operation control mechanism, means for adjusting the engaging means of the first totalizer to engage the first totalizer with the differentially-settable means in total-taking timing, and means for adjusting the second totalizer engaging means to non-add the second totalizer; and a total key, operation of which initiates the operation of the power means and causes the total-taking operation to be performed by the total-taking mechanism, moving the totalizer sensing means actuator to cause the first and second sensing means to have a sensing excursion in which the first sensing means moves the first totalizer shift control means to negative position if the first totalizer has a negative amount therein.

10. The device of claim 9, in which a second total control key is provided to be operated before the total key is operated, said second total control key having connections to the two totalizer sensing means so that when the second total key is operated the sensing means of the first total key is restrained and the sensing means for the second total key is freed from restraint, and said second total key having connections with the first totalizer engaging means to adjust it to non-add timing, and connections to the second totalizer engaging means to adjust it to total-taking timing, whereby if there is a negative total in the second totalizer, the second totalizer will be shifted to the negative total position and a total taken therefrom.

11. The device of claim 10 in which a sub-total key is provided, having connections with the total key and with the second totalizer engaging means, whereby operation of the sub-total key operates the total key and adjusts the second totalizer engaging means to engage in sub-total timing.

12. The device of claim 9, in which a sub-total key is provided, having connections with the total key and with the first totalizer engaging means whereby operation of the sub-total key operates the total key and adjusts the first totalizer engaging means to engage in sub-total-taking timing instead of total-taking timing.

13. In a machine of the class described, having a cyclically-operable main operating means; means to drive the main operating means; differentially-settable means; and digit keys operable to set up amounts whereby to control the differentially-settable means, the combination of two totalizers each independently engageable with the differentially-settable means during machine operations for data-entering operations under control of the digit keys, or total-taking operations wherein data stored in one or the other of the totalizers are set on the differentially-settable means; means operated by a first totalizer control key associated with a first one of said totalizers which causes the driving means to drive the main operating means through a cycle of machine operation; means operated by a second totalizer control key associated with the second of said totalizers which causes the driving means to drive the main operating means through a cycle of machine operation; means operated by a first totalizer selecting key which conditions the machine so that amounts set up on the digit keys in a series of machine operations will be entered in both totalizers when either the first or second totalizer control key is used; and means operated by a second totalizer selecting key which conditions the machine so that amounts set up on the digit keys in a series of machine operations will be entered only into the first totalizer when the first totalizer control key is used, and will be entered only into the second totalizer when the second totalizer control key is used.

14. In a machine of the class described, having a cyclically-operable main operating means; means operable to cause the drive means to give the machine one cycle of operation for data-entering operations; means operable to cause the drive means to give the machine two cycles of operation for total-taking and sub-total-taking operations; a first totalizer; a second totalizer; digit keys, each spring-urged to an unoperated condition; a differentially-settable means controlled by one or the other of the totalizers during two-cycle operations and by the digit keys in one-cycle operations; digit key latching means for latching the operated keys in operated condition; and digit key release means having a home position and a moved position in which latched digit keys are released, said key release means normally being resiliently held in unmoved position, the combination of a total selecting key operable to an effective position against the urge of a return spring for selecting one of the totalizers for a total-taking operation or a sub-total-taking operation; means rendered effective at the end of each single machine cycle for momentarily moving the digit key release means to moved position to release the digit keys; a second means rendered effective at the beginning of the first cycle in two-cycle operations to move the digit key release means to moved position, and holding it there until the end of the second machine cycle, when it returns to home position; means operated by the main operating means and rendered effective at the beginning of each cycle of machine operation to lock the digit keys and the totalizer selecting key in either the operated position or the unoperated position; and a means additionally latching the totalizer selecting key in operated position when the key is so positioned by the operator, said additional means being rendered ineffective as the digit key release means returns to home position.

15. The machine of claim 14 in which the additional latching means includes a latch plate slide, spring-urged in latching direction, said latch plate slide having a camming surface cooperating with the stud on the totalizer selecting key, whereby, as the said selecting key is operated, the latch plate slide is moved against the spring and the stud passes under a locking shoulder as the camming surface is passed, the spring moving the slide in the opposite direction; and in which the slide is moved to ineffective position by the action of the digit key release means on a by-pass pawl on the slide as the digit key release means returns to home position.

16. In a calculating machine having digit keys operable from a normal position to control entries of amount data, each key normally being urged toward normal position; means automatically latching each digit key in operated position when so positioned; a cyclically-operable main operating means; means operated by the main operating means to lock the digit keys in normal or operated position during a cycle of machine operation; two totalizers; differentially-settable means common to the two totalizers and with which each may be independently engaged for entering data set on the digit keys into either or both totalizers and for setting the differentially-settable means in accordance with the data on one or the other of the totalizers; entry means for causing one cycle of machine operation during which data set up on the digit keys is entered into a selected one or both of the totalizers; digit key release means operable from a home position to a release position where it unlatches operated digit keys; and means operated by the main operating means at the close of one-cycle machine operations for operating the digit key release means, the combination of a total control key operable for giving the machine two cycles of operation, during which the first one of the two totalizers is engaged with the differentially-settable means and set according to the data on said first totalizer; a totalizer selecting control key operable from a normal position, to which it is resiliently urged, to an operated position, in which it conditions the machine during a total-taking operation under control of the total control key to engage the second one of the two totalizers with the differentially-settable means instead of the first totalizer, setting the amount in the second totalizer on the differentially-settable means; latch means for latching the totalizer selecting control key in operated condition; means coupling the digit key locking means to the totalizer selecting control key so that it is locked in normal or operated condition during a machine cycle, but not between cycles of machine operations; means operable during a two-cycle machine operation under control of the total control key for moving the digit key release means to release position during the first part of the first cycle of a machine operation of a two-cycle machine operation, and back to home at the end of the second cycle thereof; and means whereby, on the movement of the digit key release means to home position, the latch means for the totalizer selecting control key is rendered ineffective.

17. The machine of claim 16, in which there is provided means to lock the totalizer selecting key in normal position, if not used, during a two-cycle, total-taking operation, said means including a slide lock plate normally urged to effective position but held in ineffective position by the digit key release means when said release means is in home position, said lock plate being released when the digit key release means is moved to release position.

18. In a cyclically-operable calculating machine, having a first totalizer and a second totalizer, designated "A" and "B," respectively; a differentially-settable means for entering data into and taking data from said totalizers; and digit keys by which the differentially-settable means may be controlled during a cycle of machine operation, the combination of power means operable for giving the machine cycles of operation; totalizer engaging means operated by the power means during a cycle of machine operation, which totalizer engaging means normally engages both totalizers with the differentially-settable means in item-entering timing, but said engaging means being selectively adjustable to non-add either the "A" totalizer or the "B" totalizer during such a cycle of machine operation; an "A" control key, operation of which causes operation of the power means resulting in a machine cycle; a "B" control key, operation of which causes operation of the power means resulting in a machine cycle; a first train of mechanism extending from the "A" control key to the totalizer engaging mechanism, which train is adjustable to an effective condition in which operation of the "A" key actuates the train of mechanism to cause the totalizer-engaging mechanism to non-add the "B" totalizer during a machine cycle, and also adjustable to ineffective condition in which the operation of the "A" key does not actuate said train of mechanism; a second train of mechanism extending from the "B" control key to the totalizer-engaging mechanism, which train is adjustable to an effective condition in which operation of the "B" key actuates said second train of mechanism to cause the totalizer-engaging mechanism to non-add the "A" totalizer during a machine cycle, and also adjustable to an ineffective condition in which the operation of the "B" key does not actuate said second train of mechanism; and "A and B" control key operable from a normal position to an operated position; an "A or B" control key operable from a normal position to an operated position; connections between the "A and B" key and the "A or B" key so that operation of one of the said two keys returns the other to normal; a train of mechanism actuated by operation of the "A or B" key which adjusts the two trains of mechanism to their ineffective position, said two trains of mechanism being rendered effective as the "A or B" key is returned to normal by the "A and B" key, whereby, with the "A and B" key in operated position, operation of either the "A" key or the "B" key initiates a machine cycle in which amounts set on the digit keys are entered into both totalizers, whereas, if the "A or B" key is in operated position, the operation of the "A" key will initiate a machine cycle in which the amount set up on the digit keys is entered only into the "A" totalizer, and the operation of the "B" key will initiate a machine cycle in which the amount set up on the digit keys is entered only into the "B" totalizer.

References Cited in the file of this patent

UNITED STATES PATENTS

| | | |
|---|---|---|
| 1,016,276 | Kilpatrick | Feb. 6, 1912 |
| 1,908,358 | Horton | May 9, 1933 |
| 1,975,774 | Anderson | Oct. 9, 1934 |
| 2,070,785 | Crosman | Feb. 16, 1937 |
| 2,263,479 | Williams | Nov. 18, 1941 |
| 2,562,049 | Lambert | July 24, 1951 |
| 2,586,420 | Ellerbeck | Feb. 19, 1952 |
| 2,647,687 | Parsons et al. | Aug. 4, 1953 |
| 2,647,688 | Christian et al. | Aug. 4, 1953 |